US011971601B2

(12) United States Patent
Lai et al.

(10) Patent No.: US 11,971,601 B2
(45) Date of Patent: Apr. 30, 2024

(54) IMAGING LENS ASSEMBLY, IMAGING APPARATUS AND ELECTRONIC DEVICE

(71) Applicant: LARGAN PRECISION CO., LTD., Taichung (TW)

(72) Inventors: Yu-Chen Lai, Taichung (TW); Chih-Wei Cheng, Taichung (TW); Ming-Ta Chou, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 497 days.

(21) Appl. No.: 17/351,423

(22) Filed: Jun. 18, 2021

(65) Prior Publication Data

US 2022/0066119 A1 Mar. 3, 2022

(30) Foreign Application Priority Data

Aug. 28, 2020 (TW) .................................. 109129667

(51) Int. Cl.
*G02B 7/02* (2021.01)
*G02B 3/02* (2006.01)

(52) U.S. Cl.
CPC ............... *G02B 7/021* (2013.01); *G02B 3/02* (2013.01)

(58) Field of Classification Search
CPC .................................. G02B 7/021; G02B 3/02
See application file for complete search history.

(56) References Cited

U.S. PATENT DOCUMENTS

| 7,158,318 | B2 | 1/2007 | Shirie |
| 7,417,810 | B2 | 8/2008 | Feng |
| 8,070,304 | B2 | 12/2011 | Matsuoka |
| 8,320,059 | B2 | 11/2012 | Lin |
| 8,455,810 | B2 | 6/2013 | Tomioka et al. |
| 8,967,814 | B2 * | 3/2015 | Chang ...................... G02B 7/02 359/740 |
| 9,069,119 | B2 | 6/2015 | Takase et al. |

(Continued)

FOREIGN PATENT DOCUMENTS

| CN | 210015273 U | 2/2020 |
| CN | 210166605 U | 3/2020 |
| TW | 201116876 A | 5/2011 |

*Primary Examiner* — Bao-Luan Q Le
(74) *Attorney, Agent, or Firm* — McClure, Qualey & Rodack, LLP

(57) ABSTRACT

An imaging lens assembly includes a plurality of optical elements and an accommodating assembly, wherein the accommodating assembly is for containing the optical elements. The accommodating assembly includes a conical-shaped light blocking sheet and a lens barrel. The conical-shaped light blocking sheet includes an out-side portion and a conical portion, and the conical portion is connected to the out-side portion. The conical portion includes a conical structure tapered from the out-side portion toward one of an object-side and an image-side along the optical axis. The lens barrel is disposed on one side of the conical portion. The optical elements include a most object-side optical element, a most image-side optical element and at least one optical element. The conical structure of the conical-shaped light blocking sheet is physically contacted with only one of the lens barrel, the most object-side optical element and the most image-side optical element.

45 Claims, 37 Drawing Sheets

(56) References Cited

U.S. PATENT DOCUMENTS

| | | | |
|---|---|---|---|
| 9,442,268 B2 | 9/2016 | Chang | |
| 9,678,336 B2 | 6/2017 | Cho et al. | |
| 9,746,634 B2 | 8/2017 | Wei et al. | |
| 9,746,635 B2 | 8/2017 | Wei et al. | |
| 9,817,205 B2 | 11/2017 | Wei et al. | |
| 9,964,759 B2 | 5/2018 | Lin et al. | |
| 10,114,192 B2 | 10/2018 | Wei et al. | |
| 10,564,382 B2 * | 2/2020 | Lin | G02B 13/0045 |
| 10,928,560 B2 * | 2/2021 | Chou | G02B 5/003 |
| 11,143,798 B2 * | 10/2021 | Chou | G02B 7/006 |
| 11,353,676 B2 * | 6/2022 | Cheng | G02B 13/0045 |
| 11,614,595 B2 * | 3/2023 | Cheng | G02B 13/0045 359/614 |
| 11,681,082 B2 * | 6/2023 | Chou | G02B 7/022 359/738 |
| 11,762,132 B2 * | 9/2023 | Chou | G02B 7/022 359/614 |
| 2011/0102901 A1 * | 5/2011 | Lin | G02B 5/003 359/601 |
| 2014/0104691 A1 * | 4/2014 | Chang | G02B 7/021 359/611 |
| 2019/0235140 A1 * | 8/2019 | Chou | G02B 7/022 |
| 2019/0361154 A1 * | 11/2019 | Chou | G02B 7/006 |
| 2019/0384032 A1 * | 12/2019 | Lin | G02B 7/021 |
| 2021/0072487 A1 * | 3/2021 | Cheng | G02B 13/0045 |
| 2021/0088698 A1 * | 3/2021 | Chou | G02B 5/003 |
| 2021/0141128 A1 * | 5/2021 | Chou | G02B 7/026 |
| 2021/0247586 A1 * | 8/2021 | Cheng | G02B 7/022 |
| 2022/0066119 A1 * | 3/2022 | Lai | G02B 5/005 |
| 2022/0252824 A1 * | 8/2022 | Cheng | G02B 13/0045 |
| 2023/0194825 A1 * | 6/2023 | Cheng | G03B 11/045 359/614 |
| 2023/0273351 A1 * | 8/2023 | Chou | G02B 7/022 359/738 |

* cited by examiner

300

710

IMAGING LENS ASSEMBLY, IMAGING APPARATUS AND ELECTRONIC DEVICE

RELATED APPLICATIONS

This application claims priority to Taiwan Application Serial Number 109129667, filed Aug. 28, 2020, which is herein incorporated by reference.

BACKGROUND

Technical Field

The present disclosure relates to an imaging lens assembly and an imaging apparatus. More particularly, the present disclosure relates to an imaging lens assembly and an imaging apparatus applicable to a portable electronic device.

Description of Related Art

In order to satisfy requirements of modern consumer electronics market, trend of lens assemblies develops towards small object-side size, large aperture corresponding to large size and high pixel of image sensor etc., wherein the size on the object side is an important index. The smaller objet side size can reduce the product surface which needs to be the area of the opening of the lens assembly, which means the usage area of other equipment can be increased, such as displaying screen. However, there is many problems need to be overcome on the manufacturing of the small object-side size of the lens assembly, and the most pressing problem comes from assembling process. In practice, the lens assembly has an accommodating assembly for containing the optical elements, and the dimensional accuracy of the accommodating assembly provides obvious effect on the image quality of the lens assembly. Conventionally, the thickness of the object side of the accommodating assembly would be reduced with the design of small object-side size of the lens assembly so that the accommodating assembly is easily to be deformed after the optical elements contained thereinto, which leads to increasing the risk of the failure of assembling. In another side, in order to correspond with the image sensor having large size, both of the length and weight of the lens assembly will be increased so that when the imaging apparatus maintains or moves the lens assembly, the shift of the optical axis would be caused by the tilt of the setting, which leads to affecting the image quality.

SUMMARY

According to one aspect of the present disclosure, an imaging lens assembly having an optical axis includes a plurality of optical elements and an accommodating assembly. The optical axis passes through the optical elements. The accommodating assembly surrounds the optical axis and contains the optical elements. The accommodating assembly includes a conical-shaped light blocking sheet and a lens barrel. The conical-shaped light blocking sheet has an object-side opening, the optical axis passes through the object-side opening. The conical-shaped light blocking sheet includes an out-side portion and a conical portion. The out-side portion defines an outer periphery of the conical-shaped light blocking sheet and surrounds the object-side opening. The conical portion forms the object-side opening and is connected to the out-side portion, wherein the conical portion includes a conical structure tapered from the out-side portion toward an object-side along the optical axis. The lens barrel is disposed on an image side of the conical portion, and includes an object-side wall, an image-side wall, an inner-side wall and an outer-side wall. The object-side wall has an object-side through hole and faces towards an object side of the imaging lens assembly. The image-side wall has an image-side through hole and faces towards an image side of the imaging lens assembly. The inner-side wall surrounds and faces towards the optical axis and connects the object-side wall and the image-side wall. The outer-side wall is farther away from the optical axis than the inner-side wall to the optical axis and connects the object-side wall and the image-side wall. The accommodating assembly defines an inner space extending from the image-side through hole of the lens barrel to an end of the conical portion closest to the object side along a direction parallel to the optical axis and surrounded by the inner-side wall. The optical elements include a most object-side optical element and at least two optical elements disposed in the inner space. The out-side portion is fixed at only one of the lens barrel and the most object-side optical element, and the conical-shaped light blocking sheet is physically contacted with only one of the lens barrel and the most object-side optical element.

According to one aspect of the present disclosure, an imaging apparatus includes the imaging lens assembly of the aforementioned aspect.

According to one aspect of the present disclosure, an electronic device includes at least one of the imaging apparatus of the aforementioned aspect and an image sensor, wherein the image sensor is disposed on an image surface of the at least one of the imaging apparatus.

According to one aspect of the present disclosure, an imaging lens assembly having an optical axis includes a plurality of optical elements and an accommodating assembly. The optical axis passes through the optical elements. The accommodating assembly surrounds the optical axis and contains the optical elements. The accommodating assembly includes a conical-shaped light blocking sheet and a lens barrel. The conical-shaped light blocking sheet has an image-side opening; the optical axis passes through the image-side opening. The conical-shaped light blocking sheet includes an out-side portion and a conical portion. The out-side portion defines an outer periphery of the conical-shaped light blocking sheet and surrounds the image-side opening. The conical portion forms the image-side opening and is connected to the out-side portion, wherein the conical portion includes a conical structure tapered from the out-side portion toward an image-side along the optical axis. The lens barrel is disposed on an object side of the conical portion, and includes an object-side wall, an image-side wall, an inner-side wall and an outer-side wall. The object-side wall has an object-side through hole and faces towards an object side of the imaging lens assembly. The image-side wall has an image-side through hole and faces towards an image side of the imaging lens assembly. The inner-side wall surrounds and faces towards the optical axis, the inner-side wall connects the object-side wall and the image-side wall. The outer-side wall is farther away from the optical axis than the inner-side wall to the optical axis and connects the object-side wall and the image-side wall. The accommodating assembly defines an inner space extending from the object-side through hole of the lens barrel to an end of the conical portion closest to the image side along a direction parallel to the optical axis and surrounded by the inner-side wall. The optical elements include a most image-side optical element and at least two optical elements disposed in the inner space. The out-side portion is fixed at only one of the lens barrel and the most image-side optical element, and the conical-shaped light blocking sheet is physically contacted with only one of the lens barrel and the most image-side optical element.

According to one aspect of the present disclosure, an imaging apparatus includes the imaging lens assembly of the aforementioned aspect.

According to one aspect of the present disclosure, an electronic device includes at least one of the imaging apparatus of the aforementioned aspect and an image sensor, wherein the image sensor is disposed on an image surface of the at least one of the imaging apparatus.

According to one aspect of the present disclosure, an imaging lens assembly having an optical axis includes a plurality of optical elements and an accommodating assembly. The optical axis passes through the optical elements. The accommodating assembly surrounds the optical axis and contains the optical elements. The accommodating assembly includes a conical-shaped light blocking sheet and a lens barrel. The conical-shaped light blocking sheet has an opening; the optical axis passes through the opening. The conical-shaped light blocking sheet includes an out-side portion and a conical portion. The out-side portion defines an outer periphery of the conical-shaped light blocking sheet and surrounds the opening. The conical portion forms the opening and connects to the out-side portion, wherein the conical portion includes a conical structure tapered from the out-side portion to one of an object-side and an image-side along the optical axis. The lens barrel is disposed on one of an object side and an image side of the conical portion, and includes an object-side wall, an image-side wall, an inner-side wall and an outer-side wall. The object-side wall has an object-side through hole and faces towards an object side of the imaging lens assembly. The image-side wall has an image-side through hole and faces towards an image side of the imaging lens assembly. The inner-side wall surrounds and faces towards the optical axis, and the inner-side wall connects the object-side wall and the image-side wall. The outer-side wall is farther away from the optical axis than the inner-side wall to the optical axis and connects the object-side wall and the image-side wall. The optical elements include a most object-side optical element, a most image-side optical element and at least one optical element. The conical structure of the conical-shaped light blocking sheet is physically contacted with only one of the lens barrel, an object side of the most object-side optical element and an image side of the most image-side optical element.

According to one aspect of the present disclosure, an imaging apparatus includes the imaging lens assembly of the aforementioned aspect.

According to one aspect of the present disclosure, an electronic device includes at least one of the imaging apparatus of the aforementioned aspect and an image sensor, wherein the image sensor is disposed on an image surface of the at least one of the imaging apparatus.

DETAILED DESCRIPTION

Figure 1A:
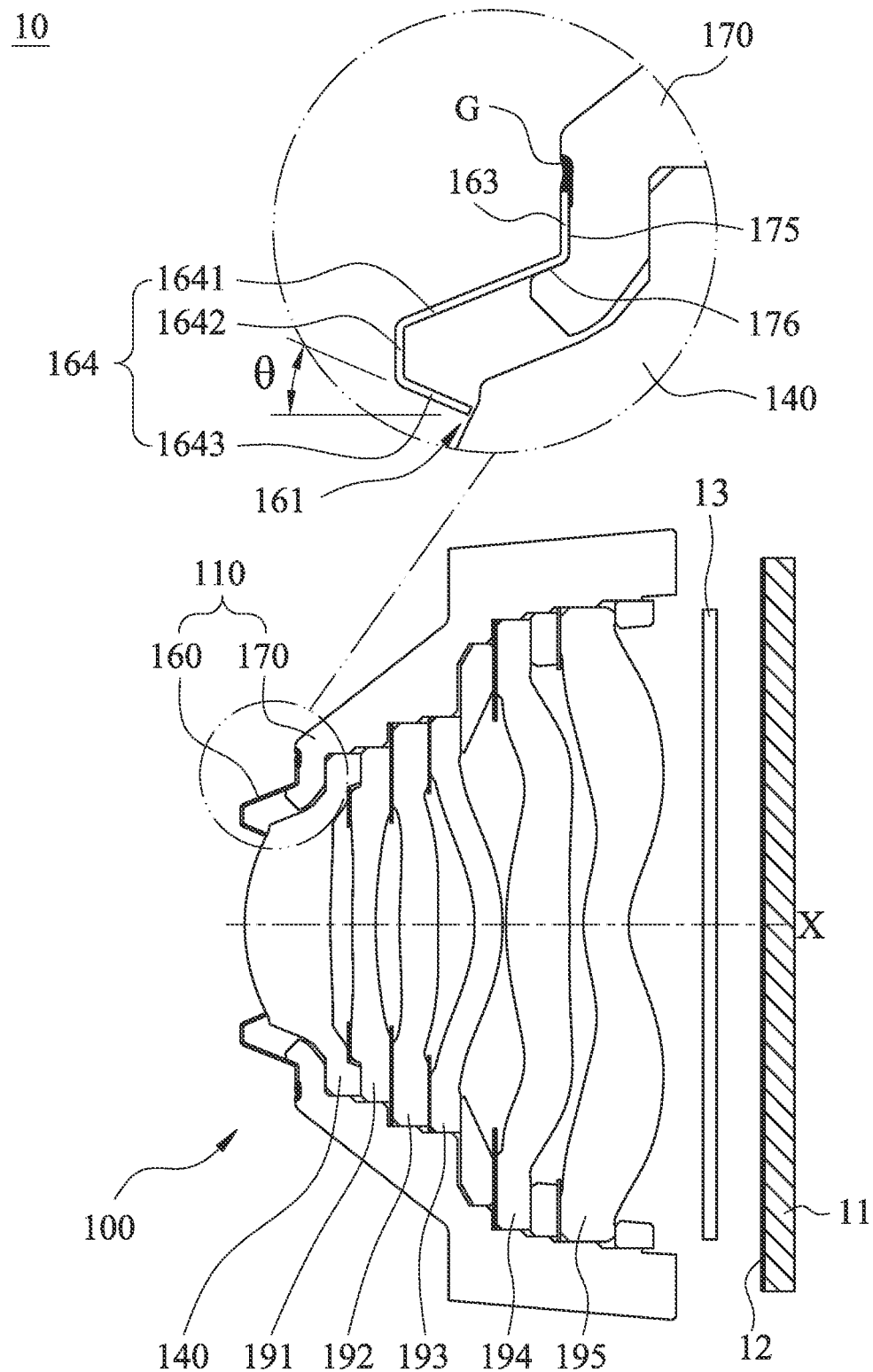
FIG. 1A is a schematic view of an electronic device according to the 1st embodiment of the present disclosure.

The present disclosure provides an imaging lens assembly, which has an optical axis, and includes a plurality of optical elements and an accommodating assembly, wherein the optical axis passing through the optical elements, and the accommodating assembly surrounds the optical axis and contains the optical elements. The accommodating assembly includes a conical-shaped light blocking sheet and a lens barrel. The conical-shaped light blocking sheet has an opening, and the optical axis passes through the opening. The conical-shaped light blocking sheet includes an out-side portion and a conical portion. The out-side portion defines an outer periphery of the conical-shaped light blocking sheet and surrounds the opening. The conical portion forms the opening and is connected to the out-side portion, wherein the conical portion includes a conical structure tapered from the out-side portion toward an object-side or an image-side along the optical axis. The lens barrel is disposed on one of an object side and an image side of the conical portion, and includes an object-side wall, an image-side wall, an inner-side wall and an outer-side wall. The object-side wall has an object-side through hole and faces towards an object side of the imaging lens assembly. The image-side wall has an image-side through hole and faces towards an image side of the imaging lens assembly. The inner-side wall surrounds and faces towards the optical axis and connects the object-side wall and the image-side wall. The outer-side wall is farther away from the optical axis than the inner-side wall to the optical axis and connects the object-side wall and the image-side wall.

The lens barrel can be disposed on the object side of the conical-shaped light blocking sheet, that is, the conical-shaped light blocking sheet can be located on the image side of the lens barrel. Further, the conical-shaped light blocking sheet can be located on the image side of the lens barrel, which means the conical-shaped light blocking sheet can be cooperated with the lens barrel, or be a part of the image-side portion of the lens barrel. Therefore, the weight of the image side of the imaging lens assembly can be reduced so as to improve the tilt of the setting of the imaging lens assembly and also decrease the stray light for enhancing the image quality.

The lens barrel can also be disposed on the image side of the conical-shaped light blocking sheet, that is, the conical-shaped light blocking sheet can be located on the object side of the lens barrel. In detail, the conical-shaped light blocking sheet can be located on the object side of the lens barrel for blocking the non-imaging light, which can be taken as an aperture of the imaging lens assembly, so that the characteristic of the large aperture can be achieved. The conical-shaped light blocking sheet can also be cooperated with the lens barrel, or be a part of the object-side portion of the lens barrel which becomes the most object-side element of the imaging lens assembly. Therefore, it is favorable for achieving the characteristic of small size on the object side and maintaining the ideal thickness of the lens barrel so as to increase the yield rate of production. Furthermore, the conical-shaped light blocking sheet and the lens barrel can be cooperated so as to reduce the weight of the object side of the imaging lens assembly. Therefore, it is favorable for enhancing the image quality by reducing optical axis offsets.

The conical-shaped light blocking sheet having an opening can be an object-side opening or an image-side opening. Specifically, when the conical-shaped light blocking sheet is located on the object side of the lens barrel, the opening is the object-side opening; when the conical-shaped light blocking sheet is located on the image side of the lens barrel, the opening is the image-side opening. Therefore, the conical-shaped light blocking sheet can satisfy the characteristics of small object-side size or large aperture by the design of the opening so as to enhance the image quality.

The accommodating assembly defines an inner space extending from the image-side through hole of the lens barrel to an end of the conical portion closest to the object side along a direction parallel to the optical axis or from the object-side through hole of the lens barrel to an end of the conical portion closest to the image side along a direction parallel to the optical axis, and the inner space surrounds by the inner-side wall. In detail, when the lens barrel is disposed on the object side of the conical-shaped light blocking sheet, the inner space extends from the object-side through hole of the lens barrel to the end of the conical portion closest to the image side; when the lens barrel is disposed on the image side of the conical-shaped light blocking sheet, the inner space extends from the image-side through hole of the lens barrel to the end of the conical portion closest to the object side. The optical elements can be disposed in the inner space of the accommodating assembly. Therefore, when the containing space is increased under the same volume, it is favorable for designing the image sensor with large aperture and size.

The optical elements can include a most object-side optical element and at least two optical elements disposed in the inner space. In detail, when the conical-shaped light blocking sheet is located on the object side of the lens barrel, the out-side portion of the conical-shaped light blocking sheet is fixed at only one of the lens barrel and the most object-side optical element, and the conical-shaped light blocking sheet is physically contacted with only one of the lens barrel and the most object-side optical element. Therefore, the out-side portion can be utilized for fixing the conical-shaped light blocking sheet, so that the deformation of the conical-shaped light blocking sheet by the internal stress of the imaging lens assembly can be avoided so as to increase the manufacturing feasibility thereof.

The optical elements can also include a most image-side optical element and at least two optical elements disposed in the inner space. In detail, when the conical-shaped light blocking sheet is located on the image side of the lens barrel, the out-side portion of the conical-shaped light blocking sheet is fixed at only one of the lens barrel and the most image-side optical element, and the conical-shaped light blocking sheet is physically contacted with only one of the lens barrel and the most image-side optical element. Therefore, the out-side portion can be utilized for fixing the conical-shaped light blocking sheet, so that the deformation of the conical-shaped light blocking sheet by the internal stress of the imaging lens assembly can be avoided so as to increase the manufacturing feasibility thereof.

The optical elements can further include a most object-side optical element, a most image-side optical element and at least one optical element, and the conical structure of the conical-shaped light blocking sheet is physically contacted with only one of the lens barrel, an object side of the most object-side optical element and an image side of the most image-side optical element. Therefore, the deformation of the conical-shaped light blocking sheet by the internal stress of the imaging lens assembly can be avoided so as to increase the manufacturing feasibility thereof.

When an angle between the conical portion and the optical axis is θ, the following condition is satisfied: 2 degrees≤θ≤90 degrees. Therefore, it is favorable for increasing the yield rate of production by avoiding the generation of the crack during the forming process of the conical portion of the conical-shaped light blocking sheet.

The object-side opening of the conical-shaped light blocking sheet can be disposed on the end of the conical portion closest to the object side; the image-side opening of the conical-shaped light blocking sheet can be disposed on the end of the conical portion closest to the image side. Therefore, the total track length of the imaging lens assembly can be reduced so as to improve the tilt of the setting of the imaging lens assembly.

The conical portion of the conical-shaped light blocking sheet can further include an object-side structure disposed on the end of the conical portion closest to the object side and perpendicular to the optical axis, and one end of the object-side structure far away from the optical axis is connected to an object side of the conical structure. Therefore, the function for protecting the most object-side optical element by the conical-shaped light blocking sheet can be enhanced.

The conical portion of the conical-shaped light blocking sheet can further include an image-side structure disposed on the end of the conical portion closest to the image side and perpendicular to the optical axis, and one end of the image-side structure far away from the optical axis is connected to an image side of the conical structure. Therefore, the function for protecting the most image-side optical element by the conical-shaped light blocking sheet can be enhanced.

The conical portion of the conical-shaped light blocking sheet can further include an opposite conical structure. The opposite conical structure can be expanded from the object-side opening toward one end of the conical-shaped light blocking sheet closest to the object side or be expanded from the image-side opening to one end of the conical-shaped light blocking sheet closest to the image side. In detail, when the conical-shaped light blocking sheet is located on the object side of the lens barrel, the conical-shaped light blocking sheet has the object-side opening, the opposite conical structure can be expanded from the object-side opening toward the end of the conical-shaped light blocking sheet closest to the object side, so that the object-side opening concaves towards the image side; when the conical-shaped light blocking sheet is located on the image side of the lens barrel, the conical-shaped light blocking sheet has the image-side opening, the opposite conical structure can be expanded from the image-side opening toward the end of the conical-shaped light blocking sheet closest to the image side, so that the image-side opening concaves towards the object side. Therefore, the light blocking function of the conical-shaped light blocking sheet can be further enhanced.

The conical portion of the conical-shaped light blocking sheet can further include at least one double-curved surface. In detail, the double-curved surface can be annular-shaped, but the present disclosure will not be limited thereto. Therefore, when the conical-shaped light blocking sheet is forced by the stress along the direction of the optical axis, it is favorable for reducing the risk of the generation of the plastic deformation (which is permanent) thereon.

When a length of the accommodating assembly along the direction parallel to the optical axis is AL, and a length of the lens barrel along the direction parallel to the optical axis is BL, the following condition is satisfied: 0%≤(AL−BL)/AL×100%≤30%. Therefore, it is favorable for obtaining the better ratio between the part of the conical-shaped light blocking sheet protruding from the lens barrel and the total track length of the imaging lens assembly.

When a distance along the direction parallel to the optical axis between the end of the conical portion closest to the object side and one end of the most object-side optical element closest to the object side is GAPO, the following condition is satisfied: 0.01 mm≤GAPO≤1.00 mm. Therefore, it is favorable for providing the largest shrinkage for the conical-shaped light blocking sheet which can still protect the most object-side optical element after being forced and deformed.

When the distance along the direction parallel to the optical axis between the end of the conical portion closest to the object side and the end of the most object-side optical element closest to the object side is GAPO, and a length of the conical-shaped light blocking sheet along the direction parallel to the optical axis is SL, the following condition is satisfied: 1.0%≤GAPO/SL×100%. Therefore, it is favorable for providing the largest shrinkage for the conical-shaped light blocking sheet which can still protect the most object-side optical element after being forced and deformed by axial stress.

When a diameter of the end of the conical portion closest to the object side is OD, and a maximum outer diameter of the accommodating assembly is MD, the following condition is satisfied: 0.05≤OD/MD<1.00. Therefore, the lens barrel can have small object-side size by disposing the conical-shaped light blocking sheet, and the ideal thickness of the lens barrel can be maintained so as to reduce the risk of defect caused by the insufficient thickness thereof.

The object-side opening can be a minimum opening of the accommodating assembly. When a diameter of the object-side opening is AD, and a focal length of the imaging lens assembly is f, the following condition is satisfied: 0.7≤f/AD≤3.5. Further, the object-side opening is the largest aperture that the accommodating assembly can contain, that is, the minimum F-number, but is not limited to the f-number of the imaging lens assembly. The imaging lens assembly still can adjust the aperture location and the size by the light blocking function of the optical elements. Hence, the large aperture characteristic of the imaging lens assembly can be obtained.

When a distance along the direction parallel to the optical axis between the end of the conical portion closest to the image side and one end of the most image-side optical element closest to the object side is GAPI, the following condition is satisfied: 0.01 mm≤GAPI≤1.00 mm. Therefore, it is favorable for providing the largest shrinkage for the conical-shaped light blocking sheet which can still protect the most image-side optical element after being forced and deformed.

When the distance along the direction parallel to the optical axis between the end of the conical portion closest to the image side and the end of the most image-side optical element closest to the object side is GAPI, and a length of the conical-shaped light blocking sheet along the direction parallel to the optical axis is SL, the following condition is satisfied: 1.0%≤GAPI/SL×100%. Therefore, it is favorable for providing the largest shrinkage for the conical-shaped light blocking sheet which can still protect the most object-side optical element after being forced and deformed by axial stress.

The imaging lens assembly can further include a conical surface, which is disposed on one of the lens barrel, the object side of the most object-side optical element and the image side of the most image-side optical element, and disposed relatively to the conical structure of the conical-shaped light blocking sheet. The conical surface and the conical structure are physically contacted with each other, and the conical-shaped light blocking sheet, the lens barrel, and the most object-side optical element, the most image-side optical element and the optical element are aligned along the optical axis. Further, the conical surface can be a first conical surface, a second conical surface and a third conical surface, which are disposed on the lens barrel of the imaging lens assembly, the most object-side optical element and the most image-side optical element, respectively.

Specifically, the lens barrel of the imaging lens assembly can include the first conical surface, which is disposed on the object side of the lens barrel and disposed opposite to the conical structure of the conical-shaped light blocking sheet, wherein the first conical surface and the conical structure are physically contacted to each other, and the conical-shaped light blocking sheet is aligned with the lens barrel. Therefore, the conical-shaped light blocking sheet and the lens barrel can be embedded and aligned to each other via the first conical surface and the conical structure.

The most object-side optical element can include the second conical surface, which is disposed on the object side of the most object-side optical element and disposed relatively to the conical structure of the conical-shaped light blocking sheet, wherein the conical portion and the second conical surface are physically contacted with each other, and the conical-shaped light blocking sheet is aligned with the lens barrel. Therefore, the conical portion of the conical-shaped light blocking sheet can be embedded with the most object-side optical element.

The most image-side optical element can include the third conical surface, which is disposed on the image side of the most image-side optical element and disposed relatively to the conical structure of the conical-shaped light blocking sheet, wherein the second conical surface and the conical structure are physically contacted with each other, and the conical-shaped light blocking sheet is aligned with the lens barrel. Therefore, the conical-shaped light blocking sheet and the lens barrel can be embedded and aligned with each other via the third conical surface and the conical structure.

The imaging lens assembly can further include a joint surface, which is disposed on one of the lens barrel, the most object-side optical element and the most image-side optical element, and disposed relatively to the out-side portion of the conical-shaped light blocking sheet. The out-side portion of the conical-shaped light blocking sheet is fixed on the joint surface. Further, the joint surface can be a first joint surface, a second joint surface and a third joint surface, which are disposed on the lens barrel of the imaging lens assembly, the most object-side optical element and the most image-side optical element, respectively.

Specifically, the lens barrel can include the first joint surface, which is disposed on an object side of the lens barrel and disposed opposite to the out-side portion of the conical-shaped light blocking sheet, wherein the conical-shaped light blocking sheet and the lens barrel are physically contacted to each other, and the out-side portion of the conical-shaped light blocking sheet is fixed to the first joint surface. Therefore, the conical-shaped light blocking sheet can the object side of the lens barrel can be fixed to each other.

The most object-side optical element can include the second joint surface, which is disposed on an object side of the most object-side optical element and disposed relatively to the out-side portion of the conical-shaped light blocking sheet. The conical-shaped light blocking sheet and the most object-side optical element are physically contacted with each other, and the out-side portion of the conical-shaped light blocking sheet is fixed on the second joint surface. Therefore, the conical-shaped light blocking sheet can be fixed with the most object-side optical element.

The most image-side optical element can include a third joint surface, which is disposed on an image side of the most image-side optical element and disposed relatively to the out-side portion of the conical-shaped light blocking sheet. The conical-shaped light blocking sheet and the most image-side optical element are physically contacted with each other, and the out-side portion of the conical-shaped light blocking sheet is fixed on the third joint surface. Therefore, the conical-shaped light blocking sheet can be fixed with the most image-side optical element.

Moreover, the lens barrel can further include a first undercut surface, which surrounds the optical axis, and is extended and shrunken along a direction from one end of the first joint surface far from the optical axis farther away from the first joint surface. The first undercut surface can be utilized for fixing the conical-shaped light blocking sheet. In detail, the first undercut surface can be abutted with the out-side portion of the conical-shaped light blocking sheet so as to fix the conical-shaped light blocking sheet, but will not be limited thereto. Therefore, it is favorable for enhancing the efficiency of the production by reducing the assembling process of the conical-shaped light blocking sheet via the dispensing connection.

The first undercut surface can be integrally made with the lens barrel, wherein when a maximum diameter of the first undercut surface along a direction perpendicular to the optical axis is MU, and a minimum diameter of the first undercut surface along the direction perpendicular to the optical axis is SU, the following condition is satisfied: $0\% < (MU-SU)/MU \times 100\% < 12\%$. Therefore, the lens barrel and the first undercut surface can be made integrally by the undercut design. Further, the following condition can be satisfied: $0\% < (MU-SU)/MU \times 100\% < 10.5\%$.

The lens barrel can further include a third undercut surface, which surrounds the optical axis, and is extended and shrunken along a direction from one end of the third joint surface far from the optical axis farther away from the third joint surface. The third undercut surface can be utilized for fixing the conical-shaped light blocking sheet. In detail, the third undercut surface can be abutted with the out-side portion of the conical-shaped light blocking sheet so as to fix the conical-shaped light blocking sheet, but will not be limited thereto. Therefore, it is favorable for enhancing the efficiency of the production by reducing the assembling process of the conical-shaped light blocking sheet via the dispensing connection.

The imaging lens assembly can further include at least one coil, which is disposed on the outer-side wall of the lens barrel and symmetrically disposed along the optical axis. In detail, the coil symmetrically disposed along the optical axis means the coil surrounding the optical axis, or the number of the coil being a plurality and arranged symmetrically along the optical axis. Therefore, the one-piece driving carrier of the imaging lens assembly can be formed so as to achieve the auto-focusing function.

The imaging lens assembly can further include at least one magnetic element disposed on the outer-side wall of the lens barrel and symmetrically disposed along the optical axis. In detail, the number of the magnetic element is at least two, which are pairs and disposed symmetrically along the optical axis on the outer-side wall of the lens barrel. Therefore, the one-piece structure of the driving carrier of the imaging lens assembly can be formed so as to achieve the correcting function of image shaken or deformation.

The conical-shaped light blocking sheet can be made of metal material. In detail, the conical-shaped light blocking sheet can be made of copper, iron, aluminum, titanium, or a composite of a plurality of metals and non-metals, such as Ti-6Al-4V or brass. Furthermore, the conical-shaped light blocking sheet can have magnetic permeability. Therefore, when the imaging lens assembly is assembling, the assembling efficiency can be enhanced by utilizing magnetic attraction. Further, the surface of the conical-shaped light blocking sheet can be covered by a black material or can be applied by chemical quench polish quench process so as to reduce the surface reflectivity. Therefore, the flare can be reduced. However, the present disclosure will not be limited to the aforementioned materials, characteristics and processing methods.

Further, the conical-shaped light blocking sheet can be made of plastic material. In detail, the conical-shaped light blocking sheet can be a black plastic sheet, or can also be a transparent plastic sheet coating by black material, wherein the black material can have characteristic of low reflectivity, but will not be limited to the aforementioned materials, characteristics and processing methods. Therefore, the light blocking effect can be efficiently provided by the conical-shaped light blocking sheet.

Each of the aforementioned features of the imaging lens assembly can be utilized in various combinations for achieving the corresponding effects.

The present disclosure provides an imaging apparatus, which includes the aforementioned imaging lens assembly.

The present disclosure provides an electronic device, which includes at least one of the imaging apparatus and an image sensor. The image sensor is disposed on an image surface of the at least one of the imaging apparatus.

According to the above description of the present disclosure, the following specific embodiments are provided for further explanation, but will not be limited thereto.

1st Embodiment

FIG. 1A is a schematic view of an electronic device 10 according to the 1st embodiment of the present disclosure. In FIG. 1A, the electronic device 10 includes at least one imaging apparatus (its reference numeral is omitted) and an image sensor 11. The imaging apparatus include an imaging lens assembly 100, an image surface 12 and a filter 13. When the imaging apparatus is applied to the electronic device 10, the image sensor 11 can be disposed on the image surface 12 of the imaging apparatus.

Figure 1B:
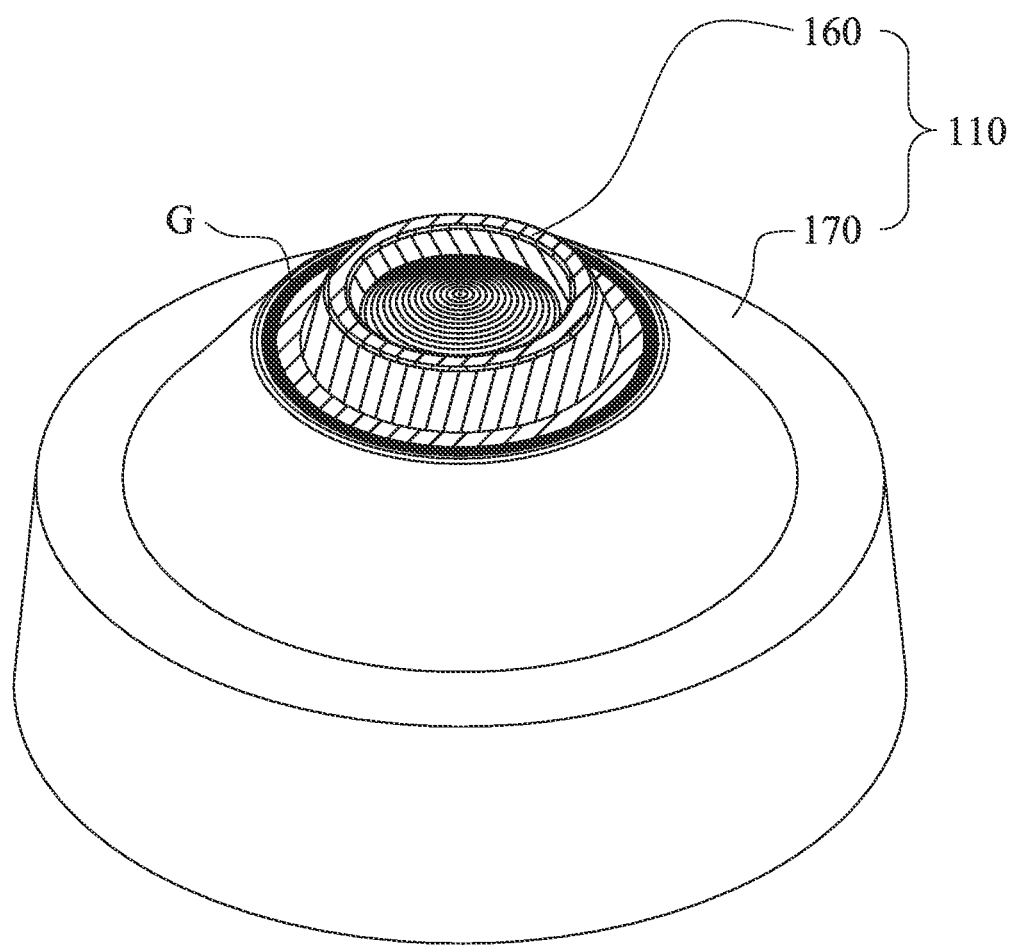
FIG. 1B is a three-dimensional schematic view of the imaging lens assembly according to the 1st embodiment of FIG. 1A.
Figure 1C:
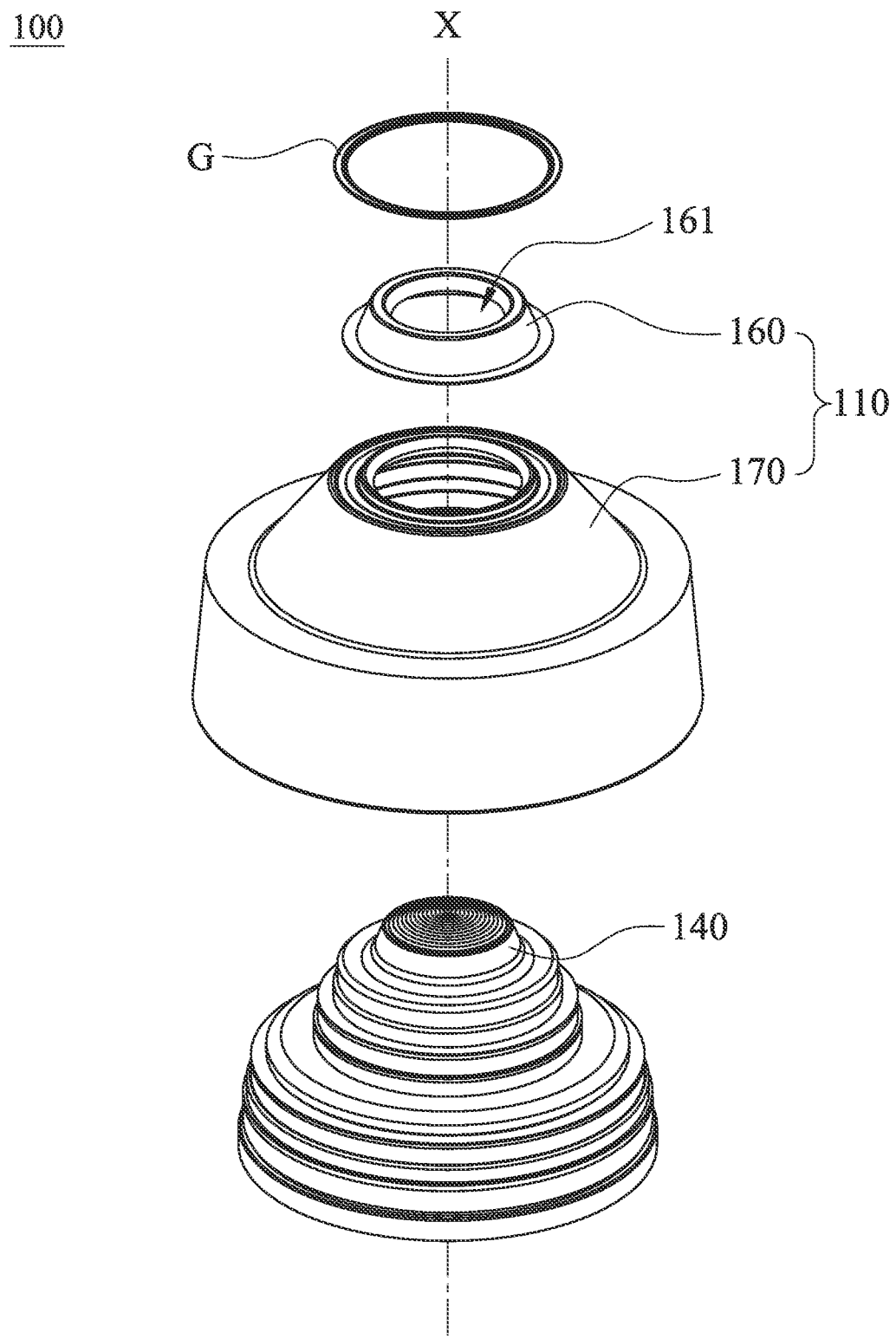
FIG. 1O is an exploded view of the imaging lens assembly according to the 1st embodiment of FIG. 1A.
FIG. 1D is a schematic view of the accommodating assembly according to the 1st embodiment of FIG. 1A.
FIG. 1E is a schematic view of a material of the conical-shaped light blocking sheet according to the 1st embodiment of FIG. 1A.
FIG. 1F is a schematic view of another material of the conical-shaped light blocking sheet according to the 1st embodiment of FIG. 1A.
FIG. 1G is a schematic view of further another material of the conical-shaped light blocking sheet according to the 1st embodiment of FIG. 1A.
FIG. 1H is a schematic view of yet another material of the conical-shaped light blocking sheet according to the 1st embodiment of FIG. 1A.
FIG. 1I is a schematic view of parameters of the imaging lens assembly according to the 1st embodiment of FIG. 1A.

FIG. 1B is a three-dimensional schematic view of the imaging lens assembly 100 according to the 1st embodiment of FIG. 1A, FIG. 10 is an exploded view of the imaging lens assembly 100 according to the 1st embodiment of FIG. 1A. In FIG. 1B and FIG. 10, the imaging lens assembly 100 has an optical axis X, and includes a plurality of optical elements (its reference numeral is omitted) and an accommodating assembly 110. The optical axis X passes through the optical elements, and the accommodating assembly 110 surrounds the optical axis X and contains the optical elements.

Figure 1D:
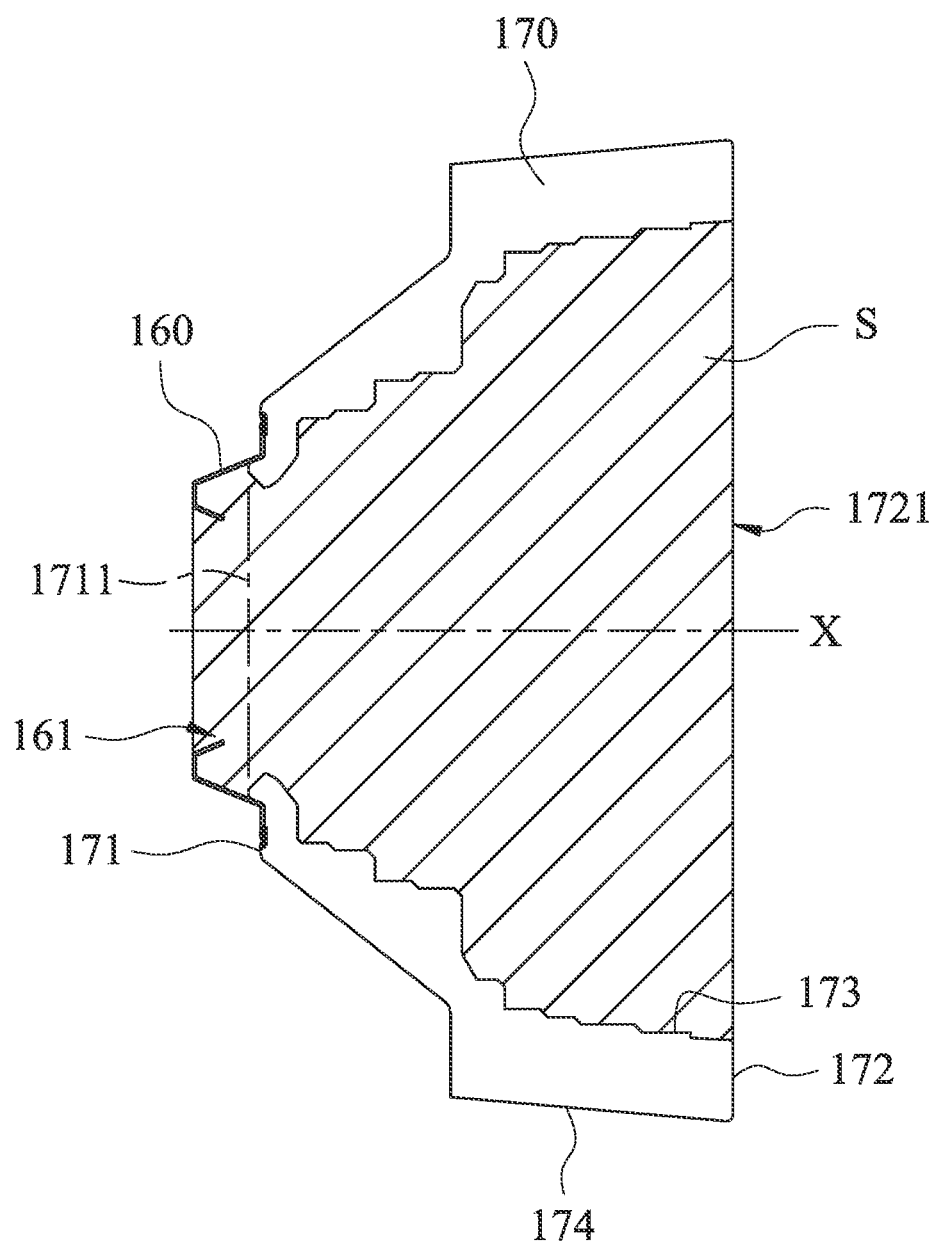

FIG. 1D is a schematic view of the accommodating assembly 110 according to the 1st embodiment of FIG. 1A. In FIG. 1A to FIG. 1D, the accommodating assembly 110 includes a conical-shaped light blocking sheet 160 and a lens barrel 170. The conical-shaped light blocking sheet 160 has an opening, and includes an out-side portion 163 and a conical portion 164. In the 1st embodiment, the opening of the conical-shaped light blocking sheet 160 is an object-side opening 161, and the optical axis X passes through the object-side opening 161. The out-side portion 163 defines an outer periphery (its reference numeral is omitted) of the conical-shaped light blocking sheet 160 and surrounds the object-side opening 161. The conical portion 164 forms the object-side opening 161 and is connected to the out-side portion 163, wherein the conical portion 164 includes a conical structure 1641 tapered from the out-side portion 163 toward an object-side along the optical axis X. The lens barrel 170 is disposed on an image side of the conical portion 164, and includes an object-side wall 171, an image-side wall 172, an inner-side wall 173 and an outer-side wall 174. The object-side wall 171 has an object-side through hole 1711 which is allowing the optical axis X to pass through and faces towards an object side of the imaging lens assembly 100. The image-side wall 172 has an image-side through hole 1721 which is allowing the optical axis X to pass through and faces towards an image side of the imaging lens assembly 100. The inner-side wall 173 surrounds and faces towards the optical axis X, and the inner-side wall 173 connects the object-side wall 171 and the image-side wall 172. The outer-side wall 174 is farther away from the optical axis X than the inner-side wall 173 to the optical axis X and connects the object-side wall 171 and the image-side wall 172. The accommodating assembly 110 defines an inner space S. The inner space S extends from the image-side through hole 1721 of the lens barrel 170 to an end of the conical portion 164 closest to the object side along a direction parallel to the optical axis X and is surrounded by the inner-side wall 173.

Further, in FIG. 1A, the optical elements include a most object-side optical element 140 and at least two optical elements disposed in the inner space S. According to the 1st embodiment, a number of the optical elements is 14, which includes 6 lens elements, in order from the object side to the image side is, the most object-side optical element 140 and lens elements 191, 192, 193, 194, 195, wherein the most object-side optical element 140 is also a lens element. However, the optical characteristics, such as the amount, structure, surface shape, can be arranged on demand, or can further dispose others optical elements, such as light blocking sheets, spacers, retainers, which will not be limited thereto. Moreover, the lens element 195 can be a most image-side optical element of the imaging lens assembly; that is, the optical elements can include a most object-side optical element, a most image-side optical element and at least one optical element, which are disposed in the inner space S.

In FIG. 1A, the out-side portion 163 is fixed at only one of the lens barrel 170 and the most object-side optical element 140, and the conical-shaped light blocking sheet 160 is physically contacted with only one of the lens barrel 170 and the most object-side optical element 140. Therefore, the generation of deformation of the conical-shaped light blocking sheet, such as compression or warpage, caused by pressing stress can be avoided, so that the tolerance stack-up can be reduced caused by assembling so as to maintain the image quality. Specifically, according to the 1st embodiment, the conical-shaped light blocking sheet 160 is physically contacted with the lens barrel 170, and the out-side portion 163 of the conical-shaped light blocking sheet 160 can be fixed on the object side of the lens barrel 170 via a glue G, but the present disclosure will not be limited thereto.

The conical portion 164 of the conical-shaped light blocking sheet 160 can further include an object-side structure 1642, which is disposed on the end of the conical portion 164 closest to the object side and perpendicular to the optical axis X, and one end of the object-side structure 1642 far away from the optical axis X is connected to an object side of the conical structure 1641. Therefore, the effect for protecting the most object-side optical element 140 of the conical-shaped light blocking sheet 160 can be enhanced. Further, the conical portion 164 of the conical-shaped light blocking sheet 160 can further include an opposite conical structure 1643, which is expanded from the object-side opening 161 toward one end of the conical-shaped light blocking sheet 160 closest to the object side. Therefore, the object-side opening 161 concaves towards the image side so as to enhance the light blocking effect of the conical-shaped light blocking sheet 160.

The imaging lens assembly 100 can further include a joint surface, which is disposed on one of the lens barrel 170, the object side of the most object-side optical element 140 and the image side of the most image-side optical element, and disposed relatively to the out-side portion 163 of the conical-shaped light blocking sheet 160. In the 1st embodiment, the lens barrel 170 of the imaging lens assembly can further include a joint surface, which is a first joint surface 175. The first joint surface 175 is disposed on an object side of the lens barrel 170 and disposed opposite to the out-side portion 163 of the conical-shaped light blocking sheet 160, wherein the conical-shaped light blocking sheet 160 and the lens barrel 170 are physically contacted to each other, and the out-side portion 163 of the conical-shaped light blocking sheet 160 is fixed to the first joint surface 175.

The imaging lens assembly can further include a conical surface disposed on one of the lens barrel 170, the object side of the most object-side optical element 140 and the image side of the most image-side optical element, and disposed relatively to the conical structure 1641 of the conical-shaped light blocking sheet 160, wherein the conical surface and the conical structure 1641 are physically contacted with each other, and the conical-shaped light blocking sheet 160, the lens barrel 170, and the optical elements are aligned along the optical axis X. In the 1st embodiment, the lens barrel 170 of the imaging lens assembly 100 can include a first conical surface 176, that is, the first conical surface 176 is the conical surface included in the imaging lens assembly 100. The first conical surface 176 is disposed on the object side of the lens barrel 170 and disposed opposite to the conical structure 1641 of the conical-shaped light blocking sheet 160. In detail, the first conical surface 176 and the conical structure 1641 are physically contacted to each other, and the conical-shaped light blocking sheet 160 is aligned with the lens barrel 170. Therefore, the conical-shaped light blocking sheet 160 and the lens barrel 170 can be embedded and aligned to each other via the first conical surface 176 and the conical structure 1641.

Figures 1E, 1F:
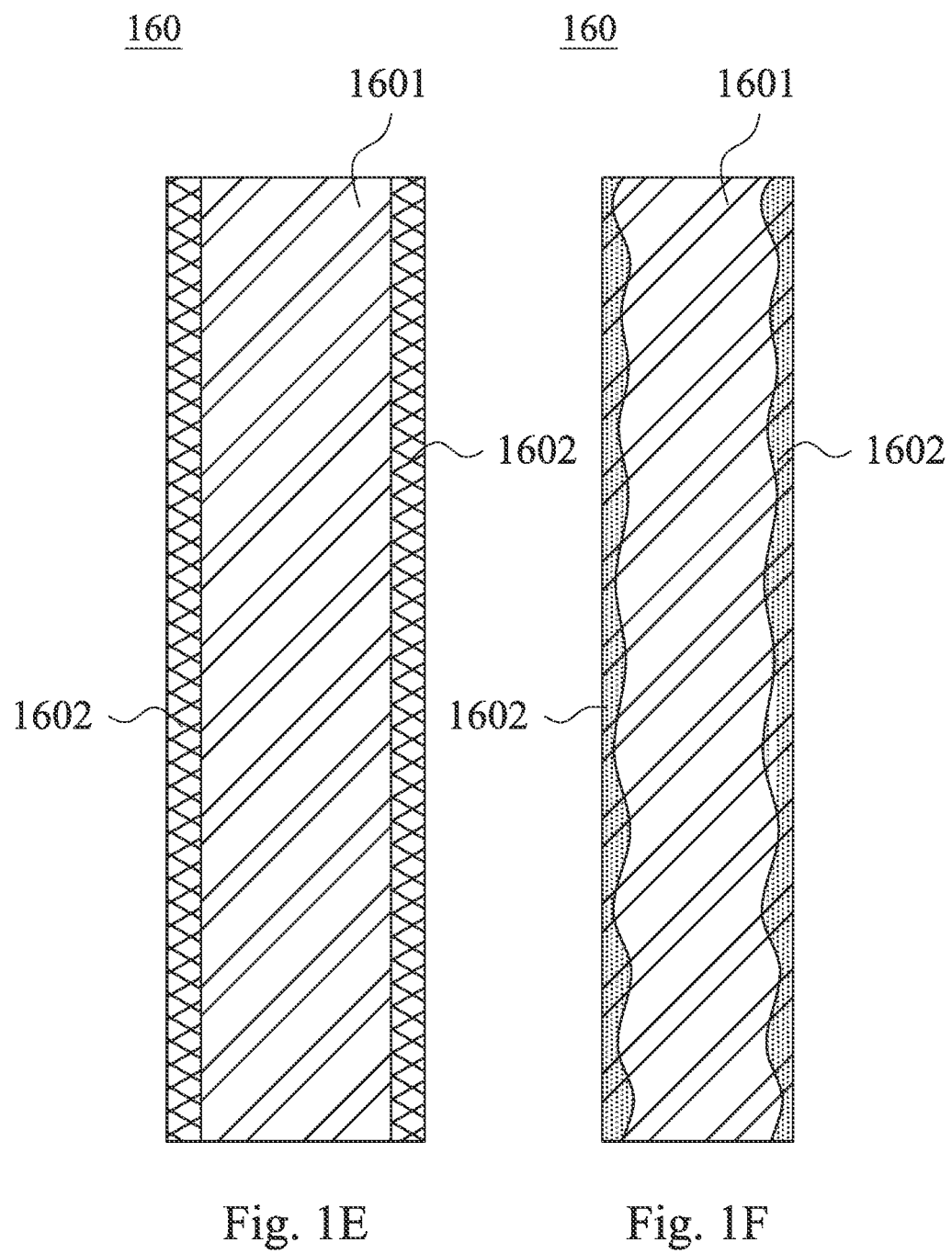

FIG. 1E is a schematic view of a material of the conical-shaped light blocking sheet 160 according to the 1st embodiment of FIG. 1A, FIG. 1F is a schematic view of another material of the conical-shaped light blocking sheet 160 according to the 1st embodiment of FIG. 1A. In FIG. 1E and FIG. 1F, the conical-shaped light blocking sheet 160 can be made of metal material, and can be a metal thin sheet, which can include a main body 1601 and a surface treatment layer 1602. In detail, the main body 1601 of the conical-shaped light blocking sheet 160 can be made of copper, iron, aluminum, titanium, or a composite of a plurality of metals and non-metals, such as Ti-6Al-4V or brass. The conical-shaped light blocking sheet 160 can have magnetic permeability, so that when the imaging lens assembly is assembling, the assembling efficiency can be enhanced by utilizing magnetic attraction. Further, in FIG. 1E, the surface treatment layer 1602 of the conical-shaped light blocking sheet 160 is made of black material, such as Diamond-like carbon coating (DLC), which is coated on two sides of the main body 1601; in FIG. 1F, the surface treatment layer 1602 is treated by quench polish quench process (QPQ), and is located on two sides of the main body 1601. Therefore, the flare can be reduced by reducing the surface reflectivity of the conical-shaped light blocking sheet 160. However, the present disclosure will not be limited to the aforementioned materials, characteristics and processing methods.

Figures 1G, 1H:
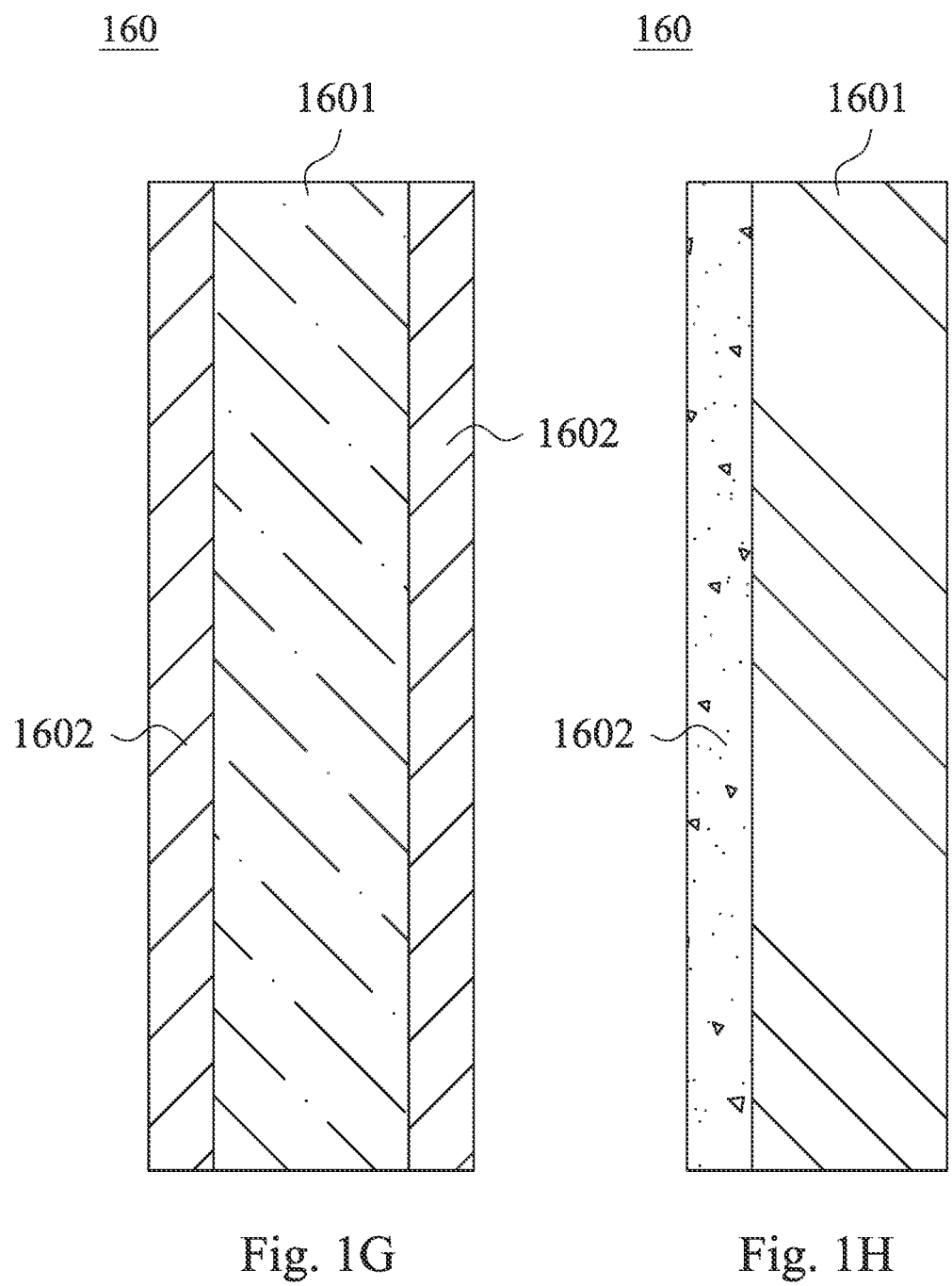

FIG. 1G is a schematic view of further another material of the conical-shaped light blocking sheet 160 according to the 1st embodiment of FIG. 1A, FIG. 1H is a schematic view of yet another material of the conical-shaped light blocking sheet 160 according to the 1st embodiment of FIG. 1A. In FIG. 1G and FIG. 1H, the conical-shaped light blocking sheet 160 is made by plastic material, and can be a plastic thin sheet, which include a main body 1601 and a surface treatment layer 1602. In detail, the main body 1601 of the conical-shaped light blocking sheet 160 can be made of PET, PP or PMMA. Further, in FIG. 1G, the main body 1601 of the conical-shaped light blocking sheet 160 is made of transparent material, and the surface treatment layer 1602 is made of black material which is located on two sides of the main body 1601; in FIG. 1H, the conical-shaped light blocking sheet 160 is made of black material, the surface treatment layer 1602 is a low reflectivity layer which is coated on at least one side of the main body 1601. Therefore, the light blocking effect can be efficiently provided by the conical-shaped light blocking sheet. However, the present disclosure will not be limited to the aforementioned materials, characteristics and processing methods.

Figure 1I:
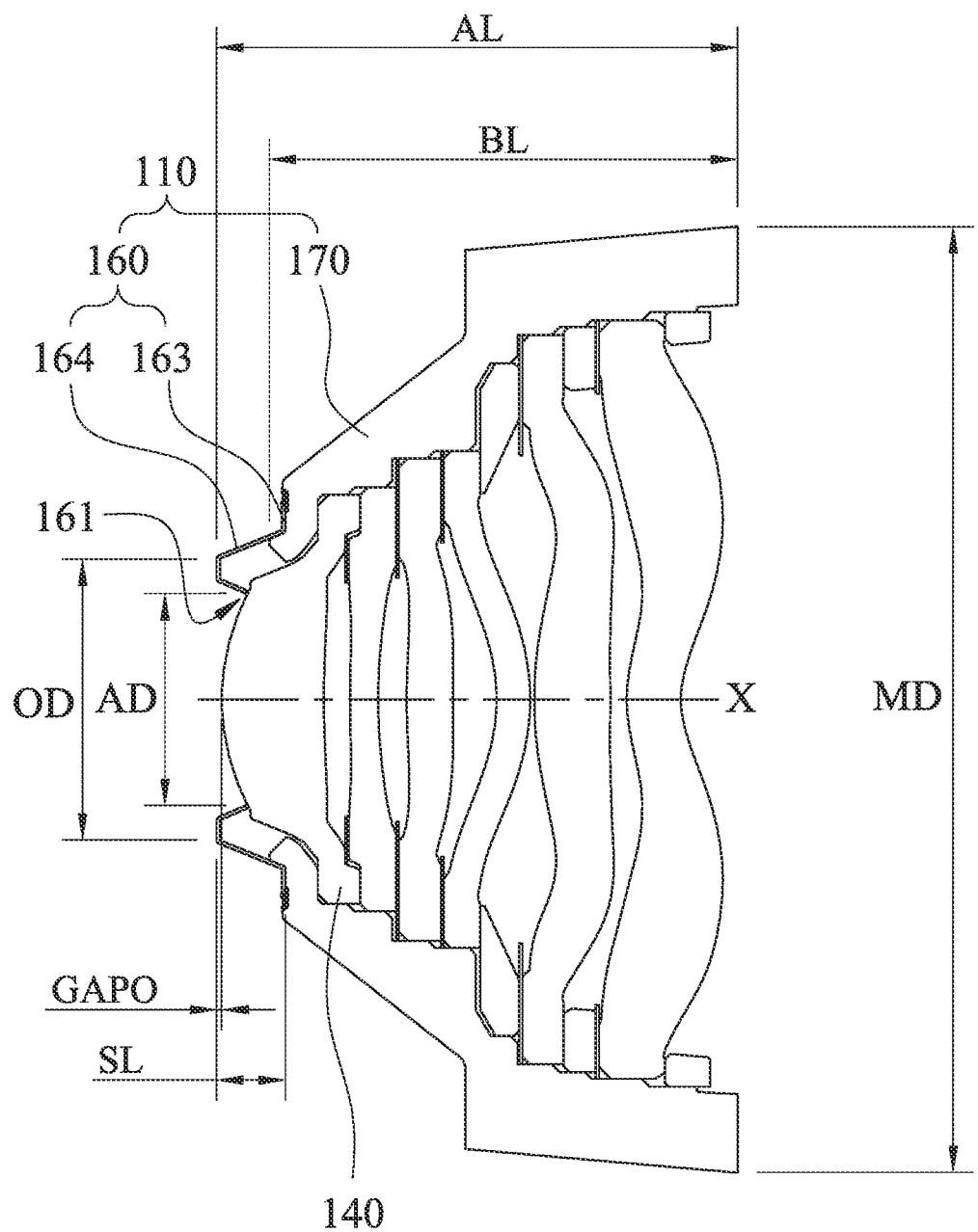

FIG. 1I is a schematic view of parameters of the imaging lens assembly 100 according to the 1st embodiment of FIG. 1A. In FIG. 1A and FIG. 1I, when an angle between the conical portion 164 and the optical axis X is $\theta$, a focal length of the imaging lens assembly 100 is f (not shown in the drawings), a diameter of the object-side opening 161 is AD, a length of the accommodating assembly 110 along the direction parallel to the optical axis is AL, a length of the lens barrel 170 along the direction parallel to the optical axis X is BL, a diameter of the end of the conical portion 164 closest to the object side is OD, a maximum outer diameter of the accommodating assembly 110 is MD, a distance along the direction parallel to the optical axis X between the end of the conical portion 164 closest to the object side and one end of the most object-side optical element 140 closest to the object side is GAPO, and a length of the conical-shaped light blocking sheet 160 along the direction parallel to the optical axis X is SL, the parameters satisfy the following conditions as shown in Table 1.

TABLE 1

| 1st embodiment | |
|---|---|
| $\theta$ (degrees) | 23 |
| f (mm) | 3.27 |

TABLE 1-continued

1st embodiment

| | |
|---|---|
| AD (mm) | 1.45 |
| f/AD | 2.26 |
| AL (mm) | 3.56 |
| BL (mm) | 3.20 |
| (AL − BL)/AL × 100% (%) | 10.1 |
| OD (mm) | 1.92 |
| MD (mm) | 6.47 |
| OD/MD | 0.30 |
| GAPO (mm) | 0.035 |
| SL (mm) | 0.47 |
| GAPO/SL × 100% (%) | 7.4 |

2nd Embodiment

Figure 2A:
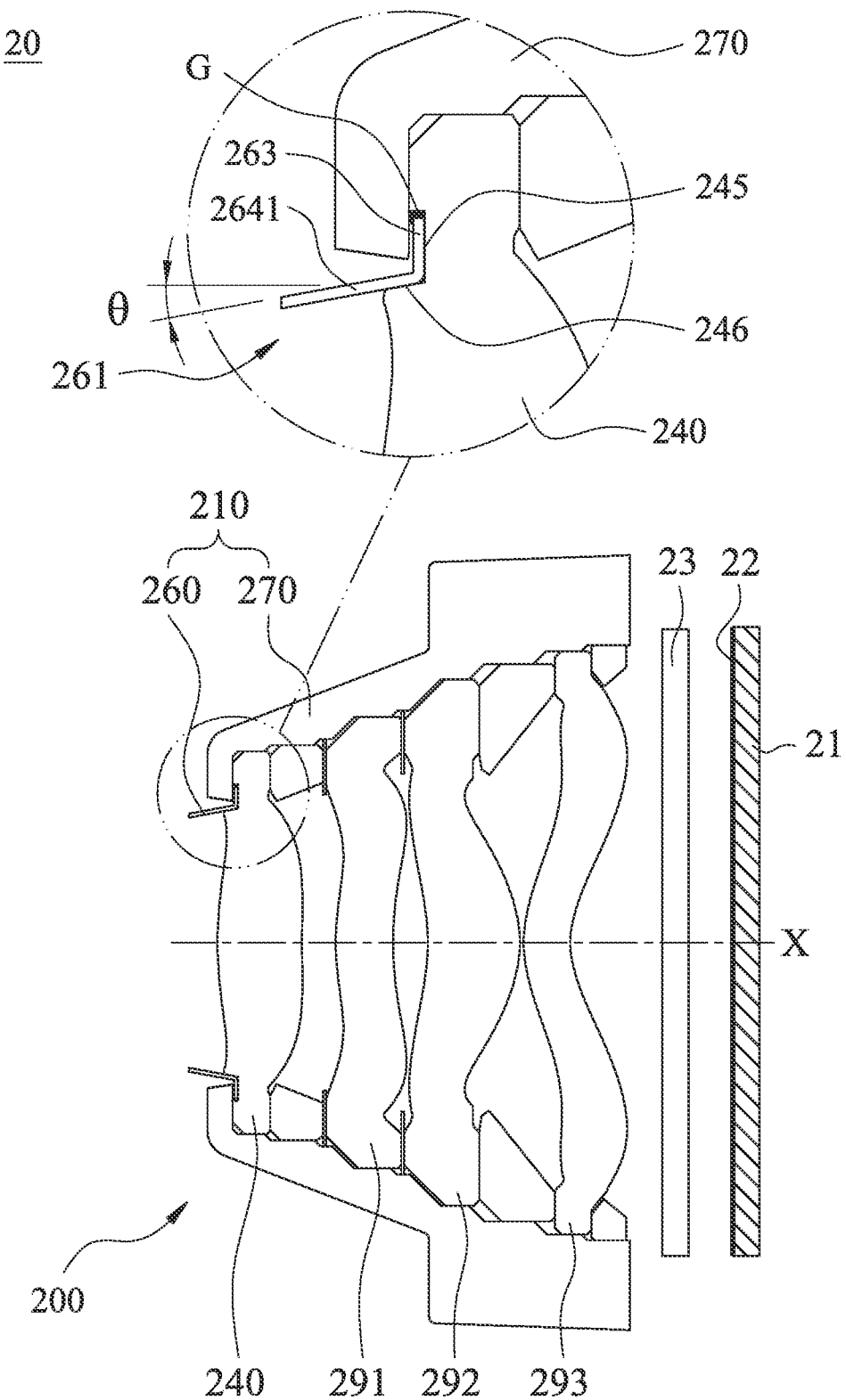
FIG. 2A is a schematic view of an electronic device according to the 2nd embodiment of the present disclosure.

FIG. 2A is a schematic view of an electronic device 20 according to the 2nd embodiment of the present disclosure. In FIG. 2A, the electronic device 20 includes at least one imaging apparatus (its reference numeral is omitted) and an image sensor 21. The imaging apparatus include an imaging lens assembly 200, an image surface 22 and a filter 23. When the imaging apparatus is applied to the electronic device 20, the image sensor 21 can be disposed on the image surface 22 of the imaging apparatus.

Figure 2B:
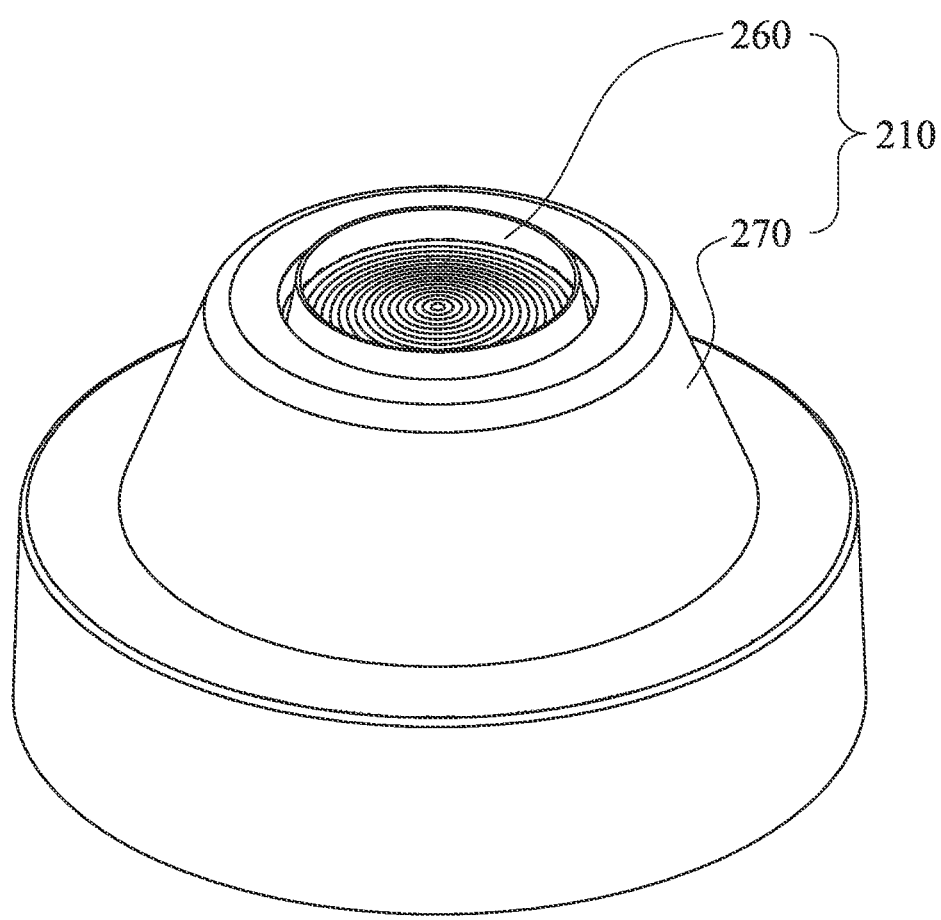
FIG. 2B is a three-dimensional schematic view of the imaging lens assembly according to the 2nd embodiment of FIG. 2A.
Figure 2C:
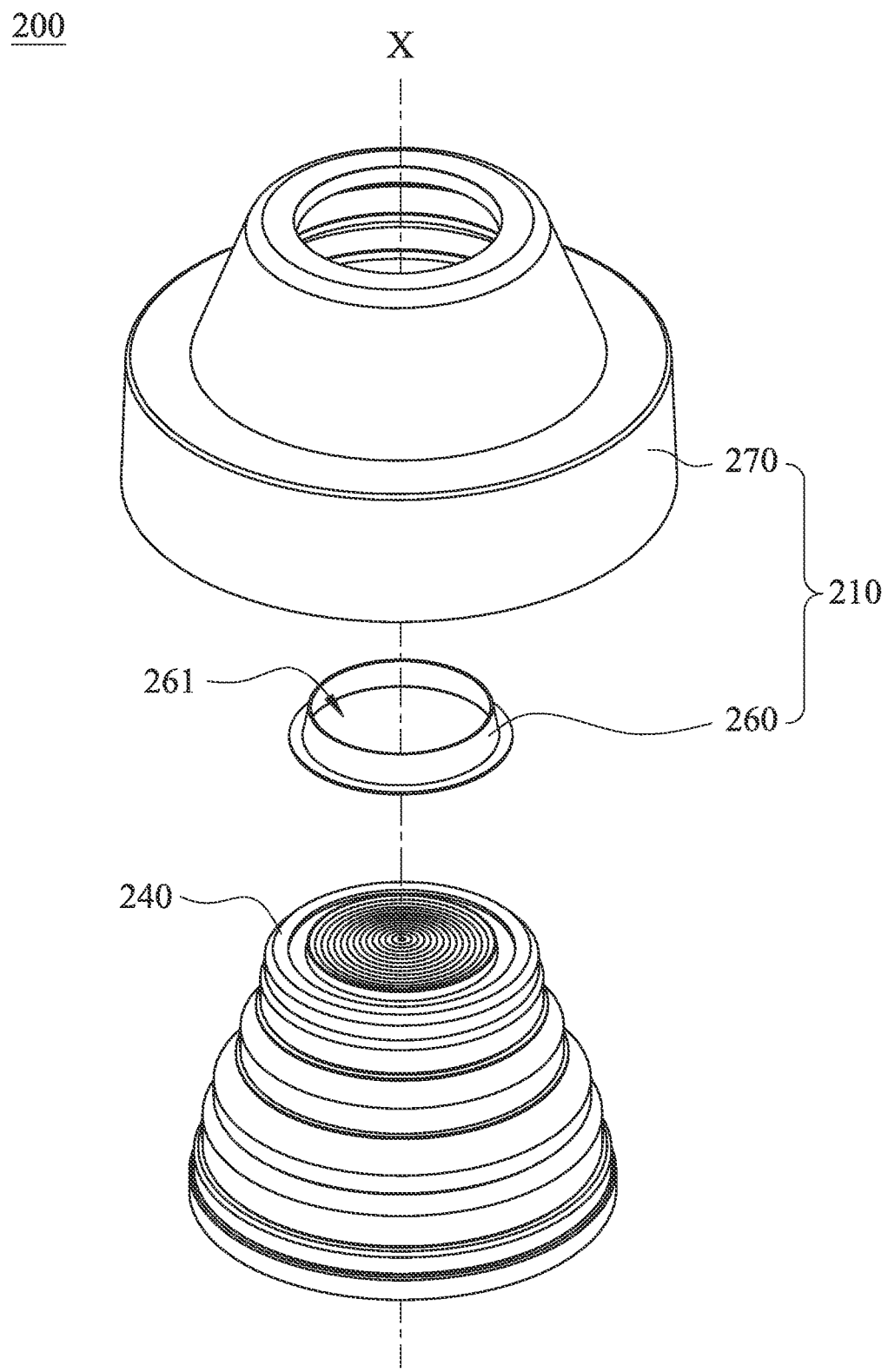
FIG. 2C is an exploded view of the imaging lens assembly according to the 2nd embodiment of FIG. 2A.

FIG. 2B is a three-dimensional schematic view of the imaging lens assembly 200 according to the 2nd embodiment of FIG. 2A, FIG. 2C is an exploded view of the imaging lens assembly 200 according to the 2nd embodiment of FIG. 2A. In FIG. 2B and FIG. 2C, the imaging lens assembly 200 has an optical axis X, and includes a plurality of optical elements (its reference numeral is omitted) and an accommodating assembly 210. The optical axis X passes through the optical elements, and the accommodating assembly 210 surrounds the optical axis X and contains the optical elements.

Figure 2D:
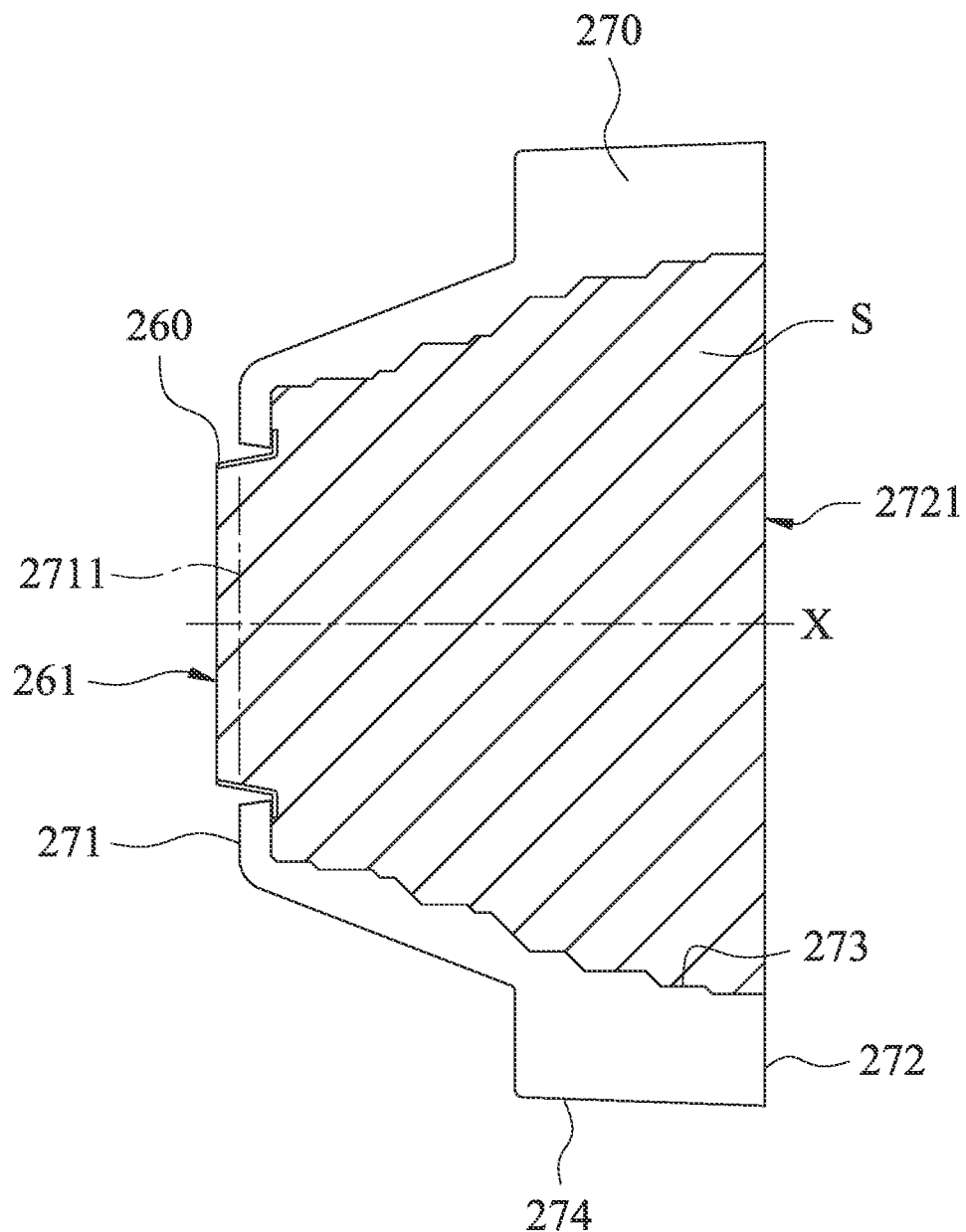
FIG. 2D is a schematic view of the accommodating assembly according to the 2nd embodiment of FIG. 2A.
Figure 2E:
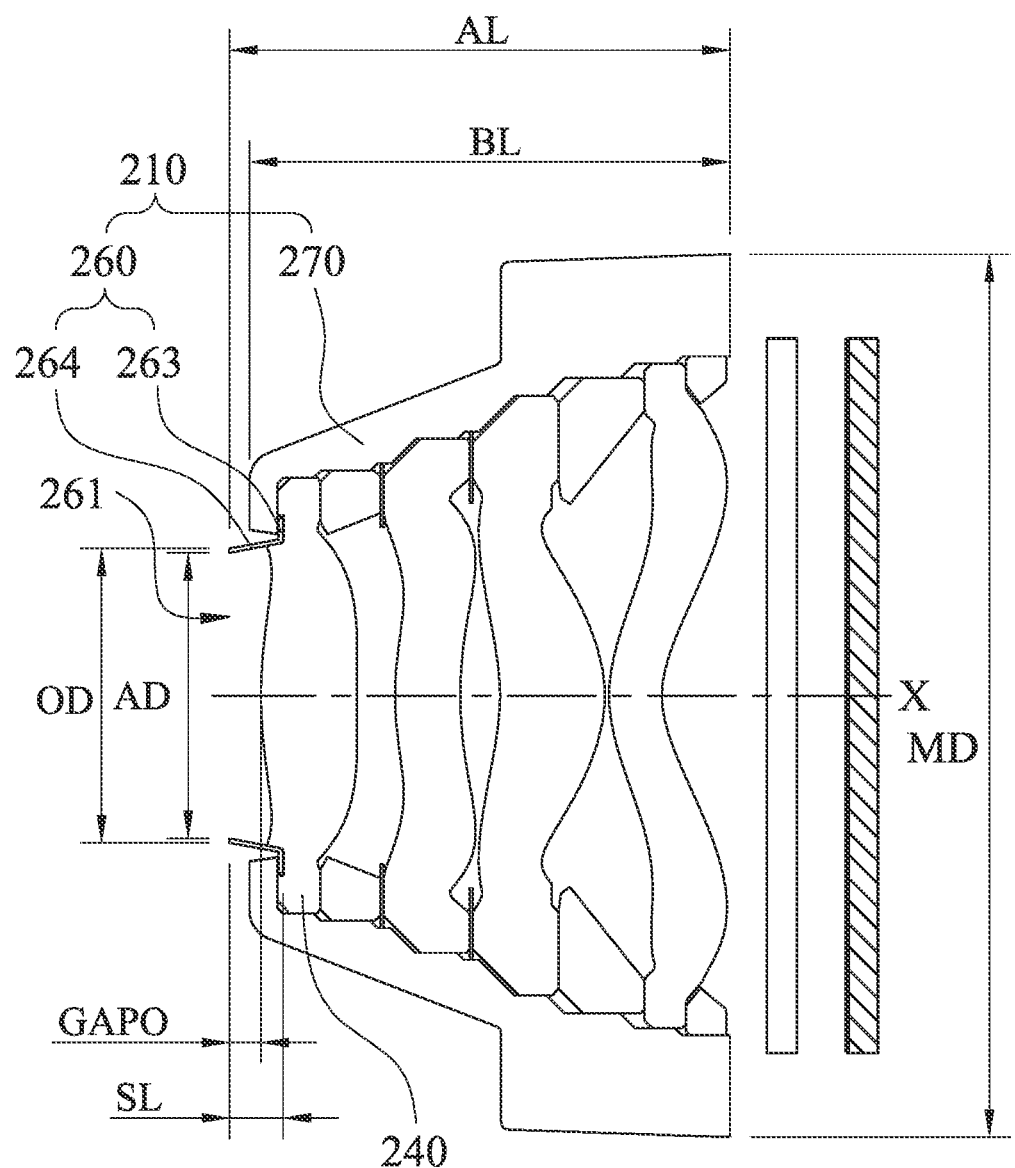
FIG. 2E is a schematic view of parameters of the imaging lens assembly according to the 2nd embodiment of FIG. 2A.

FIG. 2D is a schematic view of the accommodating assembly 210 according to the 2nd embodiment of FIG. 2A. In FIG. 2A to FIG. 2D, the accommodating assembly 210 includes a conical-shaped light blocking sheet 260 and a lens barrel 270. The conical-shaped light blocking sheet 260 has an opening. In the 2nd embodiment, the opening of the conical-shaped light blocking sheet 260 is an object-side opening 261, and the optical axis X passes through the object-side opening 261. The lens barrel 270 is located on an image side of a conical portion 264 (as shown in FIG. 2E) of the conical-shaped light blocking sheet 260.

The conical-shaped light blocking sheet 260 includes an out-side portion 263 and the conical portion 264. The out-side portion 263 defines an outer periphery (its reference numeral is omitted) of the conical-shaped light blocking sheet 260 and surrounds the object-side opening 261. The conical portion 264 forms the object-side opening 261 and is connected to the out-side portion 263, wherein the conical portion 264 includes a conical structure 2641, and the conical structure 2641 is tapered from the out-side portion 263 toward an object-side along the optical axis X.

The lens barrel 270 includes an object-side wall 271, an image-side wall 272, an inner-side wall 273 and an outer-side wall 274. The object-side wall 271 has an object-side through hole 2711 which is allowing the optical axis X to pass through and faces towards an object side of the imaging lens assembly 200. The image-side wall 272 has an image-side through hole 2721 which is allowing the optical axis X to pass through and faces towards an image side of the imaging lens assembly 200. The inner-side wall 273 surrounds and faces towards the optical axis X, and the inner-side wall 273 connects the object-side wall 271 and the image-side wall 272. The outer-side wall 274 is farther away from the optical axis X than the inner-side wall 273 to the optical axis X and connects the object-side wall 271 and the image-side wall 272.

The accommodating assembly 210 defines an inner space S. The inner space S extends from the image-side through hole 2721 of the lens barrel 270 to an end of the conical portion 264 closest to the object side along a direction parallel to the optical axis X and is surrounded by the inner-side wall 273. Therefore, the optical elements can be disposed in the inner space S of the accommodating assembly 210.

Further, in FIG. 2A, the optical elements include a most object-side optical element 240 and at least two optical elements disposed in the inner space S. According to the 2nd embodiment, a number of the optical elements is 9, which includes 4 lens elements, in order from the object side to the image side is, the most object-side optical element 240 and lens elements 291, 292, 293, wherein the most object-side optical element 240 is also a lens element. However, the optical characteristics, such as the amount, structure, surface shape, can be arranged on demand, or can further dispose others optical elements, which will not be limited thereto.

In FIG. 2A, the out-side portion 263 is fixed at only one of the lens barrel 270 and the most object-side optical element 240, and the conical-shaped light blocking sheet 260 is physically contacted with only one of the lens barrel 270 and the most object-side optical element 240. Therefore, the generation of deformation of the conical-shaped light blocking sheet, such as compression or warpage, caused by pressing stress can be avoided, so that the tolerance stack-up can be reduced caused by assembling so as to maintain the image quality. Specifically, according to the 2nd embodiment, the conical-shaped light blocking sheet 260 is physically contacted with the most object-side optical element 240, and the out-side portion 263 of the conical-shaped light blocking sheet 260 can be fixed on the object side of the most object-side optical element 240 via a glue G, but the present disclosure will not be limited thereto.

Further, the object-side opening 261 of the conical-shaped light blocking sheet 260 can be disposed on one end of the conical portion 264 closest to the object side. Therefore, the total track length of the imaging lens assembly 200 can be reduced so as to improve the tilt of the setting and optical axis offsets of the imaging lens assembly 200.

The imaging lens assembly 200 can further include a joint surface, which is disposed on one of the lens barrel 270, the object side of the most object-side optical element 240 and the image side of the most image-side optical element, and disposed relatively to the out-side portion 263 of the conical-shaped light blocking sheet 260. In the 2nd embodiment, the most object-side optical element 240 of the imaging lens assembly 200 can further include a joint surface, which is a second joint surface 245. The second joint surface 245 is disposed on an object side of the most object-side optical element 240 and disposed opposite to the out-side portion 263 of the conical-shaped light blocking sheet 260, wherein the conical-shaped light blocking sheet 260 and the most object-side optical element 240 are physically contacted to each other, and the out-side portion 263 of the conical-shaped light blocking sheet 260 is fixed to the second joint surface 245.

The imaging lens assembly 200 can further include a conical surface disposed on one of the lens barrel 270, the object side of the most object-side optical element 240 and the image side of the most image-side optical element, and disposed relatively to the conical structure 2641 of the conical-shaped light blocking sheet 260, wherein the conical surface and the conical structure 2641 are physically contacted with each other, and the conical-shaped light blocking sheet 260, the lens barrel 270, and the optical elements are aligned along the optical axis X. In the 2nd embodiment, the most object-side optical element 240 of the imaging lens assembly 200 can include a second conical surface 246, that is, the second conical surface 246 is the conical surface included in the imaging lens assembly 200. The second conical surface 246 is disposed on the object side of the most object-side optical element 240 and disposed opposite to the conical structure 2641 of the conical-shaped light blocking sheet 260, wherein the conical portion 264 and the second conical surface 246 are physically contacted to each other, and the conical-shaped light blocking sheet 260 is aligned with the lens barrel 270. The conical-shaped light blocking sheet 260 can be embedded with the most object-side optical element 240.

The conical-shaped light blocking sheet 260 can be made of metal material or plastic material, and is similar with the material of the conical-shaped light blocking sheet 160 according to the 1st embodiment, which will not repeated herein.

FIG. 2E is a schematic view of parameters of the imaging lens assembly 200 according to the 2nd embodiment of FIG. 2A. In FIG. 2A and FIG. 2E, when an angle between the conical portion 264 and the optical axis X is θ, a focal length of the imaging lens assembly 200 is f (not shown in the drawings), a diameter of the object-side opening 261 is AD, a length of the accommodating assembly 210 along the direction parallel to the optical axis X is AL, a length of the lens barrel 270 along the direction parallel to the optical axis X is BL, a diameter of the end of the conical portion 264 closest to the object side is OD, a maximum outer diameter of the accommodating assembly 210 is MD, a distance along the direction parallel to the optical axis X between the end of the conical portion 264 closest to the object side and one end of the most object-side optical element 240 closest to the object side is GAPO, and a length of the conical-shaped light blocking sheet 260 along the direction parallel to the optical axis X is SL, the parameters satisfy the following conditions as shown in Table 2.

TABLE 2

| 2nd embodiment | |
|---|---|
| θ (degrees) | 10.5 |
| f (mm) | 2.51 |
| AD (mm) | 2.00 |
| f/AD | 1.26 |
| AL (mm) | 3.50 |
| BL (mm) | 3.36 |
| (AL − BL)/AL × 100% (%) | 4.0 |
| OD (mm) | 2.06 |
| MD (mm) | 6.18 |
| OD/MD | 0.33 |
| GAPO (mm) | 0.22 |
| SL (mm) | 0.375 |
| GAPO/SL × 100% (%) | 58.7 |

3rd Embodiment

Figure 3A:
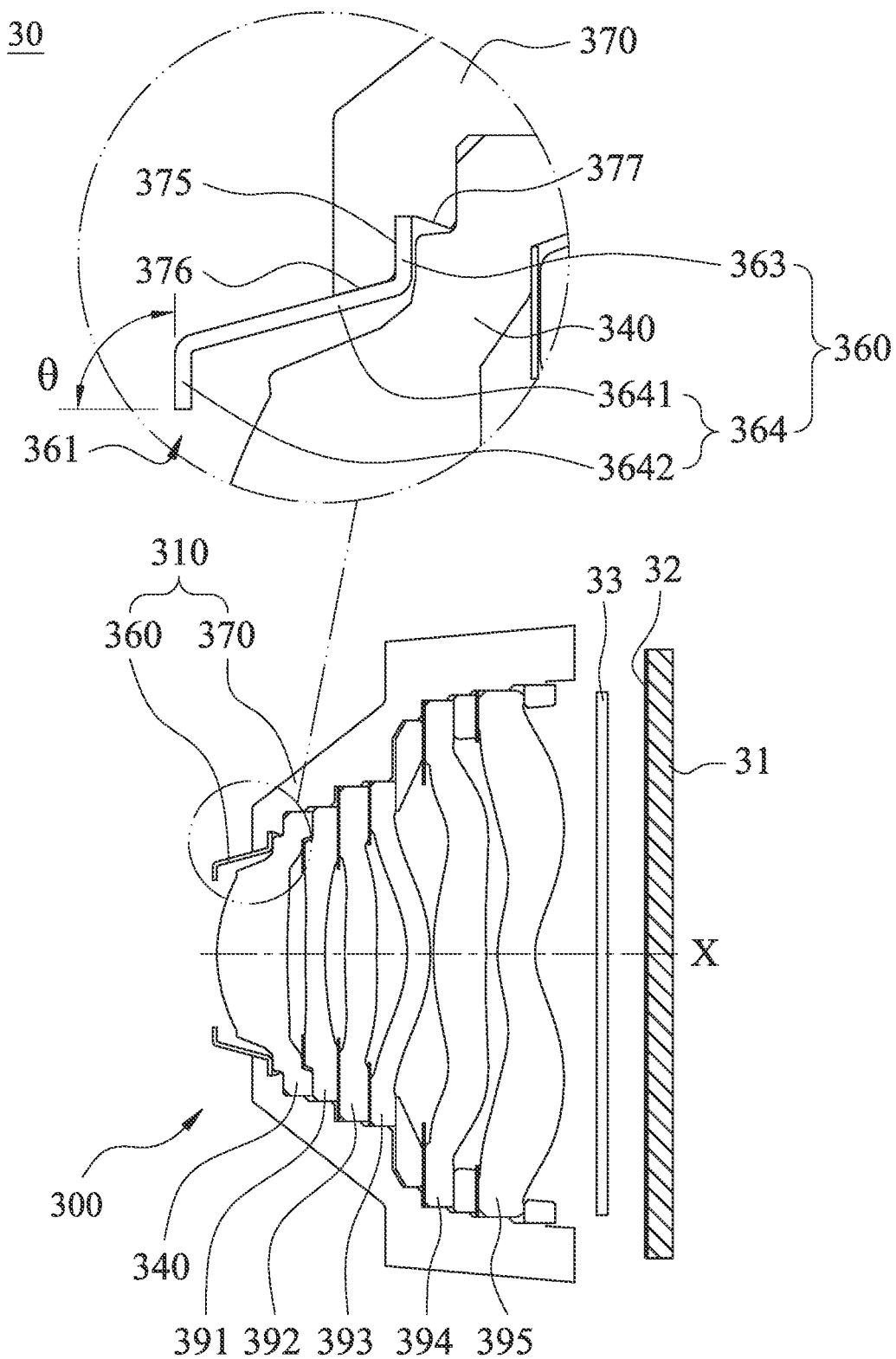
FIG. 3A is a schematic view of an electronic device according to the 3rd embodiment of the present disclosure.

FIG. 3A is a schematic view of an electronic device 30 according to the 3rd embodiment of the present disclosure. In FIG. 3A, the electronic device 30 includes at least one imaging apparatus (its reference numeral is omitted) and an image sensor 31. The imaging apparatus include an imaging lens assembly 300, an image surface 32 and a filter 33. When the imaging apparatus is applied to the electronic device 30, the image sensor 31 can be disposed on the image surface 32 of the imaging apparatus.

Figure 3B:
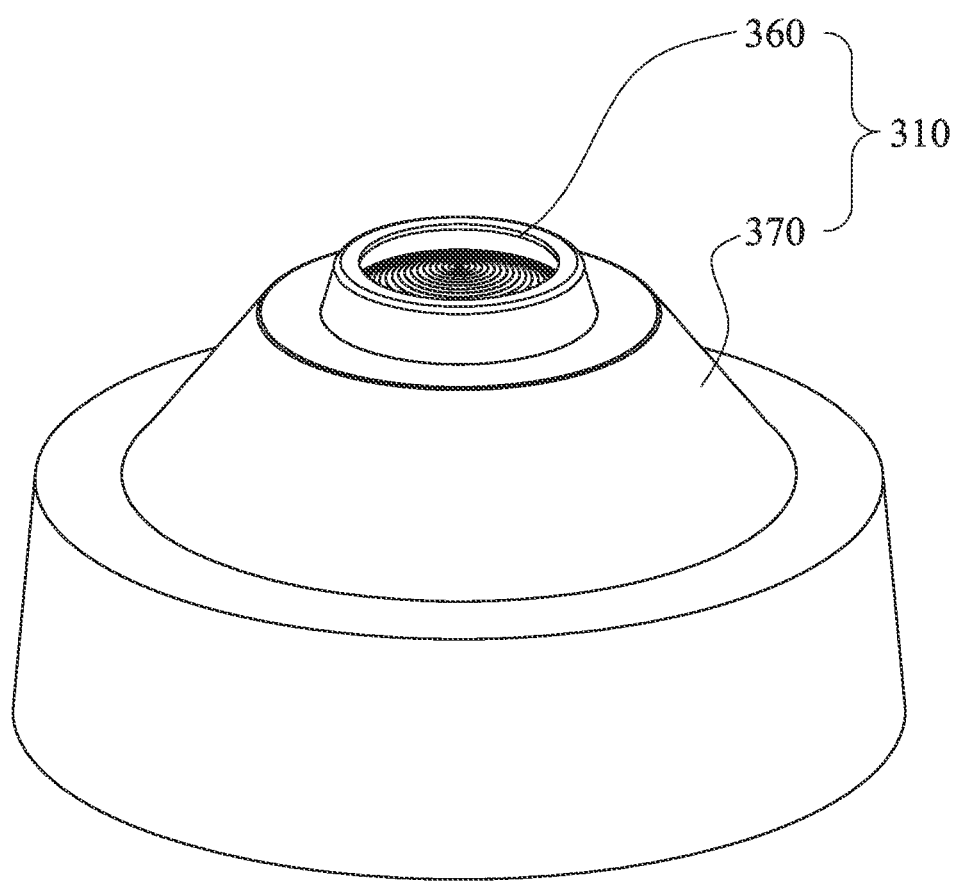
FIG. 3B is a three-dimensional schematic view of the imaging lens assembly according to the 3rd embodiment of FIG. 3A.
Figure 3C:
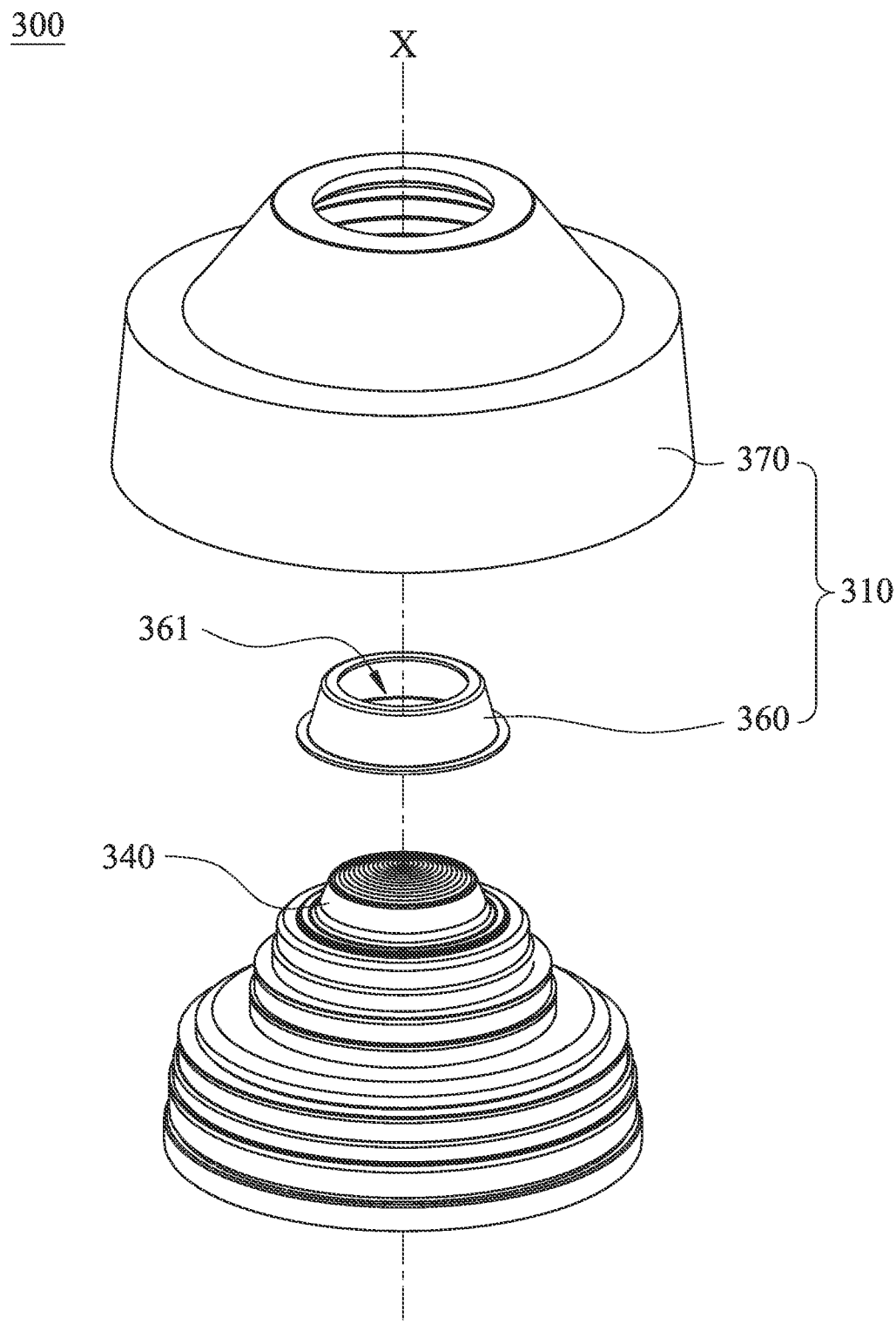
FIG. 3C is an exploded view of the imaging lens assembly according to the 3rd embodiment of FIG. 3A.

FIG. 3B is a three-dimensional schematic view of the imaging lens assembly 300 according to the 3rd embodiment of FIG. 3A, FIG. 3C is an exploded view of the imaging lens assembly 300 according to the 3rd embodiment of FIG. 3A. In FIG. 3B and FIG. 3C, the imaging lens assembly 300 has an optical axis X, and includes a plurality of optical elements (its reference numeral is omitted) and an accommodating assembly 310. The optical axis X passes through the optical elements, and the accommodating assembly 310 surrounds the optical axis X and contains the optical elements.

Figure 3D:
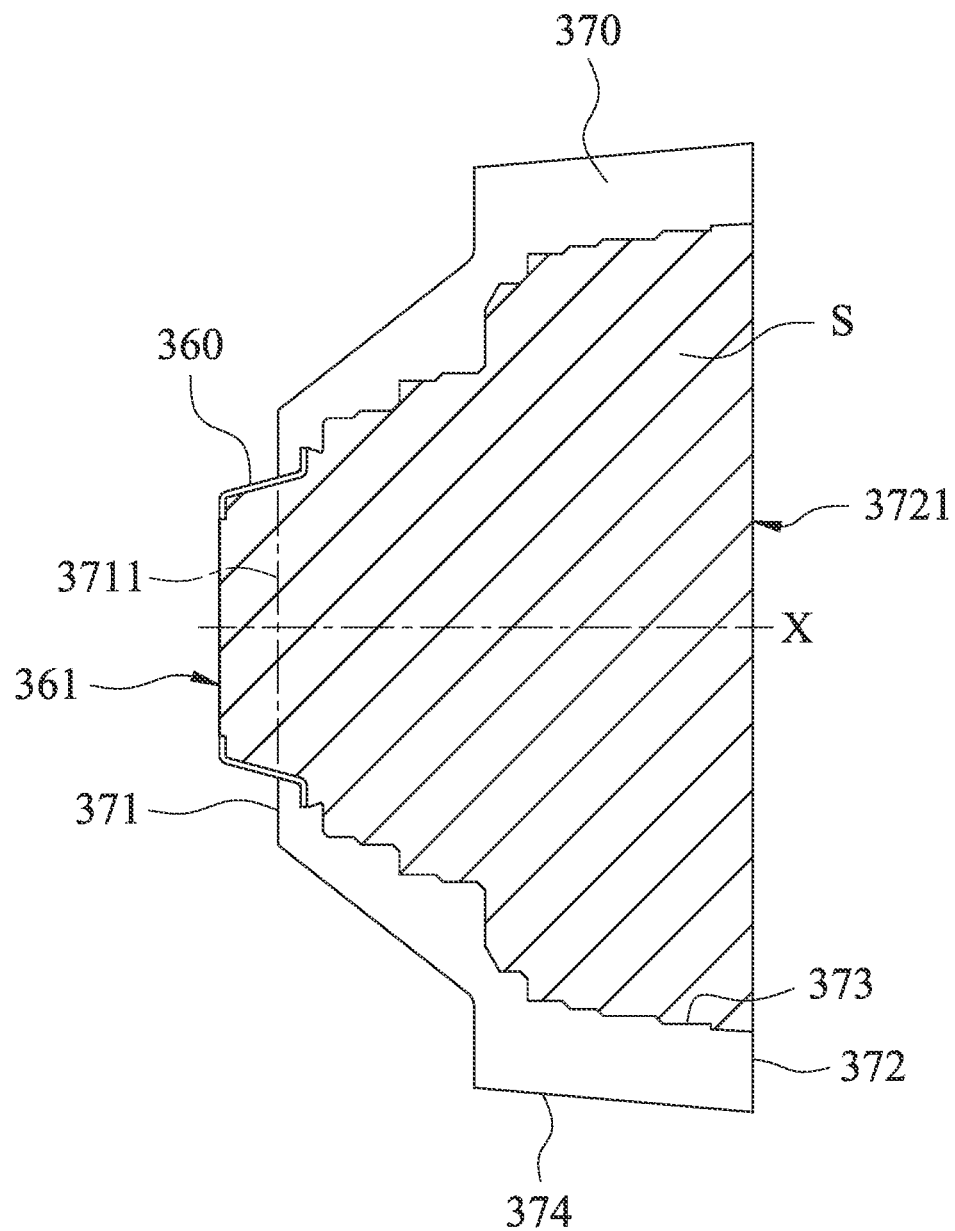
FIG. 3D is a schematic view of the accommodating assembly according to the 3rd embodiment of FIG. 3A.

FIG. 3D is a schematic view of the accommodating assembly 310 according to the 3rd embodiment of FIG. 3A. In FIG. 3A to FIG. 3D, the accommodating assembly 310 includes a conical-shaped light blocking sheet 360 and a lens barrel 370. The conical-shaped light blocking sheet 360 has an object-side opening 361, the optical axis X passes through the object-side opening 361, and the lens barrel 370 is disposed on an image side of the conical portion 364 of the conical-shaped light blocking sheet 360.

The conical-shaped light blocking sheet 360 includes an out-side portion 363 and the conical portion 364. The out-side portion 363 defines an outer periphery (its reference numeral is omitted) of the conical-shaped light blocking sheet 360 and surrounds the object-side opening 361. The conical portion 364 forms the object-side opening 361 and is connected to the out-side portion 363, wherein the conical portion 364 includes a conical structure 3641, and the conical structure 3641 is tapered from the out-side portion 363 toward an object-side along the optical axis X.

The lens barrel 370 includes an object-side wall 371, an image-side wall 372, an inner-side wall 373 and an outer-side wall 374. The object-side wall 371 has an object-side through hole 3711 which is allowing the optical axis X to pass through and faces towards an object side of the imaging lens assembly 300. The image-side wall 372 has an image-side through hole 3721 which is allowing the optical axis X to pass through and faces towards an image side of the imaging lens assembly 300. The inner-side wall 373 surrounds and faces towards the optical axis X, and the inner-side wall 373 connects the object-side wall 371 and the image-side wall 372. The outer-side wall 374 is farther away from the optical axis X than the inner-side wall 373 to the optical axis X and connects the object-side wall 371 and the image-side wall 372.

The accommodating assembly 310 defines an inner space S. The inner space S extends from the image-side through hole 3721 of the lens barrel 370 to an end of the conical portion 364 closest to the object side along a direction parallel to the optical axis X and is surrounded by the inner-side wall 373. Therefore, the optical elements can be disposed in the inner space S of the accommodating assembly 310.

Further, in FIG. 3A, the optical elements include a most object-side optical element 340 and at least two optical elements disposed in the inner space S. According to the 3rd embodiment, a number of the optical elements is 14, which includes 6 lens elements, in order from the object side to the image side is, the most object-side optical element 340 and lens elements 391, 392, 393, 394, 395, wherein the most object-side optical element 340 is also a lens element. However, the optical characteristics, such as the amount, structure, surface shape, can be arranged on demand, or can further dispose others optical elements, which will not be limited thereto.

Further, the out-side portion 363 of the conical-shaped light blocking sheet 360 is fixed at only one of the lens barrel 370 and the most object-side optical element 340, and the conical-shaped light blocking sheet 360 is physically contacted with only one of the lens barrel 370 and the most object-side optical element 340. Specifically, according to the 3rd embodiment, the out-side portion 363 of the conical-shaped light blocking sheet 360 is fixed at the lens barrel 370, and is physically contacted with the lens barrel 370. Therefore, the generation of deformation of the conical-shaped light blocking sheet, such as compression or warpage, caused by pressing stress can be avoided, so that the tolerance stack-up can be reduced caused by assembling so as to maintain the image quality.

The conical portion 364 of the conical-shaped light blocking sheet 360 can further include an object-side structure 3642, which is disposed on the end of the conical portion 364 closest to the object side and perpendicular to the optical axis X, and one end of the object-side structure 3642 far away from the optical axis X is connected to an object side of the conical structure 3642. Therefore, the effect of the conical-shaped light blocking sheet 360 for protecting the most object-side optical element 340 can be enhanced.

In the 3rd embodiment, the object-side opening 361 of the conical-shaped light blocking sheet 360 can be disposed on the end of the conical portion 364 closest to the object side. Therefore, the total track length of the imaging lens assembly 300 can be reduced so as to improve the tilt of the setting and optical axis offsets of the imaging lens assembly.

The lens barrel 370 of the imaging lens assembly 300 can further include a first joint surface 375, which is disposed on an object side of the lens barrel 370 and disposed opposite to the out-side portion 363 of the conical-shaped light blocking sheet 360, wherein the conical-shaped light blocking sheet 360 and the lens barrel 370 are physically contacted to each other, and the out-side portion 363 of the conical-shaped light blocking sheet 360 is fixed to the first joint surface 375.

Further, the lens barrel 370 of the imaging lens assembly 300 can further include a first conical surface 376, which is disposed on the object side of the lens barrel 370 and disposed opposite to the conical structure 3641 of the conical-shaped light blocking sheet 360. In detail, the first conical surface 376 and the conical structure 3641 are physically contacted to each other, and the conical-shaped light blocking sheet 360 is aligned with the lens barrel 370. Therefore, the conical-shaped light blocking sheet 360 and the lens barrel 370 are embedded and aligned to each other via the first conical surface 376 and the conical structure 3641.

The lens barrel 370 can further include a first undercut surface 377. The first undercut surface 377 surrounds the optical axis X, and is extended and shrunken along a direction from one end of the first joint surface 375 far from the optical axis farther away from the first joint surface 375. The first undercut surface 377 is for fixing the conical-shaped light blocking sheet 360. In detail, the first undercut surface 377 can be abutted against the out-side portion 363 of the conical-shaped light blocking sheet 360 so as to fix the conical-shaped light blocking sheet 360, but the present disclosure will not be limited thereto. Therefore, it is favorable for enhancing the efficiency of the production by reducing the assembling process of the conical-shaped light blocking sheet via the dispensing connection.

The conical-shaped light blocking sheet 360 can be made of metal material or plastic material, and is similar with the material of the conical-shaped light blocking sheet 160 according to the 1st embodiment, which will not repeated herein.

Figure 3E:
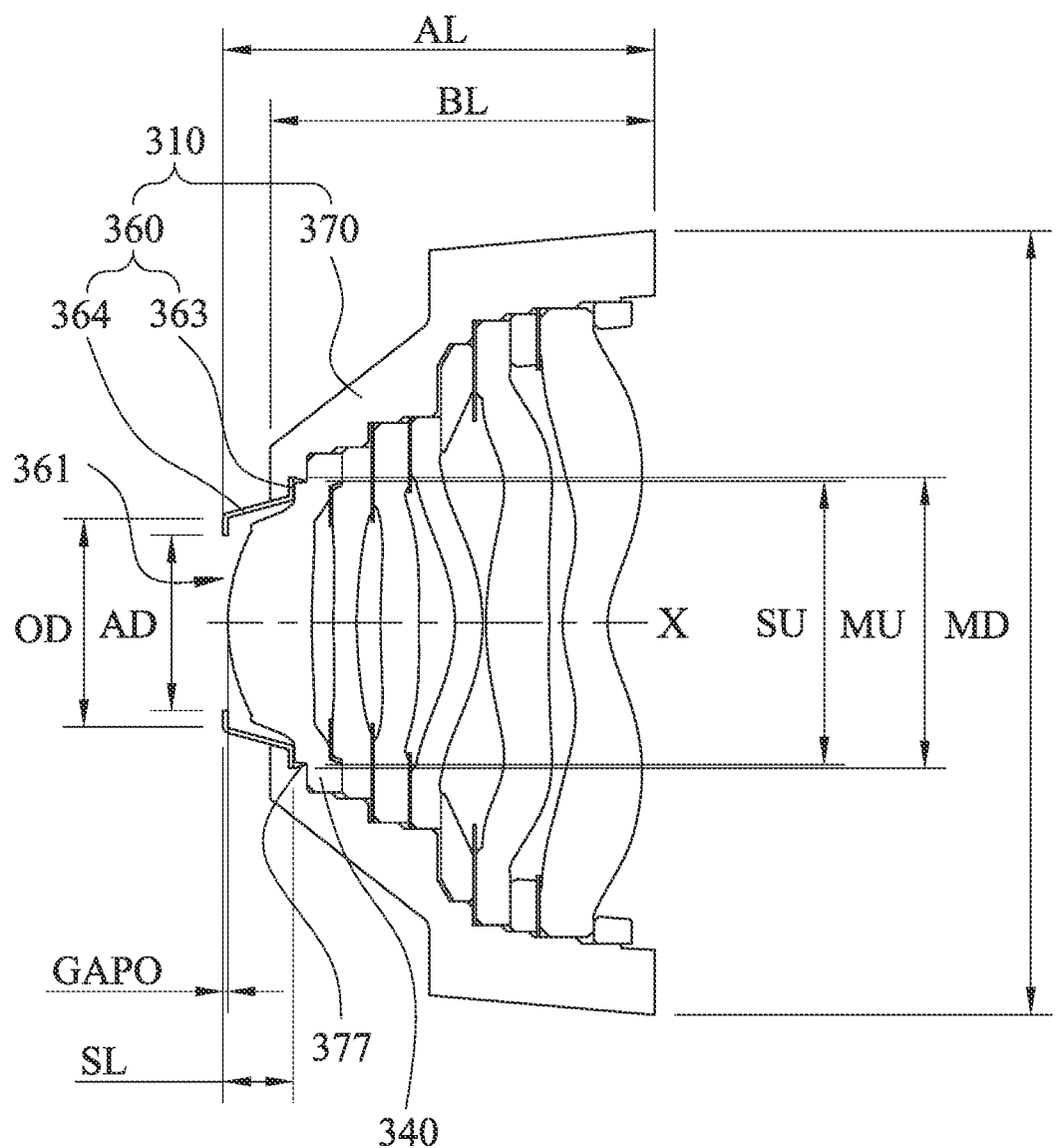
FIG. 3E is a schematic view of parameters of the imaging lens assembly according to the 3rd embodiment of FIG. 3A.

FIG. 3E is a schematic view of parameters of the imaging lens assembly 300 according to the 3rd embodiment of FIG. 3A. In FIG. 3A and FIG. 3E, when an angle between the conical portion 364 and the optical axis X is θ, a focal length of the imaging lens assembly 300 is f (not shown in the drawings), a diameter of the object-side opening 361 is AD, a length of the accommodating assembly 310 along the direction parallel to the optical axis X is AL, a length of the lens barrel 370 along the direction parallel to the optical axis X is BL, a diameter of the end of the conical portion 364 closest to the object side is OD, a maximum outer diameter of the accommodating assembly 310 is MD, a distance along the direction parallel to the optical axis X between the end of the conical portion 364 closest to the object side and one end of the most object-side optical element 340 closest to the object side is GAPO, a length of the conical-shaped light blocking sheet 360 along the direction parallel to the optical axis X is SL, a maximum diameter of the first undercut surface 377 along a direction perpendicular to the optical axis X is MU, and a minimum diameter of the first undercut surface 377 along the direction perpendicular to the optical axis X is SU, the parameters satisfy the following conditions as shown in Table 3.

TABLE 3

| 3rd embodiment | |
|---|---|
| θ (degrees) | 90 |
| f (mm) | 3.27 |
| AD (mm) | 1.45 |
| f/AD | 2.26 |
| AL (mm) | 3.56 |
| BL (mm) | 3.17 |
| (AL − BL)/AL × 100% (%) | 11.0 |
| OD (mm) | 1.72 |
| MD (mm) | 6.47 |
| OD/MD | 0.27 |
| GAPO (mm) | 0.04 |
| SL (mm) | 0.58 |
| GAPO/SL × 100% (%) | 6.9 |
| MU (mm) | 2.40 |
| SU (mm) | 2.34 |
| (MU − SU)/SU × 100% (%) | 2.5 |

4th Embodiment

Figure 4A:
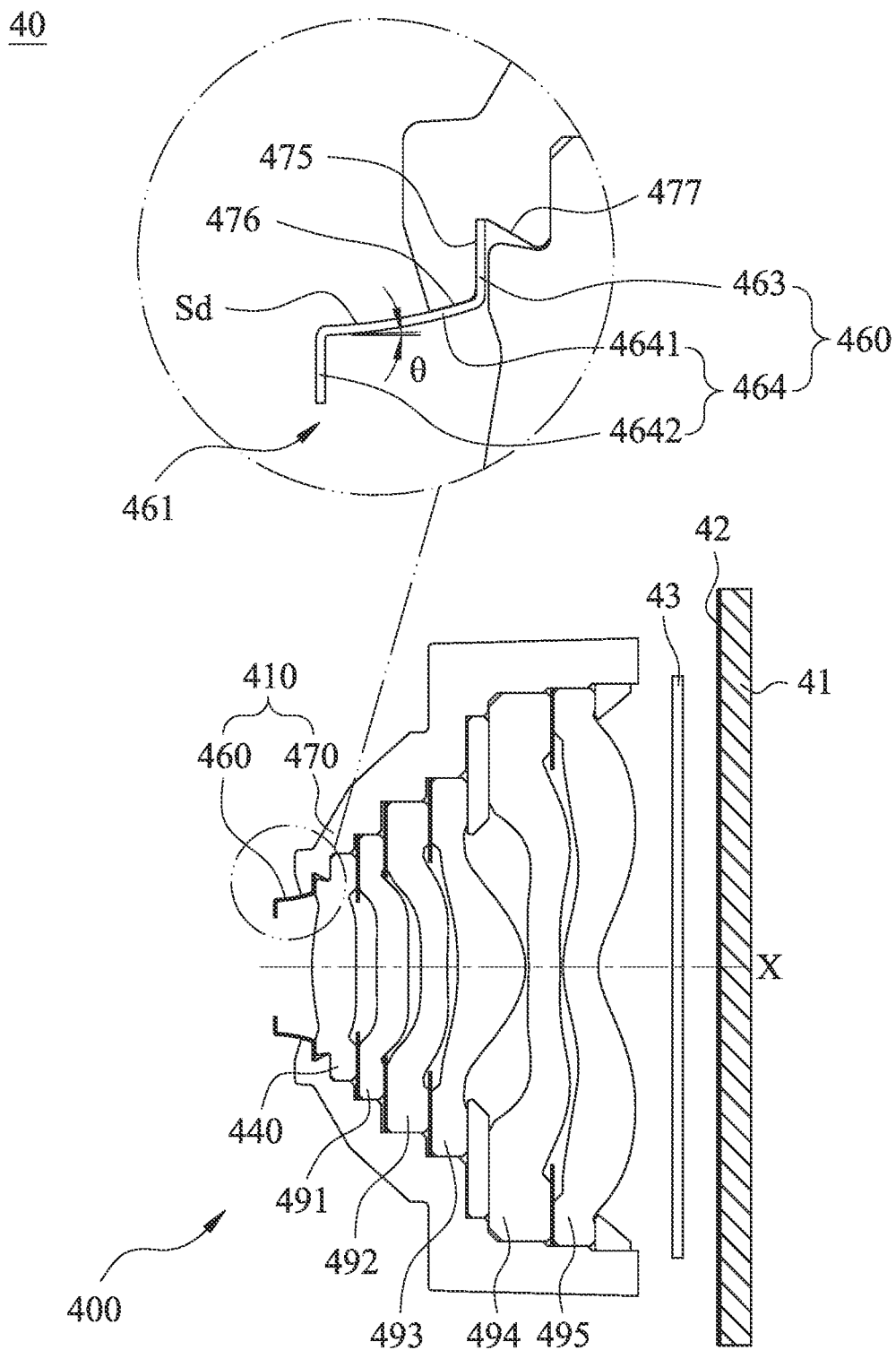
FIG. 4A is a schematic view of an electronic device according to the 4th embodiment of the present disclosure.

FIG. 4A is a schematic view of an electronic device 40 according to the 4th embodiment of the present disclosure. In FIG. 4A, the electronic device 40 includes at least one imaging apparatus (its reference numeral is omitted) and an image sensor 41. The imaging apparatus includes an imaging lens assembly 400, an image surface 42 and a filter 43. When the imaging apparatus is applied to the electronic device 40, the image sensor 41 can be disposed on the image surface 42 of the imaging apparatus. Specifically, the imaging lens assembly 400 has an optical axis X, and includes a plurality of optical elements (its reference numeral is omitted) and an accommodating assembly 410. The optical axis X passes through the optical elements, and the accommodating assembly 410 surrounds the optical axis X and contains the optical elements.

Figure 4B:
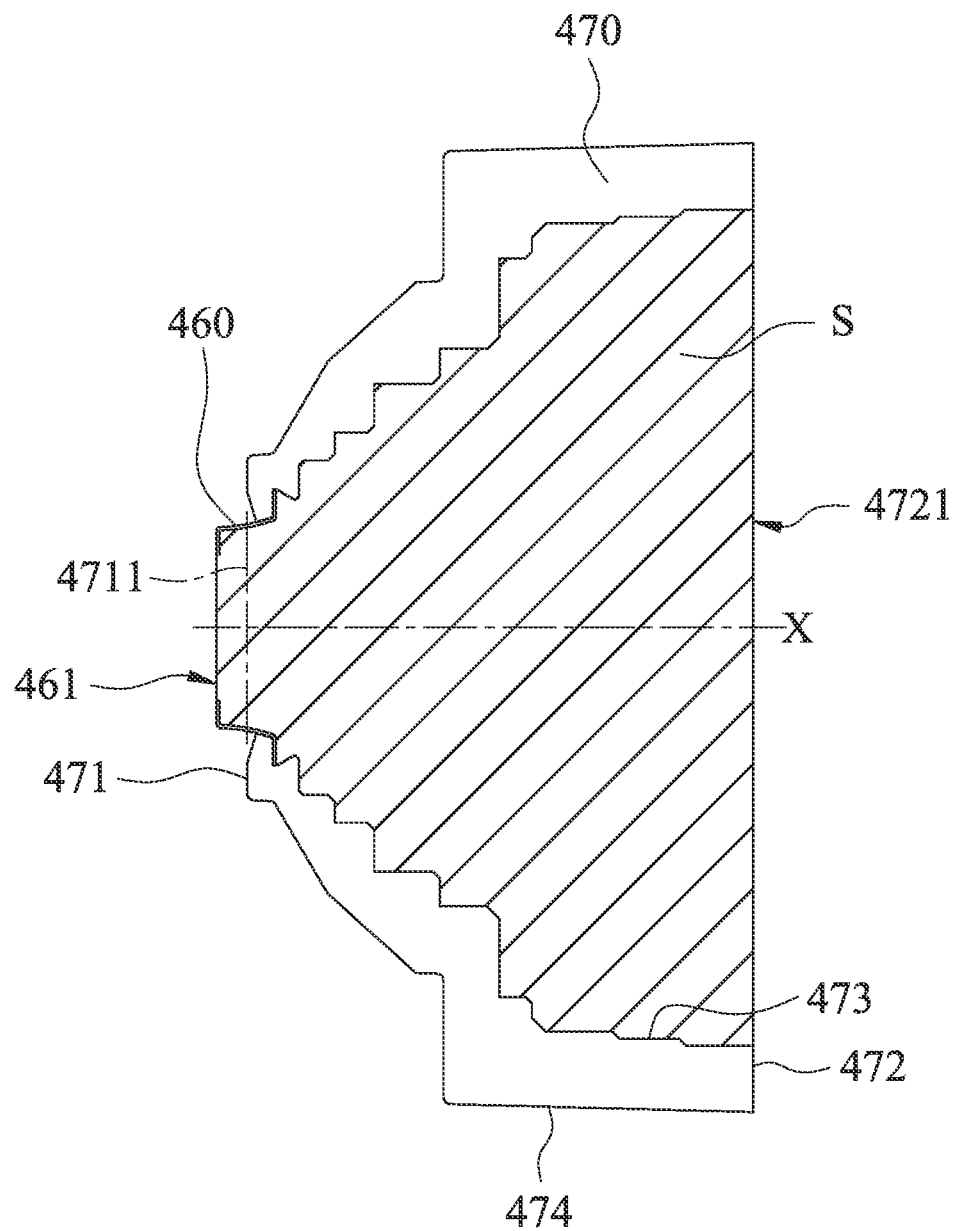
FIG. 4B is a schematic view of the accommodating assembly according to the 4th embodiment of FIG. 4A.

FIG. 4B is a schematic view of the accommodating assembly 410 according to the 4th embodiment of FIG. 4A.

In FIG. 4A and FIG. 4B, the accommodating assembly 410 includes a conical-shaped light blocking sheet 460 and a lens barrel 470. The conical-shaped light blocking sheet 460 has an object-side opening 461, the optical axis X passes through the object-side opening 461, and the lens barrel 470 is disposed on an image side of the conical portion 464 of the conical-shaped light blocking sheet 460.

The conical-shaped light blocking sheet 460 includes an out-side portion 463 and the conical portion 464. The out-side portion 463 defines an outer periphery (its reference numeral is omitted) of the conical-shaped light blocking sheet 460 and surrounds the object-side opening 461. The conical portion 464 forms the object-side opening 461 and is connected to the out-side portion 463, wherein the conical portion 464 includes a conical structure 4641, and the conical structure 4641 is tapered from the out-side portion 463 toward an object-side along the optical axis X.

The lens barrel 470 includes an object-side wall 471, an image-side wall 472, an inner-side wall 473 and an outer-side wall 474. The object-side wall 471 has an object-side through hole 4711 which is allowing the optical axis X to pass through and faces towards an object side of the imaging lens assembly 400. The image-side wall 472 has an image-side through hole 4721 which is allowing the optical axis X to pass through and faces towards an image side of the imaging lens assembly 400. The inner-side wall 473 surrounds and faces towards the optical axis X, and the inner-side wall 473 connects the object-side wall 471 and the image-side wall 472. The outer-side wall 474 is farther away from the optical axis X than the inner-side wall 473 to the optical axis X and connects the object-side wall 471 and the image-side wall 472.

The accommodating assembly 410 defines an inner space S. The inner space S extends from the image-side through hole 4721 of the lens barrel 470 to an end of the conical portion 464 closest to the object side along a direction parallel to the optical axis X and is surrounded by the inner-side wall 473. Therefore, the optical elements can be disposed in the inner space S of the accommodating assembly 410.

In FIG. 4A, the optical elements include a most object-side optical element 440 and at least two optical elements disposed in the inner space S. According to the 4th embodiment, a number of the optical elements is 12, which includes 6 lens elements, in order from the object side to the image side is, the most object-side optical element 440 and lens elements 491, 492, 493, 494, 495, wherein the most object-side optical element 440 is also a lens element. However, the optical characteristics, such as the amount, structure, surface shape, can be arranged on demand, or can further dispose others optical elements, which will not be limited thereto.

Further, the out-side portion 463 is fixed at only one of the lens barrel 470, and the conical-shaped light blocking sheet 460 is physically contacted with only one of the lens barrel 470. Therefore, the generation of deformation of the conical-shaped light blocking sheet, such as compression or warpage, caused by pressing stress can be avoided, so that the tolerance stack-up can be reduced caused by assembling so as to maintain the image quality.

The conical portion 464 of the conical-shaped light blocking sheet 460 can further include an object-side structure 4642, which is disposed on the end of the conical portion 464 closest to the object side and perpendicular to the optical axis X, and one end of the object-side structure 4642 far away from the optical axis X is connected to an object side of the conical structure 4642. Therefore, the effect of the conical-shaped light blocking sheet 460 for protecting the most object-side optical element 440 can be enhanced.

The conical portion 464 of the conical-shaped light blocking sheet 460 can further include at least one double-curved surface Sd. Specifically, according to the 4th embodiment, the double-curved surface Sd is the surface of the conical structure 4641, and the double-curved surface Sd is annular-shaped, but the present disclosure will not be limited thereto. Therefore, when the conical-shaped light blocking sheet 460 is forced by the stress along the direction of the optical axis X, it is favorable for reducing the risk of the generation of the permanent deformation thereon.

In the 4th embodiment, the object-side opening 461 of the conical-shaped light blocking sheet 460 can be disposed on the end of the conical portion 464 closest to the object side. Therefore, the total track length of the imaging lens assembly 400 can be reduced so as to improve the tilt of the setting and optical axis offsets thereof.

The lens barrel 470 of the imaging lens assembly 400 can further include a first joint surface 475, which is disposed on an object side of the lens barrel 470 and disposed opposite to the out-side portion 463 of the conical-shaped light blocking sheet 460, wherein the conical-shaped light blocking sheet 460 and the lens barrel 470 are physically contacted to each other, and the out-side portion 463 of the conical-shaped light blocking sheet 460 is fixed to the first joint surface 475.

Further, the lens barrel 470 of the imaging lens assembly 400 can further include a first conical surface 476, which is disposed on the object side of the lens barrel 470 and disposed opposite to the conical structure 4641 of the conical-shaped light blocking sheet 460. In detail, the first conical surface 476 and the conical structure 4641 are physically contacted to each other, and the conical-shaped light blocking sheet 460 is aligned with the lens barrel 470. Therefore, the conical-shaped light blocking sheet 460 and the lens barrel 470 are embedded and aligned to each other via the first conical surface 476 and the conical structure 4641.

The lens barrel 470 can further include a first undercut surface 477. The first undercut surface 477 surrounds the optical axis X, and is extended and shrunken along a direction from one end of the first joint surface 475 far from the optical axis farther away from the first joint surface 475. The first undercut surface 477 is for fixing the conical-shaped light blocking sheet 460. In detail, the first undercut surface 477 can be abutted against the out-side portion 463 of the conical-shaped light blocking sheet 460 so as to fix the conical-shaped light blocking sheet 460, but the present disclosure will not be limited thereto. Therefore, it is favorable for enhancing the efficiency of the production by reducing the assembling process of the conical-shaped light blocking sheet via the dispensing connection.

The conical-shaped light blocking sheet 460 can be made of metal material or plastic material, and is similar with the material of the conical-shaped light blocking sheet 160 according to the 1st embodiment, which will not be repeated herein.

Figure 4C:
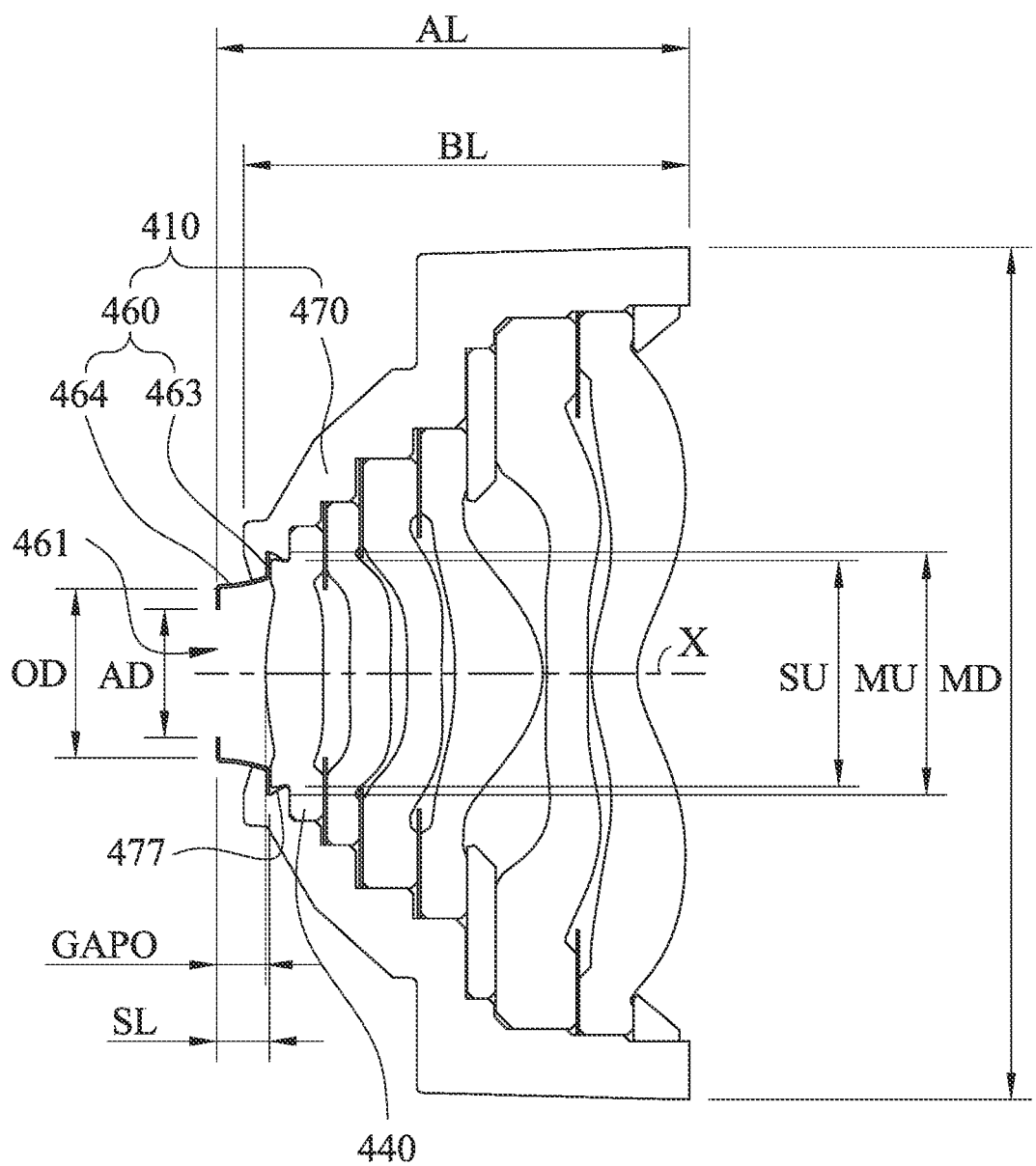
FIG. 4C is a schematic view of parameters of the imaging lens assembly according to the 4th embodiment of FIG. 4A.

FIG. 4C is a schematic view of parameters of the imaging lens assembly 400 according to the 4th embodiment of FIG. 4A. In FIG. 4A and FIG. 4C, when an angle between the conical portion 464 and the optical axis X is θ, a focal length of the imaging lens assembly 400 is f (not shown in the drawings), a diameter of the object-side opening 461 is AD, a length of the accommodating assembly 410 along the direction parallel to the optical axis X is AL, a length of the lens barrel 470 along the direction parallel to the optical axis X is BL, a diameter of the end of the conical portion 464 closest to the object side is OD, a maximum outer diameter of the accommodating assembly 410 is MD, a distance along the direction parallel to the optical axis X between the end of the conical portion 464 closest to the object side and one end of the most object-side optical element 440 closest to the object side is GAPO, a length of the conical-shaped light blocking sheet 460 along the direction parallel to the optical axis X is SL, a maximum diameter of the first undercut surface 477 along a direction perpendicular to the optical axis X is MU, and a minimum diameter of the first undercut surface 477 along the direction perpendicular to the optical axis X is SU, the parameters satisfy the following conditions as shown in Table 4.

TABLE 4

4th embodiment

| | |
|---|---|
| θ (degrees) | 2 |
| f (mm) | 2.70 |
| AD (mm) | 1.05 |
| f/AD | 2.57 |
| AL (mm) | 3.85 |
| BL (mm) | 3.63 |
| (AL − BL)/AL × 100% (%) | 5.7 |
| OD (mm) | 1.38 |
| MD (mm) | 6.95 |
| OD/MD | 0.20 |
| GAPO (mm) | 0.40 |
| SL (mm) | 0.43 |
| GAPO/SL × 100% (%) | 93.0 |
| MU (mm) | 1.98 |
| SU (mm) | 1.84 |
| (MU − SU)/SU × 100% (%) | 7.1 |

5th Embodiment

Figure 5A:
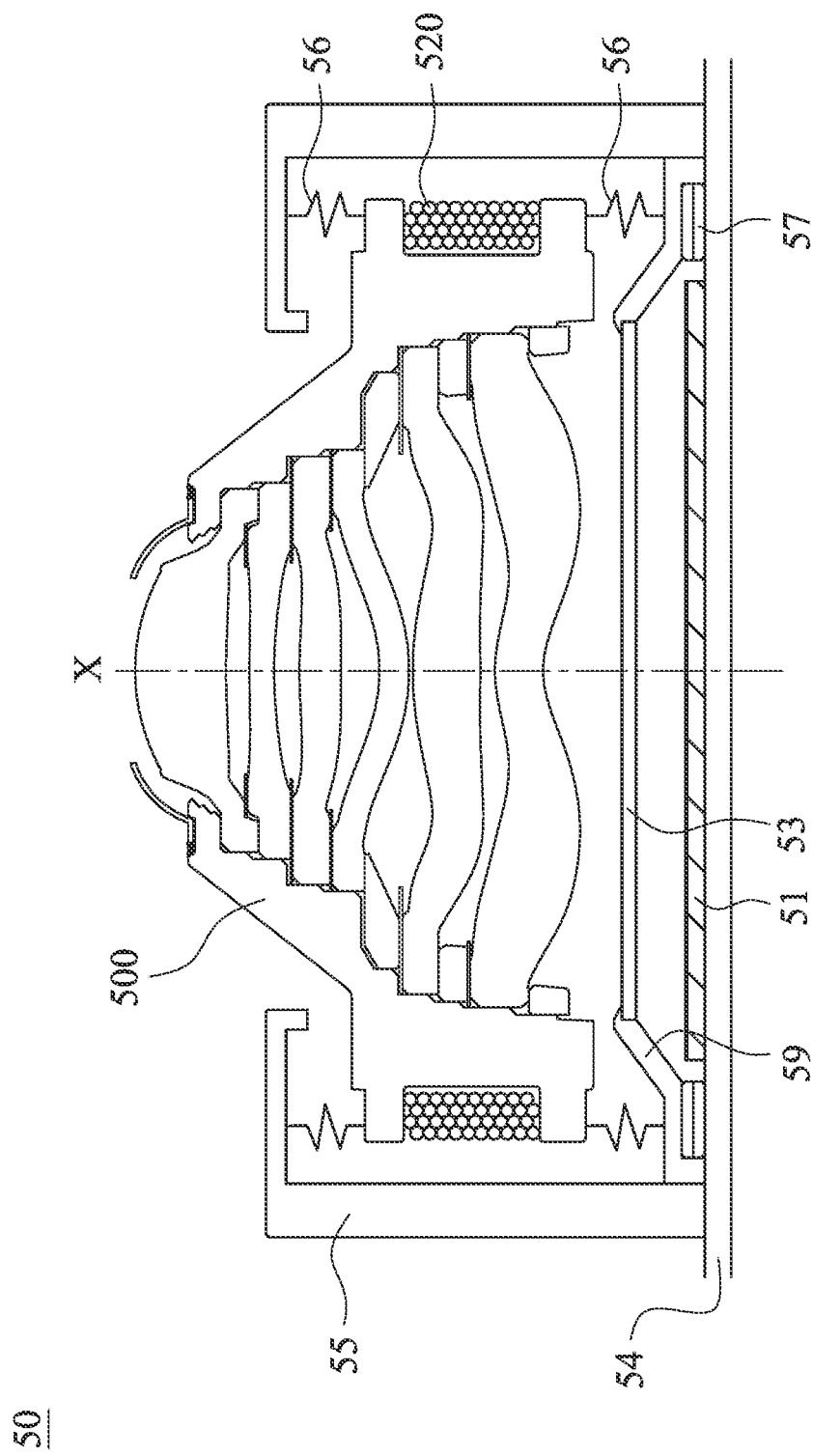
FIG. 5A is a schematic view of an electronic device according to the 5th embodiment of the present disclosure.
Figure 5B:
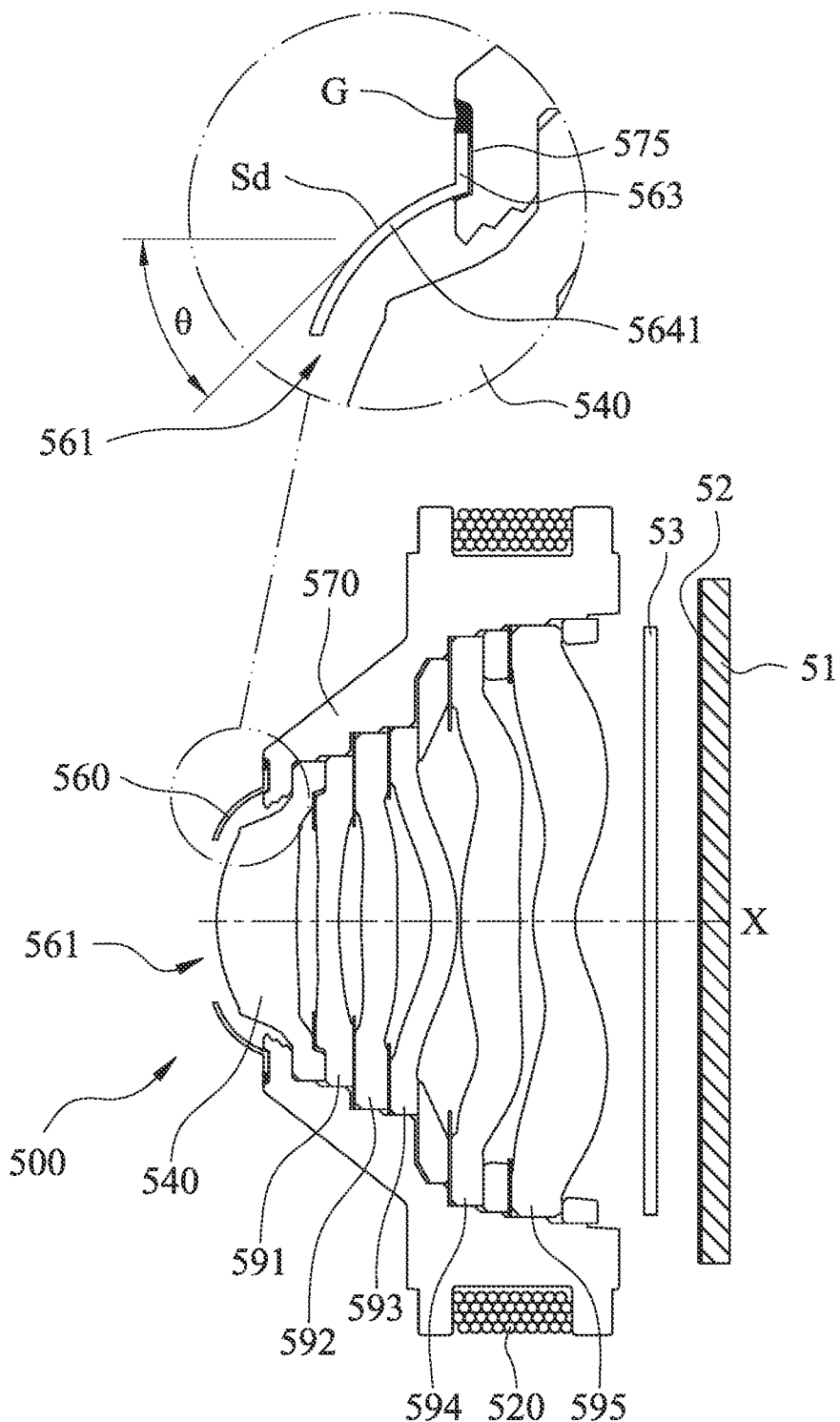
FIG. 5B is another schematic view of the electronic device according to the 5th embodiment of FIG. 5A.

FIG. 5A is a schematic view of an electronic device 50 according to the 5th embodiment of the present disclosure, and FIG. 5B is another schematic view of the electronic device 50 according to the 5th embodiment of FIG. 5A. In FIG. 5A and FIG. 5B, the electronic device 50 includes at least one imaging apparatus (its reference numeral is omitted), an image sensor 51 and a circuit board 54. The imaging apparatus includes an imaging lens assembly 500, an image surface 52 and a filter 53. When the imaging apparatus is applied to the electronic device the image sensor 51 can be disposed on the image surface 52 of the imaging apparatus. The circuit board 54 is electrically connected to the imaging apparatus so as to control the imaging apparatus. According to the 5th embodiment, a number of the imaging apparatus is one, which further include a lens carrier 55.

In the 5th embodiment, the lens carrier 55 includes a plurality of elastic elements 56, at least one magnetic element 57 and a filter carrier 59. Specifically, in FIG. 5A, the elastic elements 56 are connected with the lens carrier and the imaging lens assembly 500, which is for restricting the imaging lens assembly 500. The filter carrier 59 is located on an image side of the lens carrier which can contain the filter 53.

In FIG. 5B, the imaging lens assembly 500 has an optical axis X, and includes a plurality of optical elements (its reference numeral is omitted) and an accommodating assembly 510. The optical axis X passes through the optical elements, and the accommodating assembly 510 surrounds the optical axis X and contains the optical elements. According to the 5th embodiment, the imaging lens assembly 500 further includes at least one coil 520, but will not be limited thereto. The coil 520 can be disposed on the outer-side wall 574 (labelled in FIG. 5C) of the lens barrel 570 and symmetrically disposed along the optical axis X. The imaging lens assembly 500 can be moved along the direction of the optical axis X by cooperating the coil 520 with the magnetic element 57 of the lens carrier 55. Therefore, it is favorable for achieving the auto-focusing function by forming a one-piece driving carrier of the lens assembly. It is worth to be mentioned that the coil 520 symmetrically disposed along the optical axis X means the coil 520 surrounds the optical axis X or the number of the coil 520 is a plurality and are symmetrically disposed along the optical axis X, but the present disclosure will not be limited thereto.

Figure 5C:
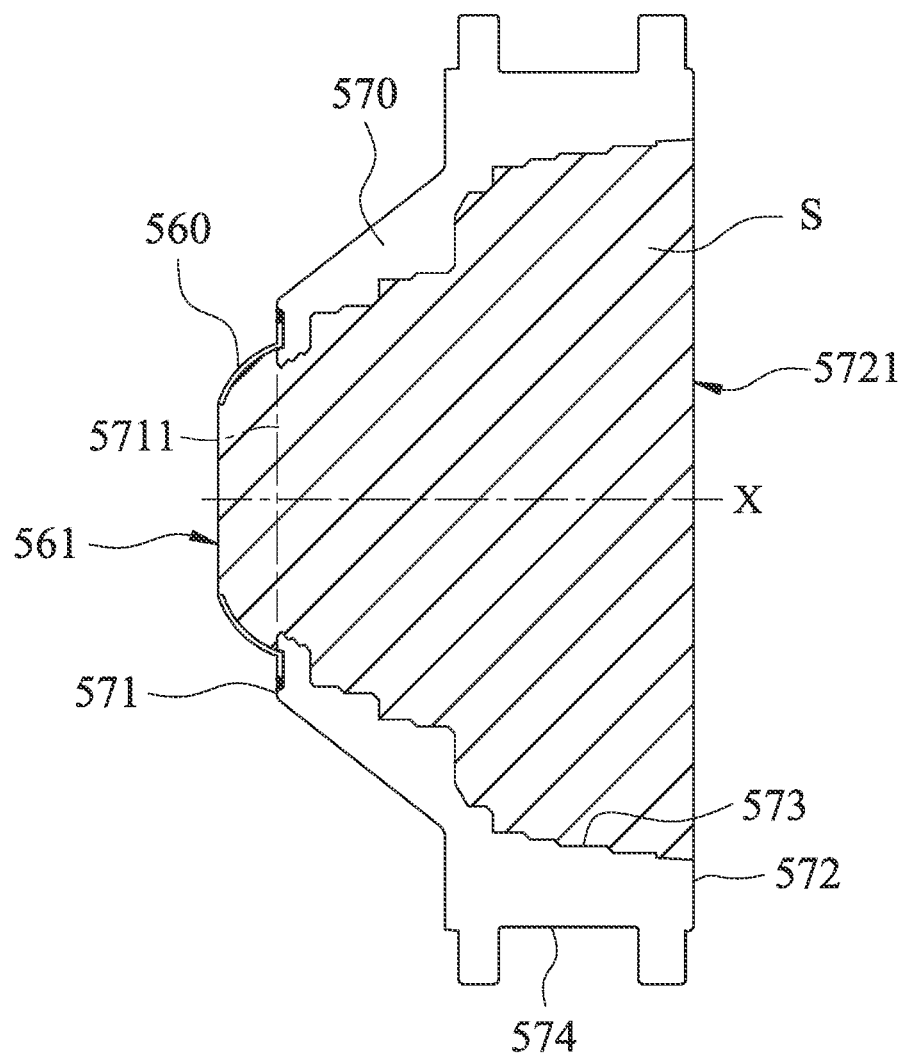
FIG. 5C is a schematic view of the accommodating assembly according to the 5th embodiment of FIG. 5A.
Figure 5D:
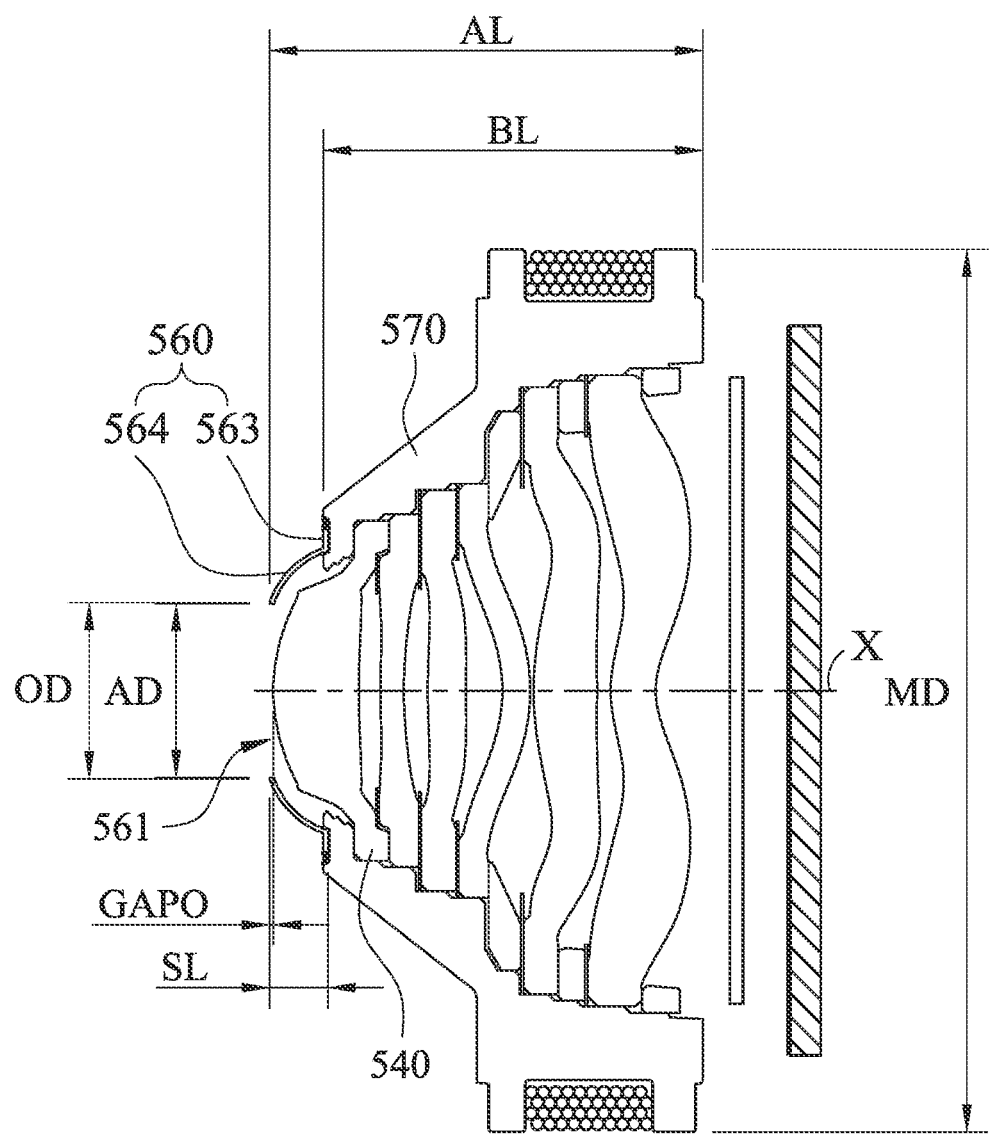
FIG. 5D is a schematic view of parameters of the imaging lens assembly according to the 5th embodiment of FIG. 5B.

FIG. 5C is a schematic view of the accommodating assembly 510 according to the 5th embodiment of FIG. 5A. In FIG. 5B and FIG. 5C, the accommodating assembly 510 includes a conical-shaped light blocking sheet 560 and a lens barrel 570. The conical-shaped light blocking sheet 560 has an object-side opening 561, the optical axis X passes through the object-side opening 561, and the lens barrel 570 is disposed on an image side of the conical portion 564 (as shown in FIG. 5D) of the conical-shaped light blocking sheet 560.

The conical-shaped light blocking sheet 560 includes an out-side portion 563 and the conical portion 564. The out-side portion 563 defines an outer periphery (its reference numeral is omitted) of the conical-shaped light blocking sheet 560 and surrounds the object-side opening 561. The conical portion 564 forms the object-side opening 561 and is connected to the out-side portion 563, wherein the conical portion 564 includes a conical structure 5641, and the conical structure 5641 is tapered from the out-side portion 563 toward an object-side along the optical axis X.

The lens barrel 570 includes an object-side wall 571, an image-side wall 572, an inner-side wall 573 and an outer-side wall 574. The object-side wall 571 has an object-side through hole 5711 which is allowing the optical axis X to pass through and faces towards an object side of the imaging lens assembly 500. The image-side wall 572 has an image-side through hole 5721 which is allowing the optical axis X to pass through and faces towards an image side of the imaging lens assembly 500. The inner-side wall 573 surrounds and faces towards the optical axis X, and the inner-side wall 573 connects the object-side wall 571 and the image-side wall 572. The outer-side wall 574 is farther away from the optical axis X than the inner-side wall 573 to the optical axis X and connects the object-side wall 571 and the image-side wall 572.

The accommodating assembly 510 defines an inner space S. The inner space S extends from the image-side through hole 5721 of the lens barrel 570 to an end of the conical portion 564 closest to the object side along a direction parallel to the optical axis X and is surrounded by the inner-side wall 573. Therefore, the optical elements can be disposed in the inner space S of the accommodating assembly 510.

In FIG. 5B, the optical elements include a most object-side optical element 540 and at least two optical elements disposed in the inner space S. According to the 5th embodiment, a number of the optical elements is 14, which includes 6 lens elements, in order from the object side to the image side is, the most object-side optical element 540 and lens elements 591, 592, 593, 594, 595, wherein the most object-side optical element 540 is also a lens element. However, the optical characteristics, such as the amount, structure, surface shape, can be arranged on demand, or can further dispose others optical elements, which will not be limited thereto.

Further, the out-side portion 563 can be fixed on the lens barrel 570 via a glue G, and the conical-shaped light blocking sheet 560 is physically contacted with the lens barrel 570. Therefore, the generation of deformation of the conical-shaped light blocking sheet, such as compression or warpage, caused by pressing stress can be avoided, so that the tolerance stack-up can be reduced caused by assembling so as to maintain the image quality.

In the 5th embodiment, the object-side opening 561 of the conical-shaped light blocking sheet 560 can be disposed on the end of the conical portion 564 closest to the object side. Therefore, the total track length of the imaging lens assembly 500 can be reduced so as to improve the tilt of the setting and optical axis offsets thereof.

The conical portion 564 of the conical-shaped light blocking sheet 560 can further include at least one double-curved surface Sd. Specifically, according to the 5th embodiment, the double-curved surface Sd is the surface of the conical portion 564, and the double-curved surface Sd is annular-shaped, but the present disclosure will not be limited thereto. Therefore, when the conical-shaped light blocking sheet 560 is forced by the stress along the direction of the optical axis X, it is favorable for reducing the risk of the generation of the permanent deformation thereon.

The lens barrel 570 of the imaging lens assembly 500 can further include a first joint surface 575, which is disposed on an object side of the lens barrel 570 and disposed opposite to the out-side portion 563 of the conical-shaped light blocking sheet 560, wherein the conical-shaped light blocking sheet 560 and the lens barrel 570 are physically contacted to each other, and the out-side portion 563 of the conical-shaped light blocking sheet 560 is fixed to the first joint surface 575.

The conical-shaped light blocking sheet 560 can be made of metal material or plastic material, and is similar with the material of the conical-shaped light blocking sheet 160 according to the 1st embodiment, which will not be repeated herein.

FIG. 5D is a schematic view of parameters of the imaging lens assembly 500 according to the 5th embodiment of FIG. 5B. In FIG. 5B and FIG. 5D, when an angle between the conical portion 564 and the optical axis X is θ, a focal length of the imaging lens assembly 500 is f (not shown in the drawings), a diameter of the object-side opening 561 is AD, a length of the accommodating assembly 510 along the direction parallel to the optical axis X is AL, a length of the lens barrel 570 along the direction parallel to the optical axis X is BL, a diameter of the end of the conical portion 564 closest to the object side is OD, a maximum outer diameter of the accommodating assembly 510 is MD, a distance along the direction parallel to the optical axis X between the end of the conical portion 564 closest to the object side and one end of the most object-side optical element 540 closest to the object side is GAPO, and a length of the conical-shaped light blocking sheet 560 along the direction parallel to the optical axis X is SL, the parameters satisfy the following conditions as shown in Table 5.

TABLE 5

| 5th embodiment | |
| --- | --- |
| θ (degrees) | 45 |
| f (mm) | 3.27 |
| AD (mm) | 1.43 |

TABLE 5-continued

| 5th embodiment | |
| --- | --- |
| f/AD | 2.29 |
| AL (mm) | 3.56 |
| BL (mm) | 3.12 |
| (AL − BL)/AL × 100% (%) | 12.4 |
| OD (mm) | 1.45 |
| MD (mm) | 7.26 |
| OD/MD | 0.20 |
| GAPO (mm) | 0.03 |
| SL (mm) | 0.48 |
| GAPO/SL × 100% (%) | 6.3 |

6th Embodiment

Figure 6A:
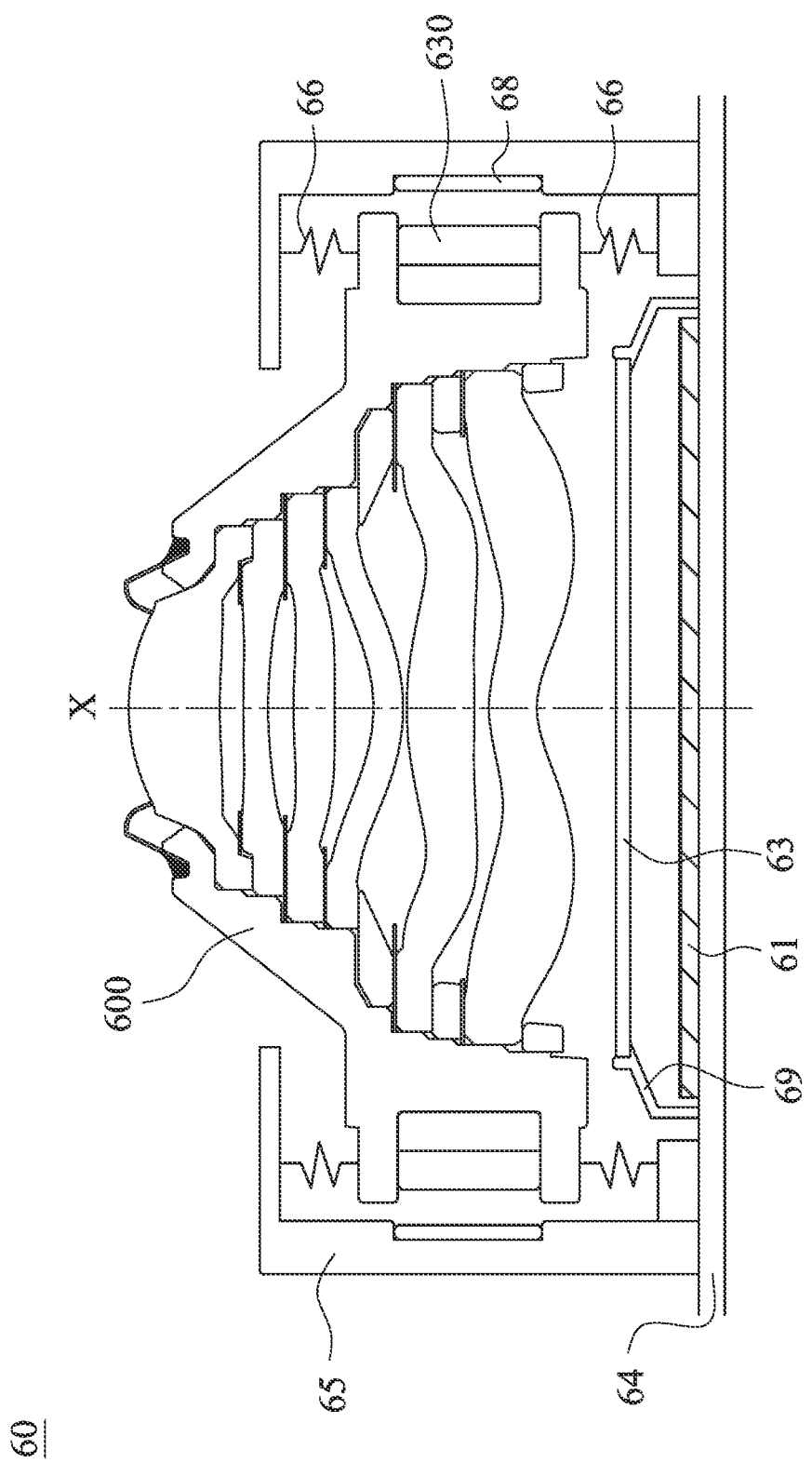
FIG. 6A is a schematic view of an electronic device according to the 6th embodiment of the present disclosure.
Figure 6B:
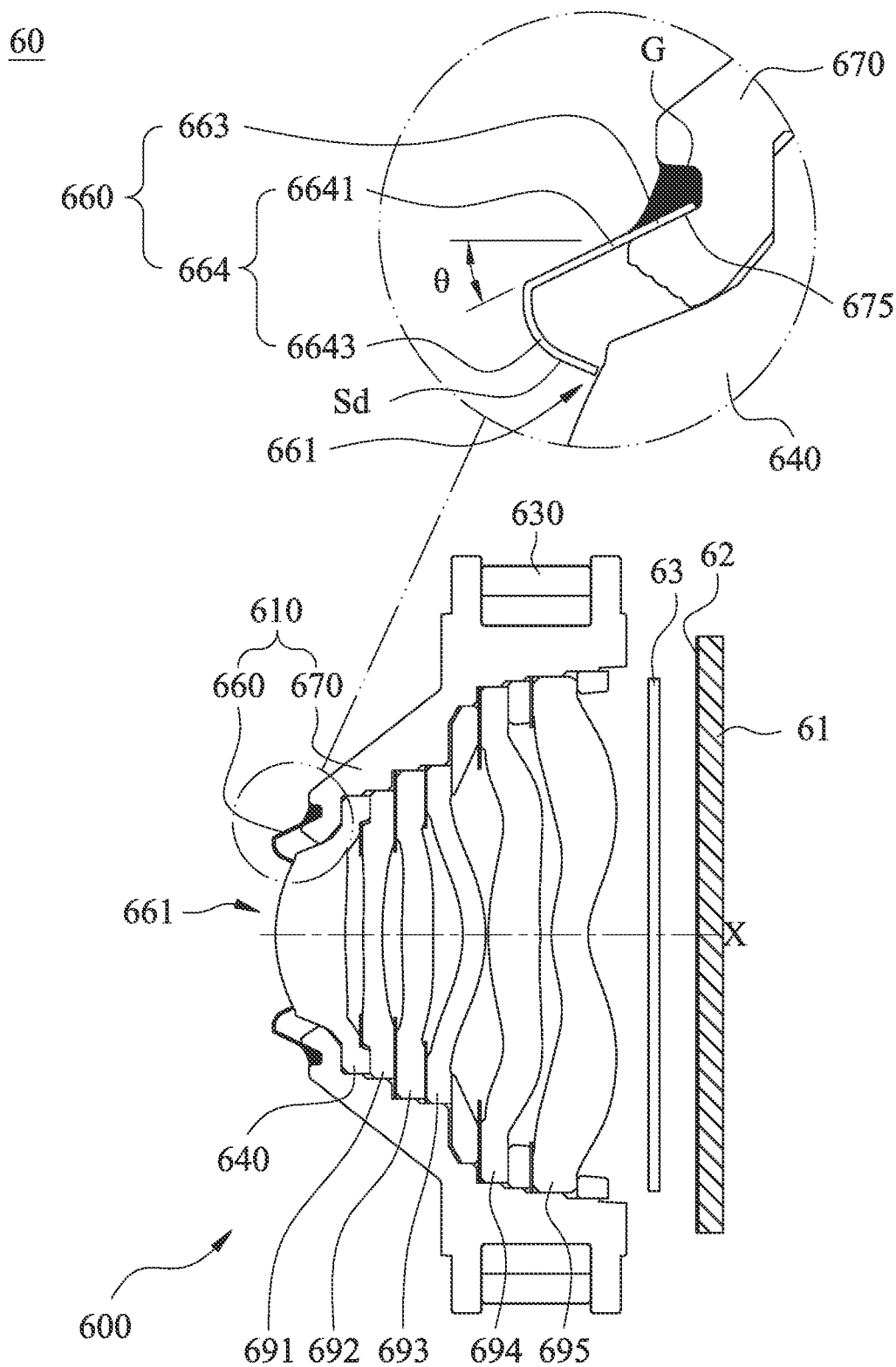
FIG. 6B is another schematic view of the electronic device according to the 6th embodiment of FIG. 6A.

FIG. 6A is a schematic view of an electronic device 60 according to the 6th embodiment of the present disclosure, and FIG. 6B is another schematic view of the electronic device 60 according to the 6th embodiment of FIG. 6A. In FIG. 6A and FIG. 6B, the electronic device 60 includes at least one imaging apparatus (its reference numeral is omitted), an image sensor 61 and a circuit board 64. The imaging apparatus includes an imaging lens assembly 600, an image surface 62 and a filter 63. When the imaging apparatus is applied to the electronic device the image sensor 61 can be disposed on the image surface 62 of the imaging apparatus. The circuit board 64 is electrically connected to the imaging apparatus so as to control the imaging apparatus. According to the 6th embodiment, a number of the imaging apparatus is one, which further include a lens carrier 65.

In the 6th embodiment, the lens carrier 65 includes a plurality of elastic elements 66, at least one coil 68 and a filter carrier 69. Specifically, in FIG. 6A, the elastic elements 66 are connected with the lens carrier 65 and the imaging lens assembly 600, which is for restricting the imaging lens assembly 600. The filter carrier 69 is located on an image side of the lens carrier 65, which can contain the filter 63.

In FIG. 6B, the imaging lens assembly 600 has an optical axis X, and includes a plurality of optical elements (its reference numeral is omitted) and an accommodating assembly 610. The optical axis X passes through the optical elements, and the accommodating assembly 610 surrounds the optical axis X and contains the optical elements. According to the 6th embodiment, the imaging lens assembly 600 further includes at least one magnetic element 630, wherein the magnetic element 630 can be disposed on the outer-side wall 674 (labelled in FIG. 6C) of the lens barrel 670 and symmetrically disposed along the optical axis X. Therefore, cooperating with the coil 68 of the lens carrier 65, it is favorable for achieving the auto-focusing function by forming a one-piece driving carrier of the lens assembly.

Further, a number of the magnetic element 630 can be at least two, which are pairs and disposed symmetrically along the optical axis X, and the magnetic elements 630 can be disposed relatively to the coil 68 of the lens carrier 65, but will not be limited thereto. By generating the magnetic force for attracting or repelling the magnetic elements 630, the imaging lens assembly 600 can be moved along the direction perpendicular the optical axis X. Therefore, the one-piece structure of the driving carrier of the imaging lens assembly can be formed so as to achieve the correcting function of image shaken or deformation.

Figure 6C:
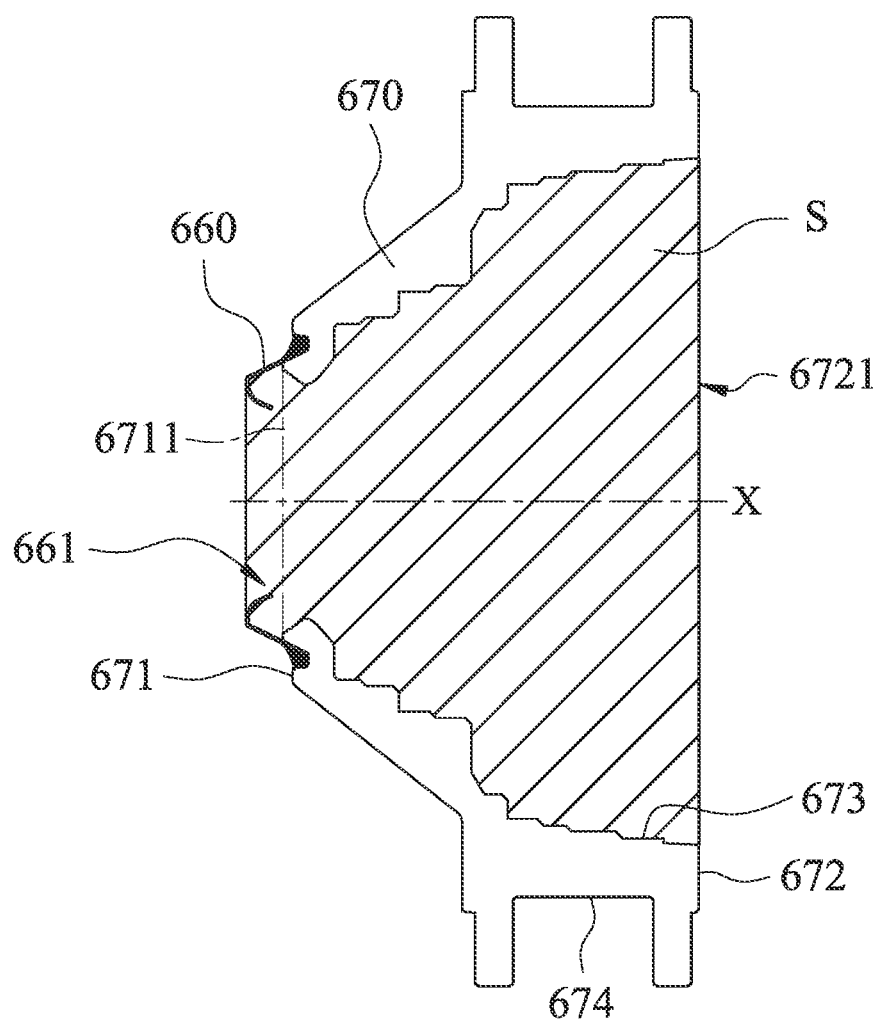
FIG. 6C is a schematic view of the accommodating assembly according to the 6th embodiment of FIG. 6B.

FIG. 6C is a schematic view of the accommodating assembly 610 according to the 6th embodiment of FIG. 6B. In FIG. 6C, the accommodating assembly 610 includes a conical-shaped light blocking sheet 660 and a lens barrel 670. The conical-shaped light blocking sheet 660 has an object-side opening 661, the optical axis X passes through the object-side opening 661, and the lens barrel 670 is disposed on an image side of the conical portion 664 of the conical-shaped light blocking sheet 660.

The conical-shaped light blocking sheet 660 includes an out-side portion 663 and the conical portion 664. The out-side portion 663 defines an outer periphery (its reference numeral is omitted) of the conical-shaped light blocking sheet 660 and surrounds the object-side opening 661. The conical portion 664 forms the object-side opening 661 and is connected to the out-side portion 663, wherein the conical portion 664 includes a conical structure 6641, and the conical structure 6641 is tapered from the out-side portion 663 toward an object-side along the optical axis X. It is worth to be mentioned that, in the 6th embodiment, the inclinations of the out-side portion 663 and the conical portion 664 of the conical-shaped light blocking sheet 660 are the same.

The lens barrel 670 includes an object-side wall 671, an image-side wall 672, an inner-side wall 673 and an outer-side wall 674. The object-side wall 671 has an object-side through hole 6711 which is allowing the optical axis X to pass through and faces towards an object side of the imaging lens assembly 600. The image-side wall 672 has an image-side through hole 6721 which is allowing the optical axis X to pass through and faces towards an image side of the imaging lens assembly 600. The inner-side wall 673 surrounds and faces towards the optical axis X, and the inner-side wall 673 connects the object-side wall 671 and the image-side wall 672. The outer-side wall 674 is farther away from the optical axis X than the inner-side wall 673 to the optical axis X and connects the object-side wall 671 and the image-side wall 672.

The accommodating assembly 610 defines an inner space S. The inner space S extends from the image-side through hole 6721 of the lens barrel 670 to an end of the conical portion 664 closest to the object side along a direction parallel to the optical axis X and is surrounded by the inner-side wall 673. Therefore, the optical elements can be disposed in the inner space S of the accommodating assembly 610.

In FIG. 6B, the optical elements include a most object-side optical element 640 and at least two optical elements disposed in the inner space S. According to the 6th embodiment, a number of the optical elements is 14, which includes 6 lens elements, in order from the object side to the image side is, the most object-side optical element 640 and lens elements 691, 692, 693, 694, 695, wherein the most object-side optical element 640 is also a lens element. However, the optical characteristics, such as the amount, structure, surface shape, can be arranged on demand, or can further dispose others optical elements, which will not be limited thereto.

Further, the out-side portion 663 can be fixed on the lens barrel 670 via a glue G, and the conical-shaped light blocking sheet 660 is physically contacted with the lens barrel 670. Therefore, the generation of deformation of the conical-shaped light blocking sheet, such as compression or warpage, caused by pressing stress can be avoided, so that the tolerance stack-up can be reduced caused by assembling so as to maintain the image quality.

The conical portion 664 of the conical-shaped light blocking sheet 660 can further include an opposite conical structure 6643, which is expanded from the object-side opening 661 toward one end of the conical-shaped light blocking sheet 660 closest to the object side. Therefore, the object-side opening 661 concaves towards the image side so as to enhance the light blocking effect of the conical-shaped light blocking sheet 660.

The conical portion 664 of the conical-shaped light blocking sheet 660 can further include at least one double-curved surface Sd. Specifically, according to the 6th embodiment, the double-curved surface Sd is the surface of the opposite conical structure 6643, and the double-curved surface Sd is annular-shaped, but the present disclosure will not be limited thereto. Therefore, when the conical-shaped light blocking sheet 660 is forced by the stress along the direction of the optical axis X, it is favorable for reducing the risk of the generation of the permanent deformation thereon.

The lens barrel 670 of the imaging lens assembly 600 can further include a first joint surface 675, which is disposed on an object side of the lens barrel 670 and disposed opposite to the out-side portion 663 of the conical-shaped light blocking sheet 660, wherein the conical-shaped light blocking sheet 660 and the lens barrel 670 are physically contacted to each other, and the out-side portion 663 of the conical-shaped light blocking sheet 660 is fixed to the first joint surface 675.

The conical-shaped light blocking sheet 660 can be made of metal material or plastic material, and is similar with the material of the conical-shaped light blocking sheet 160 according to the 1st embodiment, which will not be repeated herein.

Figure 6D:
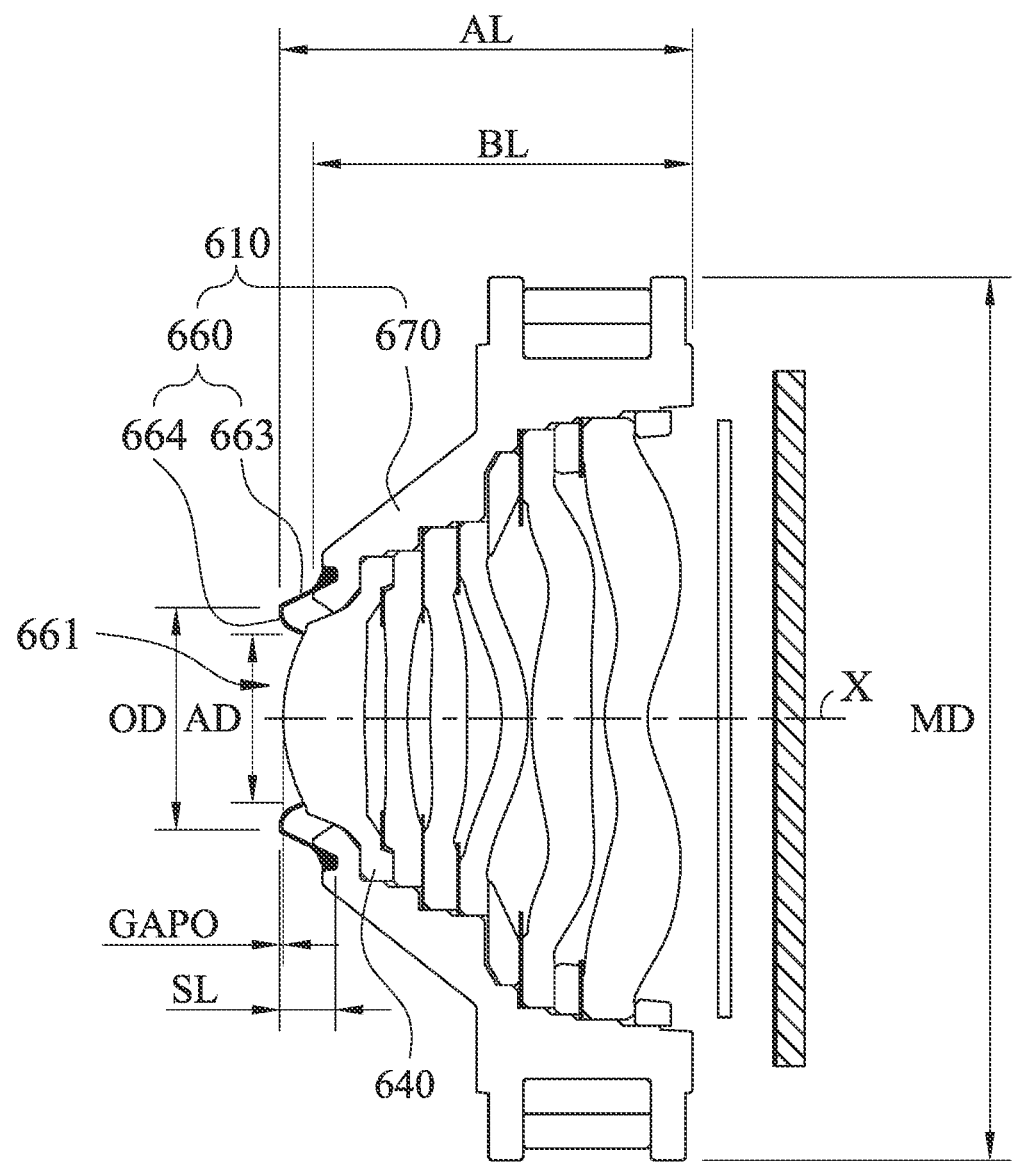
FIG. 6D is a schematic view of parameters of the imaging lens assembly according to the 6th embodiment of FIG. 6B.

FIG. 6D is a schematic view of parameters of the imaging lens assembly 600 according to the 6th embodiment of FIG. 6B. In FIG. 6B and FIG. 6D, when an angle between the conical portion 664 and the optical axis X is θ, a focal length of the imaging lens assembly 600 is f (not shown in the drawings), a diameter of the object-side opening 661 is AD, a length of the accommodating assembly 610 along the direction parallel to the optical axis X is AL, a length of the lens barrel 670 along the direction parallel to the optical axis X is BL, a diameter of the end of the conical portion 664 closest to the object side is OD, a maximum outer diameter of the accommodating assembly 610 is MD, a distance along the direction parallel to the optical axis X between the end of the conical portion 664 closest to the object side and one end of the most object-side optical element 640 closest to the object side is GAPO, and a length of the conical-shaped light blocking sheet 660 along the direction parallel to the optical axis X is SL, the parameters satisfy the following conditions as shown in Table 6.

TABLE 6

| 6th embodiment | |
|---|---|
| θ (degrees) | 26 |
| f (mm) | 3.27 |
| AD (mm) | 1.45 |
| f/AD | 2.26 |
| AL (mm) | 3.56 |
| BL (mm) | 3.27 |
| (AL − BL)/AL × 100% (%) | 8.1 |
| OD (mm) | 1.92 |
| MD (mm) | 7.62 |
| OD/MD | 0.25 |
| GAPO (mm) | 0.03 |
| SL (mm) | 0.48 |
| GAPO/SL × 100% (%) | 6.3 |

7th Embodiment

Figure 7A:
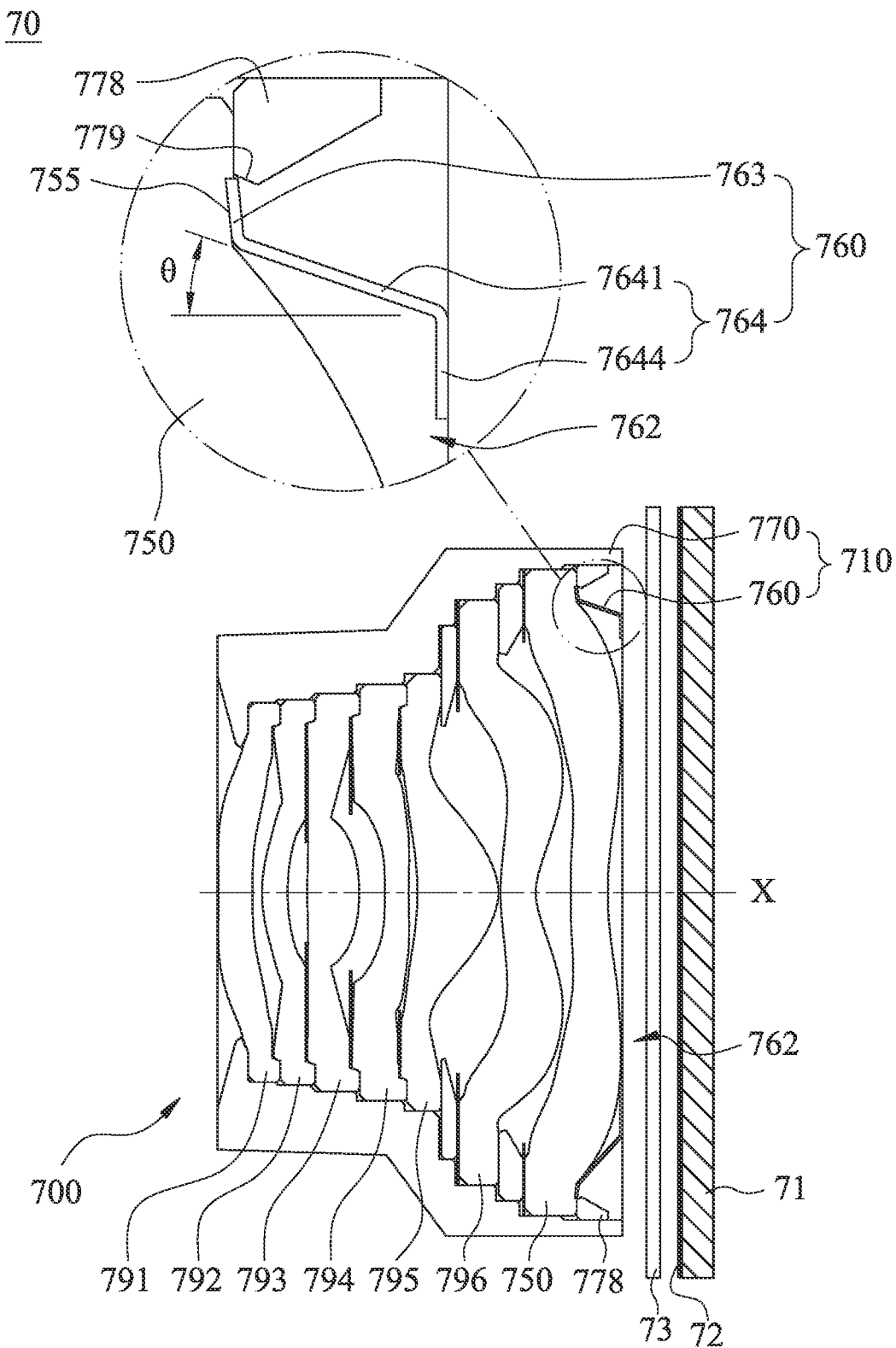
FIG. 7A is a schematic view of an electronic device according to the 7th embodiment of the present disclosure.

FIG. 7A is a schematic view of an electronic device 70 according to the 7th embodiment of the present disclosure.

In FIG. 7A, the electronic device 70 includes at least one imaging apparatus (its reference numeral is omitted) and an image sensor 71. The imaging apparatus includes an imaging lens assembly 700, an image surface 72 and a filter 73. When the imaging apparatus is applied to the electronic device 70, the image sensor 71 can be disposed on the image surface 72 of the imaging apparatus.

The imaging lens assembly 700 has an optical axis X, and includes a plurality of optical elements (its reference numeral is omitted) and an accommodating assembly 710. The optical axis X passes through the optical elements, and the accommodating assembly 710 surrounds the optical axis X and contains the optical elements.

Figure 7B:
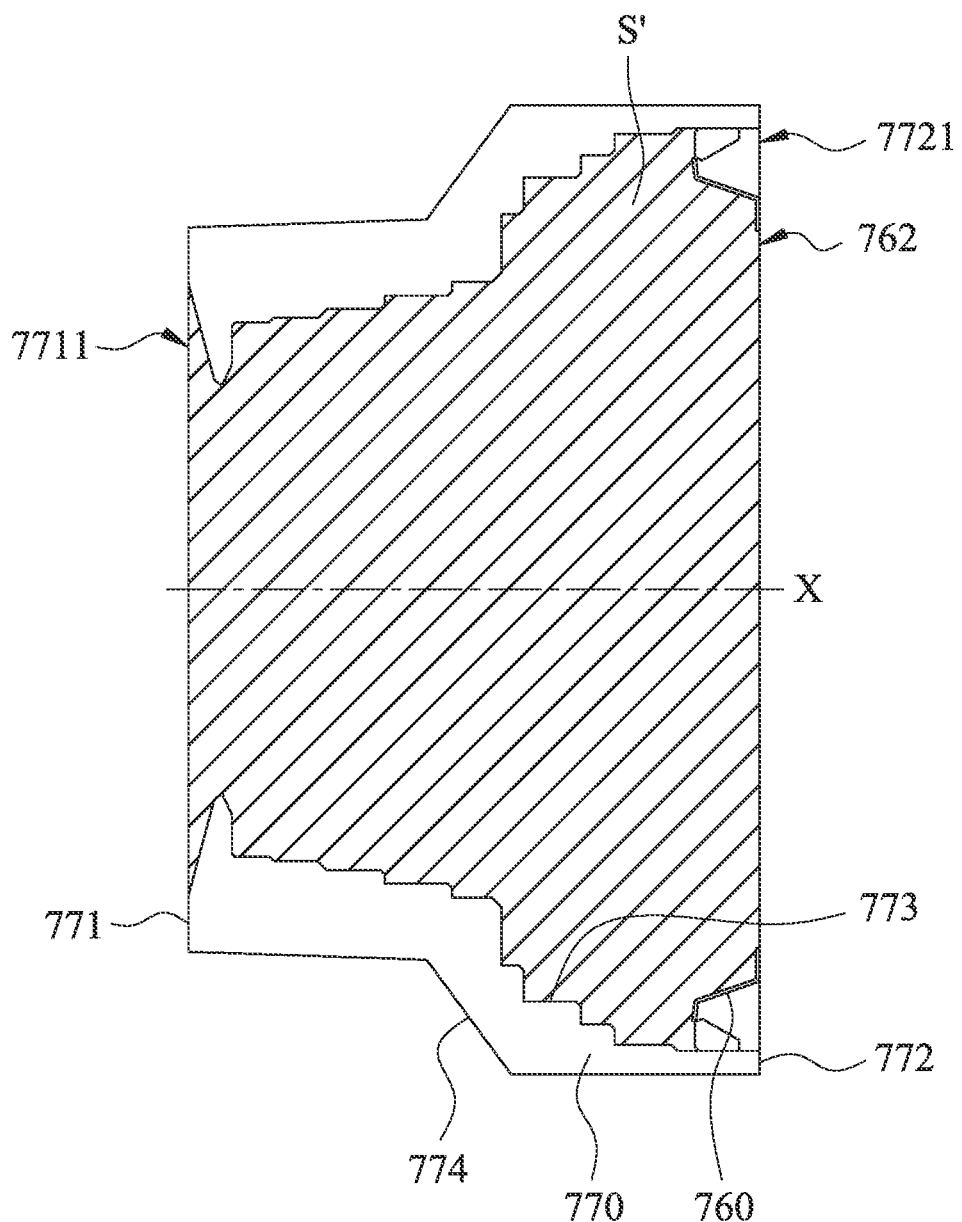
FIG. 7B is a schematic view of the accommodating assembly according to the 7th embodiment of FIG. 7A.

FIG. 7B is a schematic view of the accommodating assembly 710 according to the 7th embodiment of FIG. 7A. In FIG. 7B, the accommodating assembly 710 includes a conical-shaped light blocking sheet 760 and a lens barrel 770. The conical-shaped light blocking sheet 760 has an opening, according to the 7th embodiment, the opening of the conical-shaped light blocking sheet 760 is an image-side opening 762. The optical axis X passes through the image-side opening 762, and the lens barrel 770 is disposed on an object side of the conical portion 764 of the conical-shaped light blocking sheet 760.

The conical-shaped light blocking sheet 760 includes an out-side portion 763 and the conical portion 764. The out-side portion 763 defines an outer periphery (its reference numeral is omitted) of the conical-shaped light blocking sheet 760 and surrounds the image-side opening 762. The conical portion 764 forms the image-side opening 762 and is connected to the out-side portion 763, wherein the conical portion 764 includes a conical structure 7641, and the conical structure 7641 is tapered from the out-side portion 763 toward an image-side along the optical axis X.

The lens barrel 770 includes an object-side wall 771, an image-side wall 772, an inner-side wall 773 and an outer-side wall 774. The object-side wall 771 has an object-side through hole 7711 which is allowing the optical axis X to pass through and faces towards an object side of the imaging lens assembly 700. The image-side wall 772 has an image-side through hole 7721 which is allowing the optical axis X to pass through and faces towards an image side of the imaging lens assembly 700. The inner-side wall 773 surrounds and faces towards the optical axis X, and the inner-side wall 773 connects the object-side wall 771 and the image-side wall 772. The outer-side wall 774 is farther away from the optical axis X than the inner-side wall 773 to the optical axis X and connects the object-side wall 771 and the image-side wall 772.

The accommodating assembly 710 defines an inner space S'. The inner space S' extends from the object-side through hole 7711 of the lens barrel 770 to an end of the conical portion 764 closest to the image side along a direction parallel to the optical axis X and is surrounded by the inner-side wall 773. Therefore, the optical elements can be disposed in the inner space S' of the accommodating assembly 710.

In FIG. 7A, the optical elements include a most image-side optical element 750 and at least two optical elements disposed in the inner space S'. According to the 7th embodiment, a number of the optical elements is 14, which includes 7 lens elements, in order from the object side to the image side is, lens elements 791, 792, 793, 794, 795, 796 and the most image-side optical element 750, wherein the most image-side optical element 750 is also a lens element. However, the optical characteristics, such as the amount, structure, surface shape, can be arranged on demand, or can further dispose others optical elements, which will not be limited thereto.

Further, the out-side portion 763 is fixed at only one of the lens barrel 770 and the most image-side optical element 750, and the conical-shaped light blocking sheet 760 is physically contacted with only one of the lens barrel 770 and the most image-side optical element 750. Therefore, the generation of deformation of the conical-shaped light blocking sheet, such as compression or warpage, caused by pressing stress can be avoided, so that the tolerance stack-up can be reduced caused by assembling so as to maintain the image quality. Specifically, according to the 7th embodiment, the out-side portion 763 is fixed at the lens barrel 770, and the conical-shaped light blocking sheet 760 is physically contacted with the lens barrel 770.

In detail, in FIG. 7A, the lens barrel 770 can further include a retaining element 778, which is located on the image side of the lens barrel. The conical-shaped light blocking sheet 760 is physically contacted with the retaining element 778 of the lens barrel 770, and the out-side portion 763 of the conical-shaped light blocking sheet 760 is fixed on the retaining element 778 of the lens barrel 770. Further, the lens barrel 770 can further include a third undercut surface 779. The third undercut surface 779 surrounds the optical axis X, and is extended and shrunken along a direction from one end of the third joint surface 775 far from the optical axis X farther away from the third joint surface 775. According to the 7th embodiment, the third undercut surface 779 is disposed on the retaining element 778 of the lens barrel 770, and the retaining element 778 will not affect the light path, which is only for fixing the lens element or the conical-shaped light blocking sheet, but the present disclosure will not be limited thereto.

The third undercut surface 779 is for fixing the conical-shaped light blocking sheet 760; specifically, the third undercut surface 779 can be abutted against the out-side portion 763 of the conical-shaped light blocking sheet 760 so as to fix the conical-shaped light blocking sheet 760. Therefore, the assembling process of fixing the conical-shaped light blocking sheet by dispensing can be reduce by the physical connection between the conical-shaped light blocking sheet 760 and the lens barrel 770 so as to enhance the efficiency of the production.

According to the 7th embodiment, the image-side opening 762 of the conical-shaped light blocking sheet 760 is disposed on the end of the conical portion 764 closest to the image side. Therefore, the total track length of the imaging lens assembly 700 can be reduced so as to improve the tilt of the setting and optical axis offsets thereof.

Figure 7C:
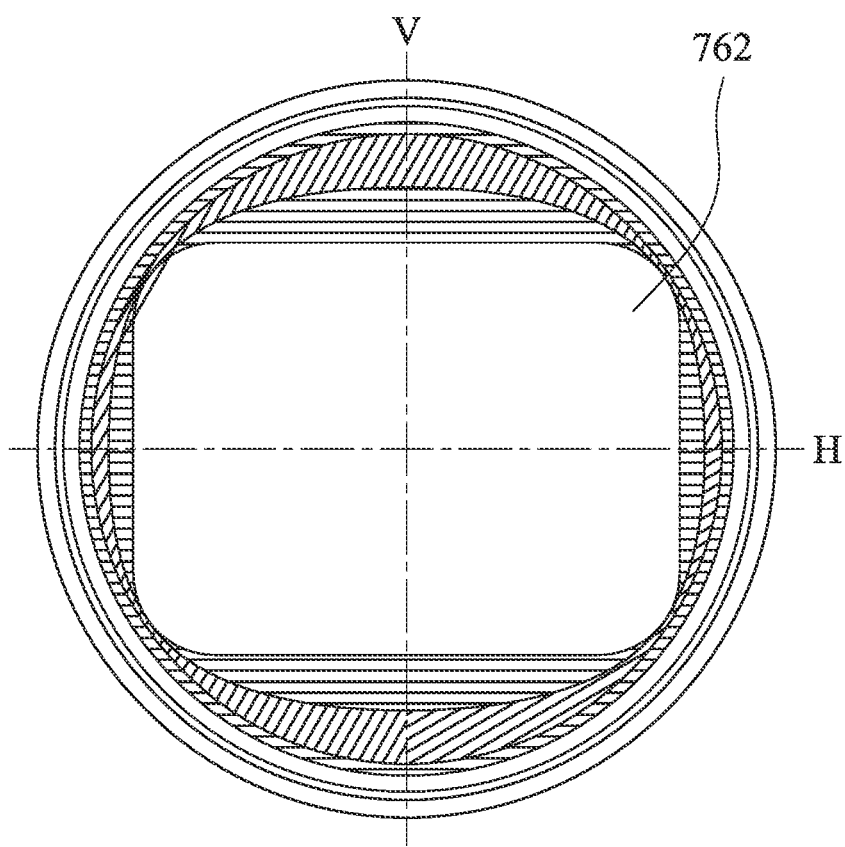
FIG. 7C is a schematic view of the accommodating assembly according to the 7th embodiment of FIG. 7A.

FIG. 7C is a schematic view of the accommodating assembly 710 according to the 7th embodiment of FIG. 7A. In FIG. 7C, the image-side opening 762 is a heteromorphic opening, that is, the image-side opening 762 is non-annular-shaped, which has a perpendicular direction V symmetrical along a horizontal direction H, and the optical axis X passes through a shape center of the image-side opening 762. Therefore, the non-imaging light incident onto the area around the image sensor 71 can be avoided, which can prevent the generation of stray light.

The conical portion 764 of the conical-shaped light blocking sheet 760 can further include an image-side structure 7644, which is disposed on the end of the conical portion 764 closest to the image side and perpendicular to the optical axis X, and one end of the image-side structure 7644 far away from the optical axis X is connected to an image side of the conical structure 7641. Therefore, the effect for protecting the most image-side optical element 750 of the conical-shaped light blocking sheet 760 can be enhanced.

The imaging lens assembly 700 further includes a joint surface, which is disposed on one of the lens barrel 770, the object side of the most object-side optical element and the image side of the most image-side optical element 750, and is disposed relatively to the out-side portion 763 of the conical-shaped light blocking sheet 760. According to the 7th embodiment, the most image-side optical element 750 of the imaging lens assembly 700 further includes a joint surface, that is, the third joint surface 755, which is disposed on an image side of the most image-side optical element 750 and disposed relatively to the out-side portion 763 of the conical-shaped light blocking sheet 760, wherein the conical-shaped light blocking sheet 760 and the most image-side optical element 750 are physically contacted with each other, and the out-side portion 763 of the conical-shaped light blocking sheet 760 is fixed on the third joint surface 755.

Figure 7D:
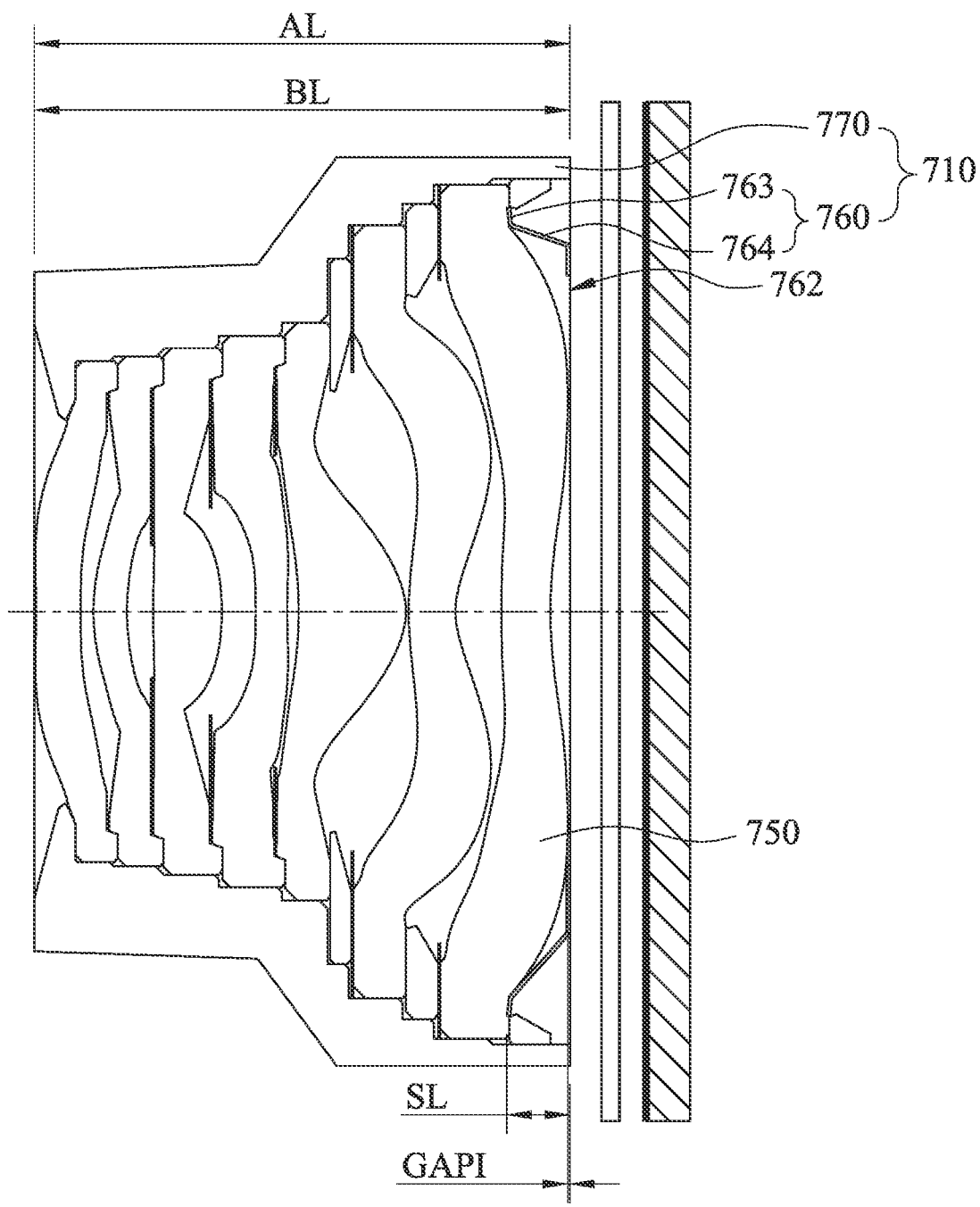
FIG. 7D is a schematic view of parameters of the imaging lens assembly according to the 7th embodiment of FIG. 7B.

FIG. 7D is a schematic view of parameters of the imaging lens assembly 700 according to the 7th embodiment of FIG. 7B. In FIG. 7B and FIG. 7D, when an angle between the conical portion 764 and the optical axis X is θ, a focal length of the imaging lens assembly 700 is f (not shown in the drawings), a length of the accommodating assembly 710 along the direction parallel to the optical axis X is AL, a length of the lens barrel 770 along the direction parallel to the optical axis X is BL, a distance along the direction parallel to the optical axis X between the end of the conical portion 764 closest to the image side and one end of the most image-side optical element 750 closest to the object side is GAPI, and a length of the conical-shaped light blocking sheet 760 along the direction parallel to the optical axis X is SL, the parameters satisfy the following conditions as shown in Table 7.

TABLE 7

| 7th embodiment | |
|---|---|
| θ (degrees) | 19 |
| f (mm) | 3.46 |
| AL (mm) | 6.3 |
| BL (mm) | 6.3 |
| GAPI (mm) | 0.025 |
| SL (mm) | 0.74 |
| GAPI/SL × 100% (%) | 3.4 |
| (AL − BL)/AL × 100% (%) | 0 |

8th Embodiment

Figure 8A:
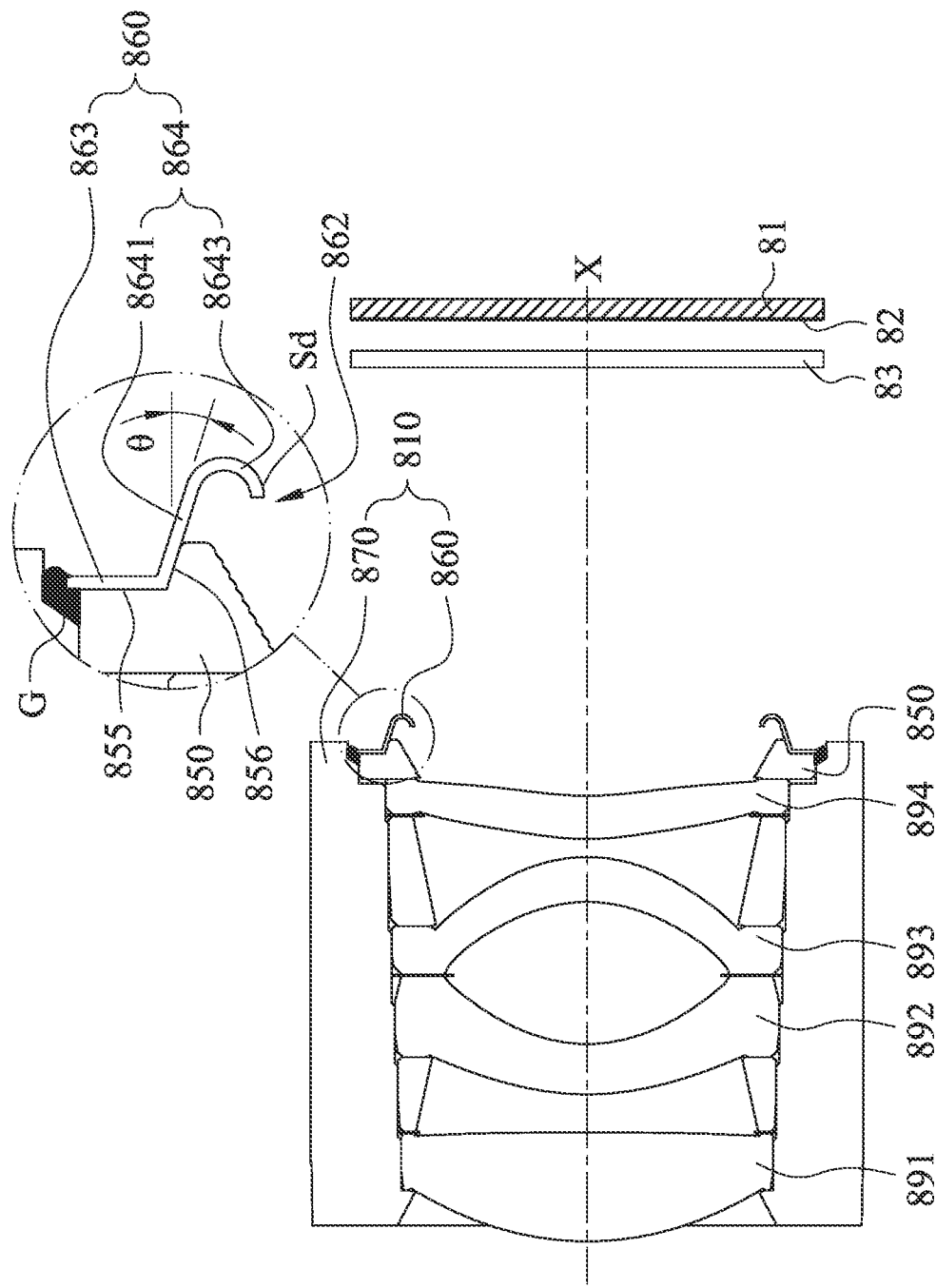
FIG. 8A is a schematic view of an electronic device according to the 8th embodiment of the present disclosure.

FIG. 8A is a schematic view of an electronic device 80 according to the 8th embodiment of the present disclosure. In FIG. 8A, the electronic device 80 includes at least one imaging apparatus (its reference numeral is omitted) and an image sensor 81. The imaging apparatus includes an imaging lens assembly 800, an image surface 82 and a filter 83. When the imaging apparatus is applied to the electronic device 80, the image sensor 81 can be disposed on the image surface 82 of the imaging apparatus.

The imaging lens assembly 800 has an optical axis X, and includes a plurality of optical elements (its reference numeral is omitted) and an accommodating assembly 810. The optical axis X passes through the optical elements, and the accommodating assembly 810 surrounds the optical axis X and contains the optical elements.

Figure 8B:
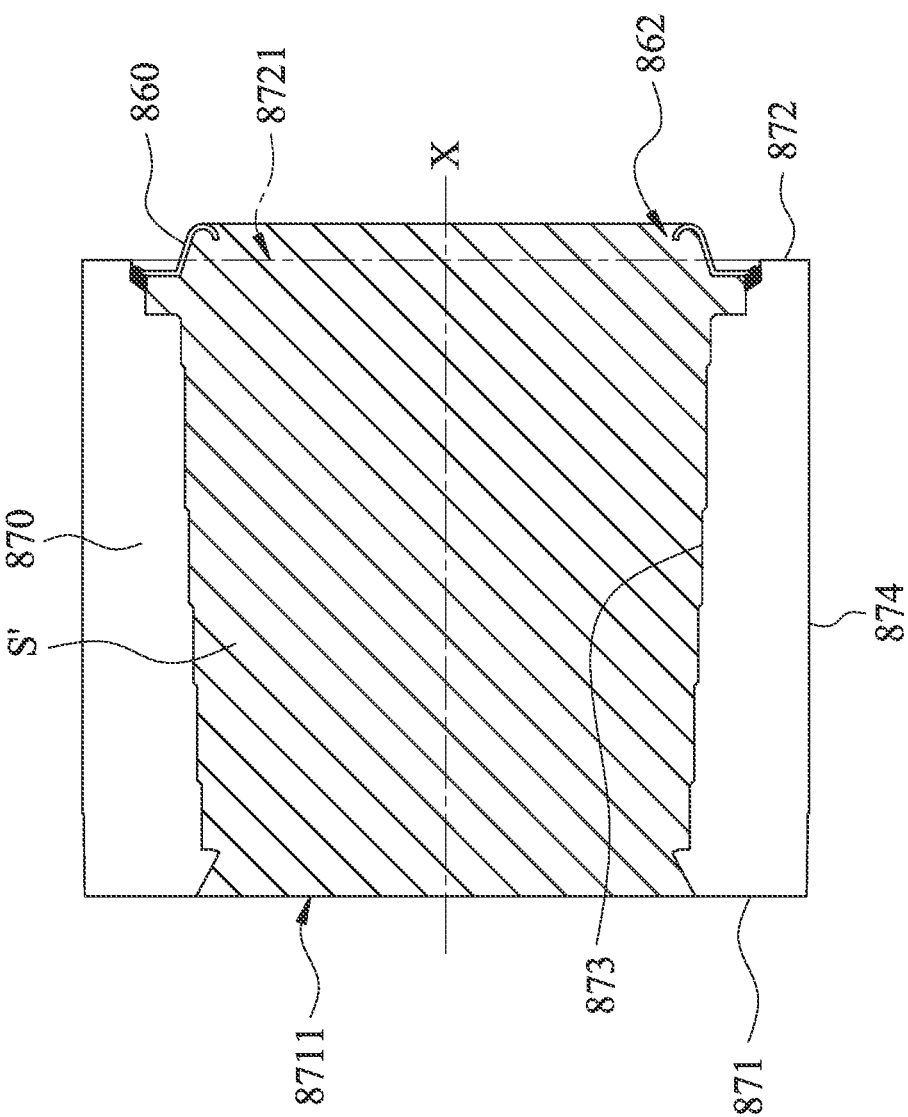
FIG. 8B is a schematic view of the accommodating assembly according to the 8th embodiment of FIG. 8A.

FIG. 8B is a schematic view of the accommodating assembly 810 according to the 8th embodiment of FIG. 8A. In FIG. 8B, the accommodating assembly 810 includes a conical-shaped light blocking sheet 860 and a lens barrel 870. The conical-shaped light blocking sheet 860 has an image-side opening 862. The optical axis X passes through the image-side opening 862, and the lens barrel 870 is disposed on an object side of the conical portion 864 of the conical-shaped light blocking sheet 860.

The conical-shaped light blocking sheet 860 includes an out-side portion 863 and the conical portion 864. The out-side portion 863 defines an outer periphery (its reference numeral is omitted) of the conical-shaped light blocking sheet 860 and surrounds the image-side opening 862. The conical portion 864 forms the image-side opening 862 and is connected to the out-side portion 863, wherein the conical portion 864 includes a conical structure 8641, and the conical structure 8641 is tapered from the out-side portion 863 toward an image-side along the optical axis X.

The lens barrel 870 includes an object-side wall 871, an image-side wall 872, an inner-side wall 873 and an outer-side wall 874. The object-side wall 871 has an object-side through hole 8711 which is allowing the optical axis X to pass through and faces towards an object side of the imaging lens assembly 800. The image-side wall 872 has an image-side through hole 8721 which is allowing the optical axis X to pass through and faces towards an image side of the imaging lens assembly 800. The inner-side wall 873 surrounds and faces towards the optical axis X, and the inner-side wall 873 connects the object-side wall 871 and the image-side wall 872. The outer-side wall 874 is farther away from the optical axis X than the inner-side wall 873 to the optical axis X and connects the object-side wall 871 and the image-side wall 872.

The accommodating assembly 810 defines an inner space S'. The inner space S' extends from the object-side through hole 8711 of the lens barrel 870 to an end of the conical portion 864 closest to the image side along a direction parallel to the optical axis X and is surrounded by the inner-side wall 873. Therefore, the optical elements can be disposed in the inner space S' of the accommodating assembly 810.

In FIG. 8A, the optical elements include a most image-side optical element 850 and at least two optical elements disposed in the inner space S'. According to the 8th embodiment, a number of the optical elements is 10, which includes 4 lens elements, in order from the object side to the image side is, lens elements 891, 892, 893, 894, wherein the most image-side optical element 850 is a retainer, which is disposed on an image side of the lens element 894. However, the optical characteristics, such as the amount, structure, surface shape, can be arranged on demand, or can further dispose others optical elements, which will not be limited thereto.

Moreover, the out-side portion 863 can be fixed on the most image-side optical element 850 via a glue G, and the conical-shaped light blocking sheet 860 is physically contacted with only the most image-side optical element 850. Therefore, the generation of deformation of the conical-shaped light blocking sheet, such as compression or warpage, caused by pressing stress can be avoided, so that the tolerance stack-up can be reduced caused by assembling so as to maintain the image quality.

The conical portion 864 of the conical-shaped light blocking sheet 860 can further include an opposite conical structure 8643 expanded from the image-side opening 862 to one end of the conical-shaped light blocking sheet 860 closest to the image side. Therefore, the image-side opening 862 concaves towards the object side so as to enhance the light blocking effect of the conical-shaped light blocking sheet 860.

The conical portion 864 of the conical-shaped light blocking sheet 860 can further include at least one double-curved surface Sd. Specifically, according to the 8th embodiment, the double-curved surface Sd is the surface of the conical portion 864, and the double-curved surface Sd is annular-shaped, but the present disclosure will not be limited thereto. Therefore, when the conical-shaped light blocking sheet 860 is forced by the stress along the direction of the optical axis X, it is favorable for reducing the risk of the generation of the permanent deformation thereon.

The most image-side optical element 850 of the imaging lens assembly 800 further includes a third joint surface 855, which is disposed on an image side of the most image-side optical element 850 and disposed relatively to the out-side portion 863 of the conical-shaped light blocking sheet 860, wherein the conical-shaped light blocking sheet 860 and the most image-side optical element 850 are physically contacted with each other, and the out-side portion 863 of the conical-shaped light blocking sheet 860 is fixed on the third joint surface 855.

The imaging lens assembly 800 further includes a conical surface, which is disposed on one of the lens barrel 870, the object side of the most object-side optical element and the image side of the most image-side optical element 850, and is disposed relatively to the conical structure 8641 of the conical-shaped light blocking sheet 860, wherein the conical surface and the conical structure 8641 are physically contacted with each other, and the conical-shaped light blocking sheet 860, the lens barrel 870, the most object-side optical element, the most image-side optical element and the optical element are aligned along the optical axis X. According to the 8th embodiment, the most image-side optical element 850 of the imaging lens assembly 800 includes a third conical surface 856, wherein the third conical surface 856 is the conical surface included in the imaging lens assembly 800. The third conical surface 856 is disposed on the image side of the most image-side optical element 850 and disposed relatively to the conical structure 8641 of the conical-shaped light blocking sheet 860. In detail, the third conical surface 856 and the conical structure 8641 are physically contacted with each other, and the conical-shaped light blocking sheet 860 is aligned with the lens barrel 870. Therefore, the conical-shaped light blocking sheet 860 can the lens barrel 870 can be embedded and aligned to each other via the third conical surface 856 and the conical structure 8641.

Figure 8C:
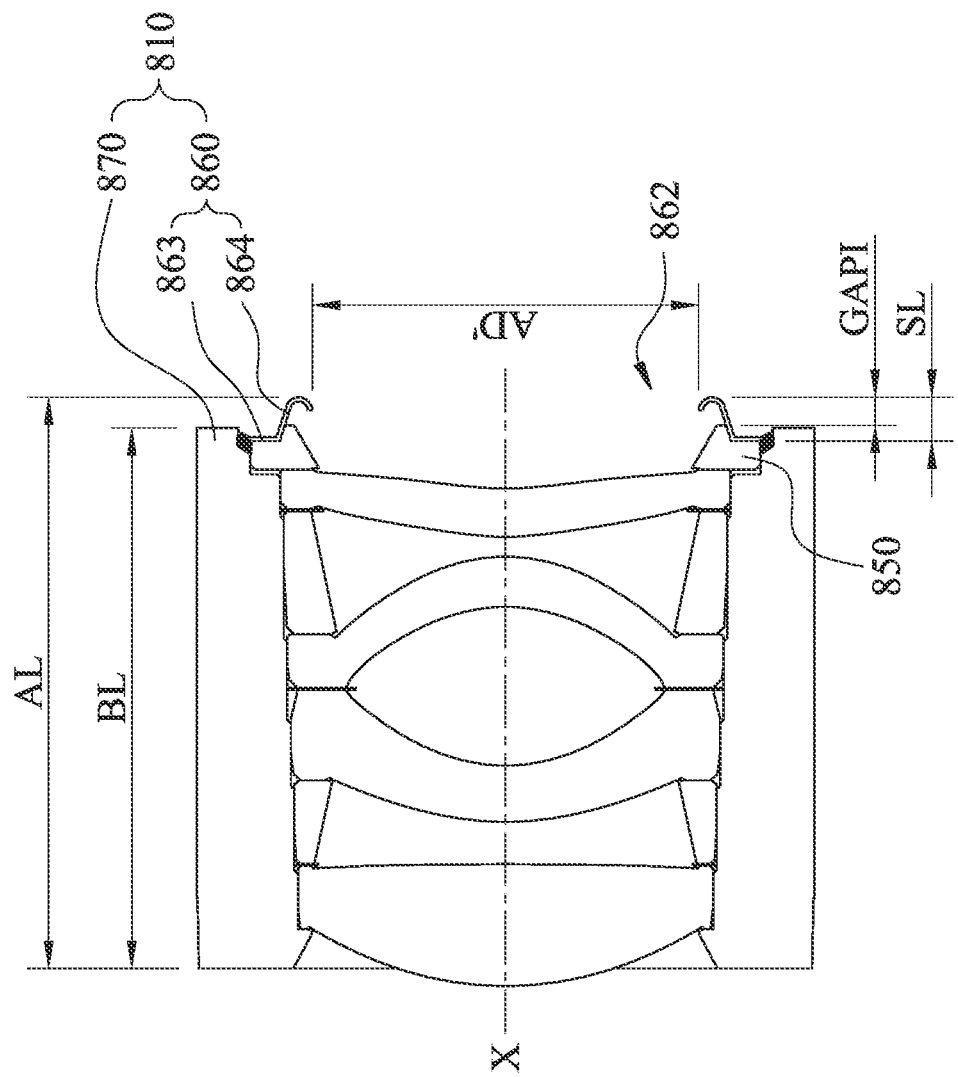
FIG. 8C is a schematic view of parameters of the imaging lens assembly according to the 8th embodiment of FIG. 8A.

FIG. 8C is a schematic view of parameters of the imaging lens assembly 800 according to the 8th embodiment of FIG. 8A. In FIG. 8A and FIG. 8C, when an angle between the conical portion 864 and the optical axis X is θ, a focal length of the imaging lens assembly 800 is f (not shown in the drawings), a diameter of the image-side opening 862 is AD', a length of the accommodating assembly 810 along the direction parallel to the optical axis X is AL, a length of the lens barrel 870 along the direction parallel to the optical axis X is BL, a distance along the direction parallel to the optical axis X between the end of the conical portion 864 closest to the image side and one end of the most image-side optical element 850 closest to the object side is GAPI, and a length of the conical-shaped light blocking sheet 860 along the direction parallel to the optical axis X is SL, the parameters satisfy the following conditions as shown in Table 8.

TABLE 8

| 8th embodiment | |
|---|---|
| θ (degrees) | 18 |
| f (mm) | 10.5 |
| AD' (mm) | 4.39 |
| f/AD' | 2.39 |
| AL (mm) | 6.50 |
| BL (mm) | 6.15 |
| (AL − BL)/AL × 100% (%) | 5.4 |
| GAPI (mm) | 0.32 |
| SL (mm) | 0.50 |
| GAPI/SL × 100% (%) | 64.0 |

9th Embodiment

Figure 9A:
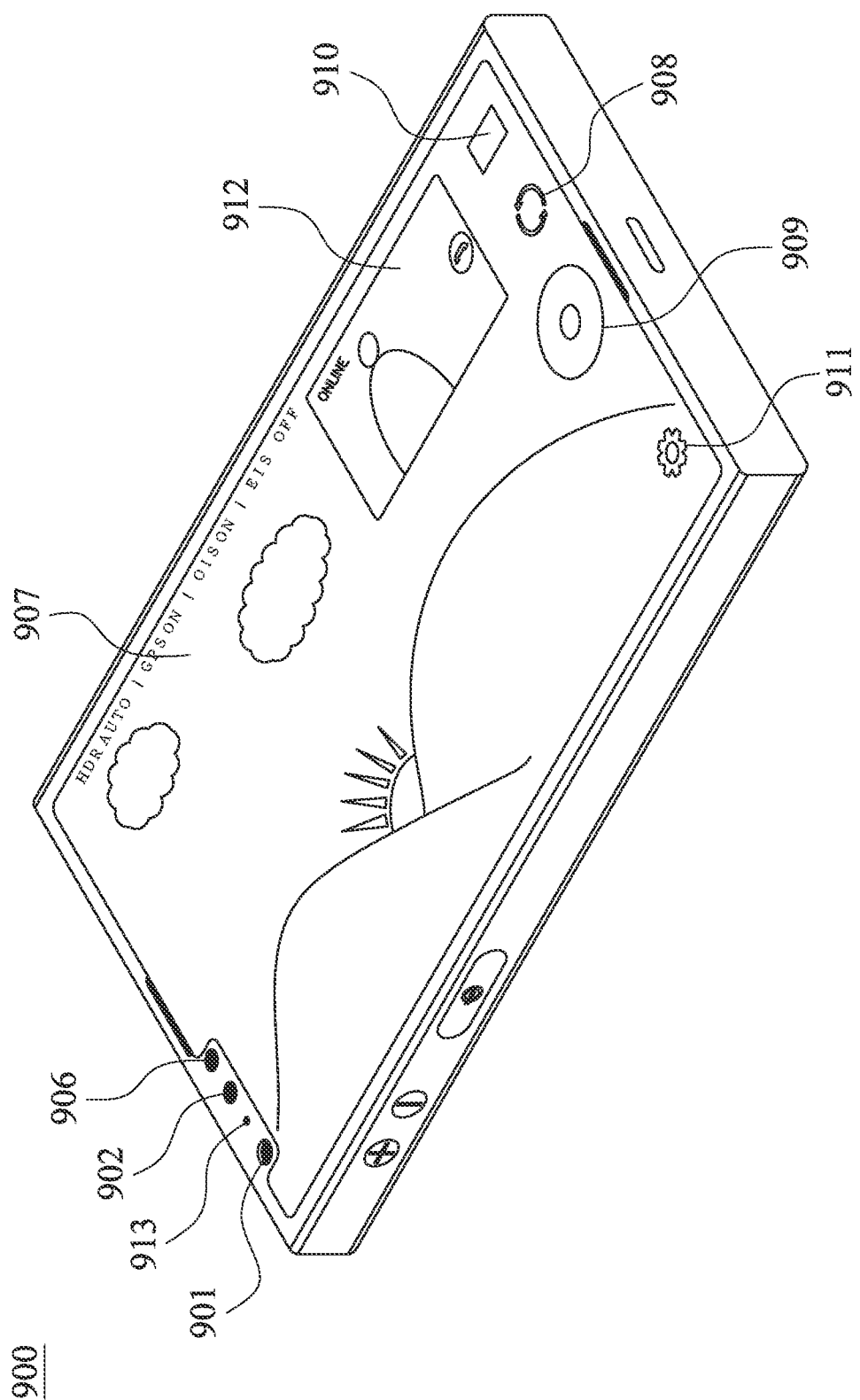
FIG. 9A is a schematic view of an electronic device according to the 9th embodiment of the present disclosure.
Figure 9B:
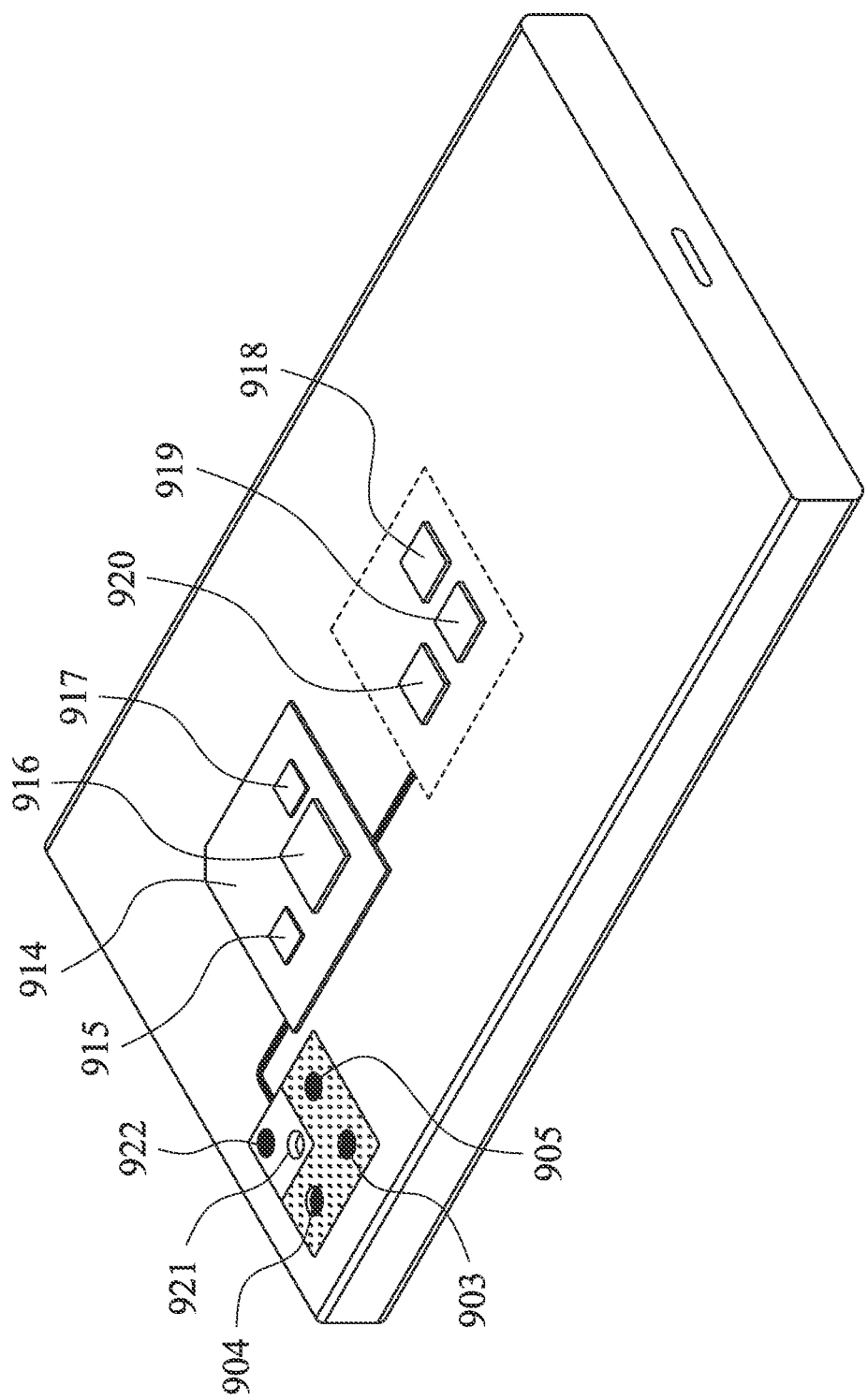
FIG. 9B is a schematic view of an electronic device according to the 9th embodiment of FIG. 9A.

FIG. 9A is a schematic view of an electronic device 900 according to the 9th embodiment of the present disclosure, FIG. 9B is a schematic view of an electronic device 900 according to the 9th embodiment of FIG. 9A. In FIG. 9A and FIG. 9B, the electronic device 900 is a smartphone, and the electronic device 900 includes at least one imaging apparatus and an image sensor (not shown in the drawings), wherein, according to the 9th embodiment, a number of the imaging apparatus is six, which are imaging apparatuses 901, 902, 903, 904, 905, 906. The imaging apparatus 901 can be ultra-wide angle imaging apparatus, the imaging apparatuses 902, 903 can be wide angle imaging apparatuses, the imaging apparatus 904 can be telephoto imaging apparatus, the imaging apparatus 905 can be macro imaging apparatuses, and the imaging apparatus 906 can be TOF (Time-Of-Flight) module, and the imaging apparatus 906 can also be other kinds of imaging apparatus, which will not be limited thereto. In detail, according to the 9th embodiment, the imaging apparatuses 901, 902, 906 are disposed on the front side of the electronic device 900, and the imaging apparatuses 903, 904, 905 are disposed on the back side of the electronic device 900. Each of the imaging apparatuses includes an imaging lens assembly (not shown in the drawings), the image sensor is disposed on an image surface (not shown in the drawings) of each imaging apparatus, and each of the imaging lens assembly can be any one of the aforementioned 1st embodiment to 8th embodiment, but the present disclosure will not be limited thereto.

An imaging controlling interface 907 can be a screen or a display screen, and includes an imaging module switch button 908, a focusing photographing button 909, an image replaying button 910, a menu button 911 and a floating window 912. Furthermore, the user can use the photographing mode from the imaging controlling interface 907 of the electronic device 900, the imaging module switch button 908 can switch to any one of the imaging apparatuses 901, 902, 903, 904, 905 for photographing, the focusing photographing button 909 is for capturing the image after checking the view and confirming one of the imaging apparatuses 901, 902, 903, 904, 905, the user can check the captured image by the image replaying button 910, the menu button 911 is for adjusting the details during photographing, such as photographing timer, ratio of the image, and the floating window 912 can provide live stream or phone call function during photographing.

The electronic device 900 further include a reminder light 931, which is disposed on the front side of the electronic device 900, and can reminding the unread messages, missed calls and the condition of the phone.

Further, after the user activates a shooting mode by the imaging controlling interface 907 of the electronic device 900, the imaging lens assembly collects an imaging light on the image sensor and outputs an electronic signal about an image to an Image Signal Processor 915 of SOC (system-on-a-chip) 914, wherein SOC 914 further includes a central processing unit 916 and a random-access memory unit (RAM) 917, and can further include but not be limited to a display, a control unit, a storage unit, a read only memory unit (RAM) or a combination thereof.

In response to camera specifications of the electronic device 900, the electronic device 900 can further include an optical anti-shake component (not shown in the drawings) which can be an OIS (Optical Image Stabilizer) anti-shake feedback device. Furthermore, the electronic device 900 can further include at least one auxiliary optical component and at least one sensing component. In the 9th embodiment, the at least one auxiliary optical component are an assistant light 921 and an auxiliary focusing module 922. The assistant light 921 can be used for compensating for color temperature and the auxiliary focusing module 922 can be an infrared ranging component, a laser focusing module, etc. The at least one sensing component can have a function of sensing physical momentum and space location, such as a locator 918, an accelerometer 919, a gyroscope 920, and a Hall Effect Element (not shown in the drawings), wherein the locator 918 can be a Global Positioning System (GPS). Specifically, the sensing component can record the location and environment during photographing, and can also sense the shaking by the user's hand or the external environment. As a result, an autofocus function and the optical anti-shake component configured by the imaging lens assembly in the electronic device 900 are favorable to show their abilities so as to achieve good imaging quality and to facilitate multiple modes of shooting functions being provided by the electronic device 900 according to the present disclosure, such as optimized self-timer, low light source HDR (High Dynamic Range imaging), high resolution 4K (4K Resolution) video. Moreover, the user can directly watch a shooting image of the imaging apparatuses 901, 902, 903, 904, 905 via the imaging controlling interface 907 and manually operate a viewing range on the imaging controlling interface 907 to achieve the autofocus function of what you see is what you get.

Therefore, the electronic device 900 of the present disclosure can provide a better shooting experience.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis, comprising:
a plurality of optical elements, the optical axis passing through the optical elements; and
an accommodating assembly surrounding the optical axis and containing the optical elements, the accommodating assembly comprising:
a conical-shaped light blocking sheet having an object-side opening, the optical axis passing through the object-side opening, the conical-shaped light blocking sheet comprising:
an out-side portion defining an outer periphery of the conical-shaped light blocking sheet and surrounding the object-side opening; and
a conical portion forming the object-side opening and connected to the out-side portion, wherein the conical portion comprises a conical structure tapered from the out-side portion toward an object-side along the optical axis; and
a lens barrel disposed on an image side of the conical portion, comprising:
an object-side wall having an object-side through hole and facing towards an object side of the imaging lens assembly;
an image-side wall having an image-side through hole and facing towards an image side of the imaging lens assembly;
an inner-side wall surrounding and facing towards the optical axis, the inner-side wall connecting the object-side wall and the image-side wall; and
an outer-side wall farther away from the optical axis than the inner-side wall to the optical axis and connecting the object-side wall and the image-side wall;
wherein the accommodating assembly defines an inner space extending from the image-side through hole of the lens barrel to an end of the conical portion closest to the object side along a direction parallel to the optical axis and surrounded by the inner-side wall;
wherein the optical elements comprise a most object-side optical element and at least two optical elements disposed in the inner space;
wherein the out-side portion is fixed at only one of the lens barrel and the most object-side optical element, and the conical-shaped light blocking sheet is physically contacted with only one of the lens barrel and the most object-side optical element.

2. The imaging lens assembly of claim 1, wherein an angle between the conical portion and the optical axis is θ, and the following condition is satisfied:

$$2 \text{ degrees} \leq \theta \leq 90 \text{ degrees}.$$

3. The imaging lens assembly of claim 2, wherein the object-side opening is disposed on the end of the conical portion closest to the object side.

4. The imaging lens assembly of claim 2, wherein the conical portion of the conical-shaped light blocking sheet further comprises an object-side structure disposed on the end of the conical portion closest to the object side and perpendicular to the optical axis, and one end of the object-side structure far away from the optical axis is connected to an object side of the conical structure.

5. The imaging lens assembly of claim 2, wherein the conical portion of the conical-shaped light blocking sheet further comprises an opposite conical structure expanded from the object-side opening toward one end of the conical-shaped light blocking sheet closest to the object side.

6. The imaging lens assembly of claim 2, wherein the conical portion of the conical-shaped light blocking sheet further comprises at least one double-curved surface.

7. The imaging lens assembly of claim 1, wherein a length of the accommodating assembly along the direction parallel to the optical axis is AL, a length of the lens barrel along the direction parallel to the optical axis is BL, and the following condition is satisfied:

$$0\% \leq (AL-BL)/AL \times 100\% \leq 30\%.$$

8. The imaging lens assembly of claim 7, wherein a distance along the direction parallel to the optical axis between the end of the conical portion closest to the object side and one end of the most object-side optical element closest to the object side is GAPO, and the following condition is satisfied:

$$0.01 \text{ mm} \leq GAPO \leq 1.00 \text{ mm}.$$

9. The imaging lens assembly of claim 7, wherein a distance along the direction parallel to the optical axis between the end of the conical portion closest to the object side and one end of the most object-side optical element closest to the object side is GAPO, a length of the conical-shaped light blocking sheet along the direction parallel to the optical axis is SL, and the following condition is satisfied:

$$1.0\% \leq GAPO/SL \times 100\%.$$

10. The imaging lens assembly of claim 1, wherein a diameter of the end of the conical portion closest to the object side is OD, a maximum outer diameter of the accommodating assembly is MD, and the following condition is satisfied:

$$0.05 \leq OD/MD < 1.00.$$

11. The imaging lens assembly of claim 1, wherein the object-side opening is a minimum opening of the accommodating assembly, a diameter of the object-side opening is AD, a focal length of the imaging lens assembly is f, and the following condition is satisfied:

$$0.7 \leq f/AD \leq 3.5.$$

12. The imaging lens assembly of claim 1, wherein the lens barrel further comprises:
a first joint surface disposed on an object side of the lens barrel and disposed opposite to the out-side portion of the conical-shaped light blocking sheet;
wherein the conical-shaped light blocking sheet and the lens barrel are physically contacted to each other, and the out-side portion of the conical-shaped light blocking sheet is fixed to the first joint surface.

13. The imaging lens assembly of claim 12, wherein the lens barrel further comprises:
a first conical surface disposed on the object side of the lens barrel and disposed opposite to the conical structure of the conical-shaped light blocking sheet;
wherein the first conical surface and the conical structure are physically contacted to each other, and the conical-shaped light blocking sheet is aligned with the lens barrel.

14. The imaging lens assembly of claim 12, wherein the lens barrel further comprises:
a first undercut surface surrounding the optical axis, and extended and shrunken along a direction from one end of the first joint surface far from the optical axis farther away from the first joint surface.

15. The imaging lens assembly of claim 14, wherein the first undercut surface is integrally made with the lens barrel;
wherein a maximum diameter of the first undercut surface along a direction perpendicular to the optical axis is MU, a minimum diameter of the first undercut surface along the direction perpendicular to the optical axis is SU, and the following condition is satisfied:

$$0\% < (MU-SU)/MU \times 100\% < 12\%.$$

16. The imaging lens assembly of claim 1, wherein the most object-side optical element comprises:
a second joint surface disposed on an object side of the most object-side optical element and disposed relatively to the out-side portion of the conical-shaped light blocking sheet;
wherein the conical-shaped light blocking sheet and the most object-side optical element are physically contacted with each other, and the out-side portion of the conical-shaped light blocking sheet is fixed on the second joint surface.

17. The imaging lens assembly of claim 16, wherein the most object-side optical element further comprises:
a second conical surface disposed on the object side of the most object-side optical element and disposed relatively to the conical structure of the conical-shaped light blocking sheet;
wherein the conical portion and the second conical surface are physically contacted with each other, and the conical-shaped light blocking sheet is aligned with the lens barrel.

18. The imaging lens assembly of claim 1, further comprising:
at least one coil disposed on the outer-side wall of the lens barrel and symmetrically disposed along the optical axis.

19. The imaging lens assembly of claim 1, further comprising:
at least one magnetic element disposed on the outer-side wall of the lens barrel and symmetrically disposed along the optical axis.

20. The imaging lens assembly of claim 1, wherein the conical-shaped light blocking sheet is made of metal material.

21. The imaging lens assembly of claim 1, wherein the conical-shaped light blocking sheet is made of plastic material.

22. An imaging apparatus, comprising:
the imaging lens assembly of claim 1.

23. An electronic device, comprising:
at least one of the imaging apparatus of claim 22; and
an image sensor disposed on an image surface of the at least one of the imaging apparatus.

24. An imaging lens assembly, having an optical axis, comprising:
a plurality of optical elements, the optical axis passing through the optical elements; and
an accommodating assembly surrounding the optical axis and containing the optical elements, the accommodating assembly comprising:
a conical-shaped light blocking sheet having an image-side opening, the optical axis passing through the image-side opening, the conical-shaped light blocking sheet comprising:
an out-side portion defining an outer periphery of the conical-shaped light blocking sheet and surrounding the image-side opening; and
a conical portion forming the image-side opening and connected to the out-side portion, wherein the conical portion comprises a conical structure tapered from the out-side portion toward an image-side along the optical axis; and
a lens barrel disposed on an object side of the conical portion, comprising:
an object-side wall having an object-side through hole and facing towards an object side of the imaging lens assembly;

an image-side wall having an image-side through hole and facing towards an image side of the imaging lens assembly;

an inner-side wall surrounding and facing towards the optical axis, the inner-side wall connecting the object-side wall and the image-side wall; and an outer-side wall farther away from the optical axis than the inner-side wall to the optical axis and connecting the object-side wall and the image-side wall;

wherein the accommodating assembly defines an inner space extending from the object-side through hole of the lens barrel to an end of the conical portion closest to the image side along a direction parallel to the optical axis and surrounded by the inner-side wall;

wherein the optical elements comprise a most image-side optical element and at least two optical elements disposed in the inner space;

wherein the out-side portion is fixed at only one of the lens barrel and the most image-side optical element, and the conical-shaped light blocking sheet is physically contacted with only one of the lens barrel and the most image-side optical element.

25. The imaging lens assembly of claim 24, wherein an angle between the conical portion and the optical axis is θ, and the following condition is satisfied:

2 degrees≤θ≤90 degrees.

26. The imaging lens assembly of claim 25, wherein the image-side opening is disposed on the end of the conical portion closest to the image side.

27. The imaging lens assembly of claim 25, wherein the conical portion of the conical-shaped light blocking sheet further comprises an image-side structure disposed on the end of the conical portion closest to the image side and perpendicular to the optical axis, and one end of the image-side structure far away from the optical axis is connected to an image side of the conical structure.

28. The imaging lens assembly of claim 25, wherein the conical portion of the conical-shaped light blocking sheet further comprises an opposite conical structure expanded from the image-side opening toward one end of the conical-shaped light blocking sheet closest to the image side.

29. The imaging lens assembly of claim 25, wherein the conical portion of the conical-shaped light blocking sheet further comprises at least one double-curved surface.

30. The imaging lens assembly of claim 24, wherein a length of the accommodating assembly along the direction parallel to the optical axis is AL, a length of the lens barrel along the direction parallel to the optical axis is BL, and the following condition is satisfied:

0%≤(AL−BL)/AL×100%≤30%.

31. The imaging lens assembly of claim 24, wherein a distance along the direction parallel to the optical axis between the end of the conical portion closest to the image side and one end of the most image-side optical element closest to the object side is GAPI, and the following condition is satisfied:

0.01 mm≤GAPI≤1.00 mm.

32. The imaging lens assembly of claim 24, wherein a distance along the direction parallel to the optical axis between the end of the conical portion closest to the image side and one end of the most image-side optical element closest to the object side is GAPI, a length of the conical-shaped light blocking sheet along the direction parallel to the optical axis is SL, and the following condition is satisfied:

1.0%≤GAPI/SL×100%.

33. The imaging lens assembly of claim 24, wherein the most image-side optical element comprises:

a third joint surface disposed on an image side of the most image-side optical element and disposed relatively to the out-side portion of the conical-shaped light blocking sheet;

wherein the conical-shaped light blocking sheet and the most image-side optical element are physically contacted with each other, and the out-side portion of the conical-shaped light blocking sheet is fixed on the third joint surface.

34. The imaging lens assembly of claim 33, wherein the most image-side optical element further comprises:

a third conical surface disposed on the image side of the most image-side optical element and disposed relatively to the conical structure of the conical-shaped light blocking sheet;

wherein the third conical surface and the conical structure are physically contacted with each other, and the conical-shaped light blocking sheet is aligned with the lens barrel.

35. The imaging lens assembly of claim 33, wherein the lens barrel further comprises:

a third undercut surface surrounding the optical axis, and extended and shrunken along a direction from one end of the third joint surface far from the optical axis farther away from the third joint surface.

36. An imaging apparatus, comprising:

the imaging lens assembly of claim 24.

37. An electronic device, comprising:

at least one of the imaging apparatus of claim 36; and an image sensor disposed on an image surface of the at least one of the imaging apparatus.

38. An imaging lens assembly, having an optical axis, comprising:

a plurality of optical elements, the optical axis passing through the optical elements; and an accommodating assembly surrounding the optical axis and containing the optical elements, the accommodating assembly comprising:

a conical-shaped light blocking sheet having an opening, the optical axis passing through the opening, the conical-shaped light blocking sheet comprising:

an out-side portion defining an outer periphery of the conical-shaped light blocking sheet and surrounding the opening; and a conical portion forming the opening and connecting to the out-side portion, wherein the conical portion comprises a conical structure tapered from the out-side portion toward one of an object-side and an image-side along the optical axis; and a lens barrel disposed on one of an object side and an image side of the conical portion, comprising:

an object-side wall having an object-side through hole and facing towards an object side of the imaging lens assembly;

an image-side wall having an image-side through hole and facing towards an image side of the imaging lens assembly;

an inner-side wall surrounding and facing towards the optical axis, the inner-side wall connecting the object-side wall and the image-side wall; and an outer-side wall farther away from the optical axis than the inner-side wall to the optical axis and connecting the object-side wall and the image-side wall;

wherein the optical elements comprise a most object-side optical element, a most image-side optical element and at least one optical element;

wherein the conical structure of the conical-shaped light blocking sheet is physically contacted with only one of the lens barrel, an object side of the most object-side optical element and an image side of the most image-side optical element.

39. The imaging lens assembly of claim 38, further comprising:

a conical surface disposed on one of the lens barrel, the object side of the most object-side optical element and the image side of the most image-side optical element, and disposed relatively to the conical structure of the conical-shaped light blocking sheet;

wherein the conical surface and the conical structure are physically contacted with each other, and the conical-shaped light blocking sheet, the lens barrel, the most object-side optical element, the most image-side optical element and the optical element are aligned along the optical axis.

40. The imaging lens assembly of claim 38, further comprising:

a joint surface disposed on one of the lens barrel, the most object-side optical element and the most image-side optical element, and disposed relatively to the out-side portion of the conical-shaped light blocking sheet;

wherein the out-side portion of the conical-shaped light blocking sheet is fixed on the joint surface.

41. The imaging lens assembly of claim 38, wherein an angle between the conical portion and the optical axis is $\theta$, and the following condition is satisfied:

2 degrees$\leq\theta\leq$90 degrees.

42. The imaging lens assembly of claim 38, further comprising:

at least one coil disposed on the outer-side wall of the lens barrel and symmetrically disposed along the optical axis.

43. The imaging lens assembly of claim 38, further comprising:

at least one magnetic element disposed on the outer-side wall of the lens barrel and symmetrically disposed along the optical axis.

44. An imaging apparatus, comprising:

the imaging lens assembly of claim 38.

45. An electronic device, comprising:

at least one of the imaging apparatus of claim 44; and an image sensor disposed on an image surface of the at least one of the imaging apparatus.

* * * * *